(12) United States Patent
Armani et al.

(10) Patent No.: US 12,454,530 B2
(45) Date of Patent: Oct. 28, 2025

(54) AMIDO CYCLOHEXANE ACID DERIVATIVES AS LPA RECEPTOR INHIBITORS

(71) Applicant: CHIESI FARMACEUTICI S.P.A., Parma (IT)

(72) Inventors: Elisabetta Armani, Parma (IT); Gabriele Amari, Parma (IT); Andrea Rizzi, Parma (IT); Mafalda Pagano, Parma (IT); Luca Raveglia, Parma (IT); Claudia Beato, Parma (IT)

(73) Assignee: CHIESI FARMACEUTICI S.p.A., Parma (IT)

( * ) Notice: Subject to any disclaimer, the term of this patent is extended or adjusted under 35 U.S.C. 154(b) by 492 days.

(21) Appl. No.: 18/015,767

(22) PCT Filed: Jul. 15, 2021

(86) PCT No.: PCT/EP2021/069806
§ 371 (c)(1),
(2) Date: Jan. 12, 2023

(87) PCT Pub. No.: WO2022/013378
PCT Pub. Date: Jan. 20, 2022

(65) Prior Publication Data
US 2023/0250093 A1 Aug. 10, 2023

(30) Foreign Application Priority Data
Jul. 16, 2020 (EP) .................................... 20186207

(51) Int. Cl.
| | | |
|---|---|---|
| *C07D 413/04* | (2006.01) |
| *C07D 231/40* | (2006.01) |
| *C07D 249/06* | (2006.01) |
| *C07D 333/36* | (2006.01) |
| *C07D 401/04* | (2006.01) |
| *C07D 409/04* | (2006.01) |
| *C07D 413/14* | (2006.01) |
| *C07D 417/04* | (2006.01) |
| *C07D 417/14* | (2006.01) |

(52) U.S. Cl.
CPC ......... *C07D 413/04* (2013.01); *C07D 231/40* (2013.01); *C07D 249/06* (2013.01); *C07D 333/36* (2013.01); *C07D 401/04* (2013.01); *C07D 409/04* (2013.01); *C07D 413/14* (2013.01); *C07D 417/04* (2013.01); *C07D 417/14* (2013.01)

(58) Field of Classification Search
CPC .. C07D 413/04; C07D 231/40; C07D 249/06; C07D 333/36; C07D 401/04; C07D 409/04; C07D 413/14; C07D 417/04; C07D 417/14; C07D 249/04
See application file for complete search history.

(56) References Cited

FOREIGN PATENT DOCUMENTS

| | | |
|---|---|---|
| WO | WO-2011017350 A2 | 2/2011 |
| WO | WO-2012100436 A1 | 8/2012 |
| WO | WO-2014145873 A2 | 9/2014 |

OTHER PUBLICATIONS

Extended European Search Report issued Dec. 2, 2020 in EP Patent Application No. 20186207.5, 5 pages.
International Search Report and Written Opinion issued Oct. 4, 2021 in PCT/EP2021/069806, 11 pages.

*Primary Examiner* — Laura L Stockton
(74) *Attorney, Agent, or Firm* — Element IP, PLC

(57) ABSTRACT

The present invention relates to compounds of general formula (I) inhibiting lysophosphatidic acid receptor 1 (LPA1), particularly the invention relates to compounds that are Ami do cyclohexane acid derivatives, methods of preparing such compounds, pharmaceutical compositions containing them and therapeutic use thereof. The compounds of the invention may be useful in the treatment of diseases or conditions associated with a dysregulation of LPA receptors, in particular fibrosis.

11 Claims, No Drawings

AMIDO CYCLOHEXANE ACID DERIVATIVES AS LPA RECEPTOR INHIBITORS

FIELD OF THE INVENTION

The present invention generally relates to compounds inhibiting lysophosphatidic acid receptors (hereinafter LPA inhibitors); the invention relates to compounds that are amido cyclohexane acid derivatives, methods of preparing such compounds, pharmaceutical compositions containing them and therapeutic use thereof.

The compounds of the invention may be useful for instance in the treatment of many disorders associated with LPA receptors mechanisms.

BACKGROUND OF THE INVENTION

Lysophosphatidic acid (LPA) is a phospholipid mediator concentrated in serum that acts as a potent extracellular signalling molecule through at least six cognate G protein-coupled receptors (GPCRs) in numerous developmental and adult processes including cell survival, proliferation, migration, differentiation, vascular regulation, and cytokine release.

These LPA-mediated processes involve nervous system function, vascular development, immune system function, cancer, reproduction, fibrosis, and obesity (see e.g. Yung et al., *J Lipid Res.* 2014 July; 55(7):1192-214). The formation of an LPA species depends on its precursor phospholipid, which can vary typically by acyl chain length and degree of saturation. The term LPA generally refers to 18:1 oleoyl-LPA (1-acyl-2-hydroxy-sn-glycero3-phosphate), that is the most quantitatively abundant forms of LPA in human plasma with 16:0-, 18:2-, and 18:1-LPA (see e.g. Sano et al., *J Biol Chem.* 2002 Dec. 13; 277(50):21197-206). All LPA species are produced from membrane phospholipids via two major metabolic routes. Depending upon the site of synthesis, membrane phospholipids get converted to the corresponding lysophospholipids by the action of phospholipase A1 (PLA1), phospholipase A2 (PLA2), or PLA1 and lecithin-cholesterol acyltransferase (LCAT). Autotoxin (ATX) then acts on the lysophospholipids and converts them into LPA species. The second pathway first converts the phospholipids into phosphatidic acid by the action of phospholipase D. Then PLA1 or PLA2 metabolize phosphatidic acid to the lysophosphatidic acids (see e.g. Riaz et al., *Int J Mol Sci.* 2016 February; 17(2): 215).

ATX activity is the major source of plasma extracellular LPA but the source of tissue LPA that contributes to signalling pools likely involves not only ATX but other enzymes as well. The biological functions of LPA are mediated by at least six recognized cell-surface receptors.

All LPA receptors are rhodopsin-like 7-TM proteins that signal through at least two of the four Ga subunit families (Gα12/13, Gαq/11, Gαi/o and GαS). LPA receptors usually trigger response from multiple heterotrimeric G-proteins, resulting in diverse outcomes in a context and cell type dependent manner. Gα12/13-mediated LPA signalling regulates cell migration, invasion and cytoskeletal re-adjustments through activation of RHO pathway proteins. RAC activation downstream of Gαi/o-PI3K also regulates similar processes, but the most notable function of LPA-induced Gαi/o is mitogenic signalling through the RAF-MEK-MAPK cascade and survival signalling through the PI3K-AKT pathway. The LPA-coupled Gαq/11 protein primarily regulates Ca2+ homeostasis through PLC and the second messengers IP3 and DAG. Lastly, GαS can activate adenylyl cyclase and increase cAMP concentration upon LPA stimulation (see e.g. Riaz et al., *Int J Mol Sci.* 2016 February; 17(2): 215).

LPA, especially LPA1, LPA2 and LPA3, have been implicated in migration, invasion, metastasis, proliferation and survival and differ in their tissue distribution and downstream signalling pathways.

LPA1 is a 41-kD protein that is widely expressed, albeit at different levels, in all human adult tissues examined and the importance of LPA1 signalling during development and adult life has been demonstrated through numerous approaches (see e.g. Ye at al., 2002, *Neuroreport*. Dec. 3; 13(17):2169-75). Wide expression of LPA1 is observed in adult mice, with clear presence in at least brain, uterus, testis, lung, small intestine, heart, stomach, kidney, spleen, thymus, placenta, and skeletal muscle. LPA1 is also widely expressed in humans where the expression is more spatially restricted during embryonic development. LPA1 couples with and activates three types of G proteins: Gαi/o, Gαq/11, and Gα12/13. LPA1 activation induces a range of cellular responses: cell proliferation and survival, cell migration, cytoskeletal changes, Ca2+ mobilization, adenylyl cyclase inhibition and activation of mitogen-activated protein kinase, phospholipase C, Akt, and Rho pathways (see e.g. Choi et al., *Annu Rev Pharmacol Toxicol.* 2010; 50:157-86).

LPA2 in humans is a 39-kD protein and shares ~55% amino acid sequence homology with LPA1 (see e.g. Yung et al., *J Lipid Res.* 2014 July; 55(7):1192-214). In mouse, LPA2 is highly expressed in kidney, uterus, and testis and moderately expressed in lung; in human tissues, high expression of LPA2 is detected in testis and leukocytes, with moderate expression found in prostate, spleen, thymus, and pancreas.

In terms of signalling activity, LPA2 mostly activates the same pathways as triggered by LPA1 with some exceptions that regards its unique cross-talk behaviour. For example, LPA2 promotes cell migration through interactions with focal adhesion molecule TRIP6 (see e.g. Lai Y J, 2005, *Mol. Cell. Biol.* 25:5859-68), and several PDZ proteins and zinc finger proteins are also reported to interact directly with the carboxyl-terminal tail of LPA2 (see e.g. Lin F T, 2008, *Biochim. Biophys. Acta* 1781:558-62).

Human LPA3 is a 40-kD protein and shares sequence homology with LPA1 (~54%) and LPA2 (~49%). In adult humans LPA3 is highly expressed in heart, pancreas, prostate and testis. Moderate levels of expression are also found in brain, lungs and ovary. Like LPA1 and LPA2 the signaling activity of LPA3 results from its coupling to Gαi/o and Gαq/11 (see e.g Ishii et al., *Mol Pharmacol* 58:895-902, 2000). Each LPA has multiple important regulatory functions throughout the body.

As LPA signalling has been strongly implicated in many disease states, great interest has been expressed in developing specific LPA inhibitors (see e.g. Stoddard et el., *Biomol Ther (Seoul)* 2015 January; 23(1):1-11). Different studies have demonstrated a positive role for LPA in the pathogenesis of pulmonary fibrosis (PF), a devastating disease characterized by alveolar epithelial cell injury, accumulation of myofibroblasts and deposition of extracellular matrix proteins leading to a loss of lung function and death (see e.g. Wilson M S, Wynn T A (2009), *Mucosal Immunol* 2: 103-121).

Evidences showed that lysophosphatidic acid levels dramatically increase in bronchoalveolar lavage fluid of PF patients where it mediates fibroblast migration in the injured lung acting through LPA1 (see e.g. Tager et al., *Nat Med.*

2008 January; 14(1):45-54). In addition, mice lacking LPA1 or LPA2 are markedly protected from fibrosis and mortality in a mouse model of the bleomycin induced pulmonary fibrosis (see e.g. Huang et al., *Am J Respir Cell Mol Biol.* 2013 December; 49(6): 912-922 and Tager et al., *Nat Med.* 2008 January; 14(1):45-54).

In vitro, LPA1 is known to induce the proliferation and differentiation of lung fibroblasts (see e.g. Shiomi et al., *Wound Repair Regen.* 2011 March-April; 19(2): 229-240), and to augment the fibroblast-mediated contraction of released collagen gels (see e.g. Mio et al., *Journal of Laboratory and Clinical Medicine*, Volume 139, Issue 1, January 2002, Pages 20-27). In human lung fibroblasts, the knockdown of LPA2 attenuated the LPA-induced expression of TGF-β1 and the differentiation of lung fibroblasts to myofibroblasts, resulting in the decreased expression of different profibrotic markers such as FN, α-SMA, and collagen, as well as decreased activation of extracellular regulated kinase 1/2, Akt, Smad3, and p38 mitogen-activated protein kinase (see e.g. Huang et al., *Am J Respir Cell Mol Biol.* 2013 December; 49(6): 912-922). Moreover Xu et al., confirmed that the expression of LPA2 was also up-regulated in lungs from bleomycin-challenged mice where it is able to induce the activation of TGF-β pathway, a key cytokine that play an essential role during the development of the disease, via a RhoA and Rho kinase pathway (see e.g. Xu et al., *Am J Pathol.* 2009 April; 174(4):1264-79). In in vivo preclinical model, the oral administration of an LPA1 antagonist significantly reduced bleomycin-induced pulmonary fibrosis in mice (Tager et al., *Nat Med.* 2008 January; 14(1):45-54; Swaney et al., *Br J Pharmacol.* 2010 August; 160(7): 1699-1713), and the intraperitoneal injection of an LPA1/3 antagonist ameliorated irradiation-induced lung fibrosis (see e.g. Gan et al., 2011, *Biochem Biophys Res Commun* 409: 7-13). In a renal fibrosis model, LPA1 administration of an LPA1 antagonist suppressed renal interstitial fibrosis (see e.g Pradere et al., *J Am Soc Nephrol* 2007; 18:3110-3118).

Various compounds have been described in the literature as LPA1 or LPA2 antagonist.

WO2019126086 and WO2019126087 (Bristol-Myers Squibb) disclose cyclohexyl acid isoxazole azines as LPA1 antagonist, useful for the treatment of disorder or condition associated with dysregulation of lysophosphatidic acid receptor 1.

WO2019126099 (Bristol-Myers Squibb) discloses isoxazole N-linked carbamoyl cyclohexyl acid as LPA1 antagonist for the treatment of disorder or condition associated with dysregulation of lysophosphatidic acid receptor 1.

WO2019126090 (Bristol-Myers Squibb) discloses triazole N-linked carbamoyl cyclohexyl acids as LPA1 antagonists. The compounds are selective LPA1 receptor inhibitors and are useful for the treatment of disorder or condition associated with dysregulation of lysophosphatidic acid receptor 1.

WO2017223016 (Bristol-Myers Squibb) discloses carbamoyloxymethyl triazole cyclohexyl acids as LPA1 antagonist for the treatment of fibrosis including idiopathic pulmonary fibrosis.

WO2012028243 (Merck) discloses pyrazolopyridinone derivatives according to formula (I) and a process of manufacturing thereof as LPA2 receptor antagonists for the treatment of various diseases.

WO2012100436 (Curegenix) discloses phenyl isoxazole carbamate derivatives as LPA1 antagonist for the treatment of LPA mediated disorder, such as fibrosis.

Amgen Inc. discloses in "Discovery of potent LPA2 (EDG4) antagonists as potential anticancer agents" Bioorg Med Chem Lett. 2008 Feb. 1; 18(3):1037-41, LPA2 antagonists. Key compounds were evaluated in vitro for inhibition of LPA2 mediated Erk activation and proliferation of HCT-116 cells. These compounds could be used as tool compounds to evaluate the anticancer effects of blocking LPA2 signalling.

Of note, antagonizing the LPA receptors may be useful for the treatment of fibrosis and disease, disorder and conditions that result from fibrosis, and antagonizing receptors LPA1 may be efficacious in the treatment of the above-mentioned disease, disorder and conditions.

Despite the above cited prior art, there remains a potential for developing novel inhibitors of receptors LPA1 with a suitable BSEP (Bile Salt Export Pump inhibition) profile and good permeability useful for the treatment of diseases or conditions associated with a dysregulation of LPA receptors, in particular fibrosis.

In this respect, the state of the art does not describe or suggest amido cyclohexane acid derivatives of general formula (I) of the present invention having antagonist activity on receptors LPA1 and at the same time a suitable BSEP profile and a good permeability which represent a solution to the aforementioned need.

SUMMARY OF THE INVENTION

In a first aspect the invention refers to a compound of formula (I)

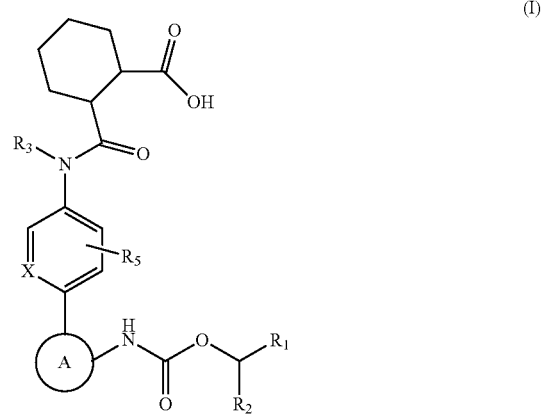

wherein X is —CR$_5$, —CH— or N,
A is selected from the group consisting of

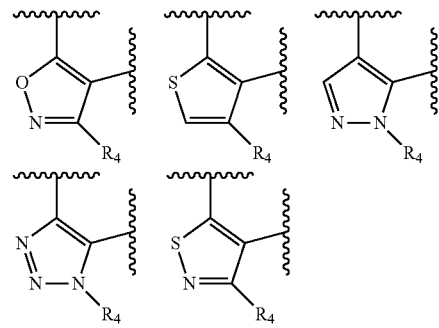

R₁ is selected from the group consisting of aryl, $(C_3\text{-}C_6)$ cycloalkyl, heterocycloalkyl, heteroaryl and $(C_1\text{-}C_4)$ alkyl wherein any of such aryl, heteroaryl, cycloalkyl, heterocycloalkyl and alkyl may be optionally substituted by one or more groups selected from $(C_1\text{-}C_4)$ alkyl, halo, $(C_1\text{-}C_4)$haloalkyl, CN, —O$(C_1\text{-}C_4)$alkyl, —NR₆R₇;

R₂ is H or $(C_1\text{-}C_4)$alkyl;

R₃ is H or $(C_1\text{-}C_4)$alkyl,

R₄ is H or $(C_1\text{-}C_4)$alkyl.

R₅ is H or selected from the group consisting of $(C_1\text{-}C_4)$ alkyl, halo and CN;

R₆ and R₇ are at each occurrence independently H or selected from the group consisting of $(C_1\text{-}C_4)$alkyl, $(C_1\text{-}C_6)$haloalkyl and halo, or R₆ and R₇ may form together with the nitrogen atom to which they are attached a 4-6 membered saturated heterocyclic ring system optionally containing a further heteroatom selected from N, S and O, said heterocyclic ring system may be optionally substituted by one or more groups selected from $(C_1\text{-}C_4)$alkyl, $(C_1\text{-}C_4)$ haloalkyl and halo, with the proviso that when A is

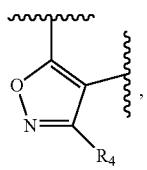

X is N.

In a second aspect, the invention refers to pharmaceutical composition comprising a compound of formula (I) in a mixture with one or more pharmaceutically acceptable carrier or excipient.

In a third aspect, the invention refers to a compound of formula (I) for the use as a medicament.

In a further aspect, the invention refers to a compound of formula (I) for use in treating disease, disorder, or condition associated with dysregulation of lysophosphatidic acid receptor 1 (LPA1).

In a further aspect, the invention refers to a compound of formula (I) for use in the prevention and/or treatment of fibrosis and/or diseases, disorders, or conditions that involve fibrosis.

In a further aspect, the invention refers to a compound of formula (I) for use in the prevention and/or treatment idiopathic pulmonary fibrosis (IPF)

DETAILED DESCRIPTION OF THE INVENTION

Unless otherwise provided, the term compound of formula (I) comprises in its meaning stereoisomer, tautomer or pharmaceutically acceptable salt or solvate.

The term "pharmaceutically acceptable salts", as used herein, refers to derivatives of compounds of formula (I) wherein the parent compound is suitably modified by converting any of the free acid or basic group, if present, into the corresponding addition salt with any base or acid conventionally intended as being pharmaceutically acceptable.

Suitable examples of said salts may thus include mineral or organic acid addition salts of basic residues such as amino groups, as well as mineral or organic basic addition salts of acid residues such as carboxylic groups.

Cations of inorganic bases which can be suitably used to prepare salts comprise ions of alkali or alkaline earth metals such as potassium, sodium, calcium or magnesium.

Those obtained by reacting the main compound, functioning as a base, with an inorganic or organic acid to form a salt comprise, for example, salts of hydrochloric acid, hydrobromic acid, sulfuric acid, phosphoric acid, methane sulfonic acid, camphor sulfonic acid, acetic acid, oxalic acid, maleic acid, fumaric acid, succinic acid and citric acid.

The term "solvate" means a physical association of a compound of this invention with one or more solvent molecules, whether organic or inorganic. This physical association includes hydrogen bonding. In certain instances, the solvate will be capable of isolation, for example, when one or more solvent molecules are incorporated in the crystal lattice of the crystalline solid. The solvate may comprise either a stoichiometric or nonstoichiometric amount of the solvent molecules.

The term "stereoisomer" refers to isomers of identical constitution that differ in the arrangement of their atoms in space. Enantiomers and Diastereomer s are examples of stereoisomers.

The term "enantiomer" refers to one of a pair of molecular species that are mirror images of each other and are not superimposable.

The term "Diastereomer" refers to stereoisomers that are not mirror images.

The term "racemate" or "racemic mixture" refers to a composition composed of equimolar quantities of two enantiomeric species, wherein the composition is devoid of optical activity.

The symbols "R" and "S" represent the configuration of substituents around a chiral carbon atom(s). The isomeric descriptors "R" and "S" are used as described herein for indicating atom configuration(s) relative to a core molecule and are intended to be used as defined in the literature (IUP AC Recommendations 1996, Pure and Applied Chemistry, 68:2193-2222 (1996)).

The term "tautomer" refers to each of two or more isomers of a compound that exist together in equilibrium and are readily interchanged by migration of an atom or group within the molecule.

The term "halogen" or "halogen atoms" or "halo" as used herein includes fluorine, chlorine, bromine, and iodine atom.

The term "5-membered heterocyclyl" refers to a mono satured or unsaturated group containing one or more heteroatoms selected from N and O.

The term "$(C_x\text{-}C_y)$ alkyl" wherein x and y are integers, refers to a straight or branched chain alkyl group having from x to y carbon atoms. Thus, when x is 1 and y is 6, for example, the term includes methyl, ethyl, n-propyl, isopropyl, n-butyl, isobutyl, sec-butyl, t-butyl, n-pentyl and n-hexyl.

The term "$(C_x\text{-}C_y)$alkylene" wherein x and y are integers, refers to a $C_x\text{-}C_y$alkyl radical having in total two unsatisfied valences, such as a divalent methylene radical.

The expressions "$(C_x\text{-}C_y)$ haloalkyl" wherein x and y are integers, refer to the above defined "$C_x\text{-}C_y$alkyl" groups wherein one or more hydrogen atoms are replaced by one or more halogen atoms, which can be the same or different.

Examples of said "$(C_x\text{-}C_y)$ haloalkyl" groups may thus include halogenated, poly-halogenated and fully halogenated alkyl groups wherein all hydrogen atoms are replaced by halogen atoms, e.g. trifluoromethyl.

The term "$(C_x-C_y)$ cycloalkyl" wherein x and y are integers, refers to saturated cyclic hydrocarbon groups containing the indicated number of ring carbon atoms. Examples include cyclopropyl, cyclobutyl, cyclopentyl, cyclohexyl, cycloheptyl.

The term "aryl" refers to mono cyclic carbon ring systems which have 6 ring atoms wherein the ring is aromatic. Examples of suitable aryl monocyclic ring systems include, for instance, phenyl.

The term "heteroaryl" refers to a mono- or bi-cyclic aromatic group containing one or more heteroatoms selected from S, N and O, and includes groups having two such monocyclic rings, or one such monocyclic ring and one monocyclic aryl ring, which are fused through a common bond.

A bond pointing to a wavy or squiggly line, such as

as used in structural formulas herein, depicts the bond that is the point of attachment of the moiety or substituent to the core or backbone structure.

A dash ("–") that is not between two letters or symbols is meant to represent the point of attachment for a substituent.

Whenever basic amino or quaternary ammonium groups are present in the compounds of formula I, physiologically acceptable anions may be present, selected among chloride, bromide, iodide, trifluoroacetate, formate, sulfate, phosphate, methanesulfonate, nitrate, maleate, acetate, citrate, fumarate, tartrate, oxalate, succinate, benzoate, p-toluenesulfonate, pamoate and naphthalene disulfonate. Likewise, in the presence of acidic groups such as COOH groups, corresponding physiological cation salts may be present as well, for instance including alkaline or alkaline earth metal ions.

As above indicated, the present invention refers to a series of compounds represented by the general formula (I) as herein below described in details, which are endowed with an antagonist property versus receptor LPA1.

Differently from similar compounds of the prior art, the compounds of formula (I) of the present invention are able to act as antagonist LPA1 in a substantive and effective way, particularly appreciated by the skilled person when looking at a suitable and efficacious compounds useful for the treatment of fibrosis, in particular idiopatic pulmonary fibrosis.

As indicated in the experimental part, the compounds of formula (I) of the invention have an activity as shown in Table 4, wherein for each compound is reported the potency expressed as half maximal inhibitory concentration ($IC_{50}$) on receptors.

As it can be appreciated, all the compounds of the present invention according to Table 4, show a potency with respect to their inhibitory activity on receptor LPA1 below 600 nM, preferably below 250 nM and more preferably below 50 nM.

More advantageously, beyond the antagonist property versus receptor LPA1, the compounds of the present invention are also endowed with a suitable BSEP profile, that is relevant for the progression of any drug candidate.

The bile salt export pump (BSEP) is an efflux transporter located on the canalicular membrane of hepatic cells and is the primary transporter of bile acids from the hepatocyte to the biliary system. Together with other hepatic transporters of uptake and efflux, it is involved in the homeostasis of bile salts.

In the last decade, BSEP inhibition has emerged as an important mechanism that may contribute to the initiation of human drug-induced liver injury and therefore it is important to consider BSEP inhibition alongside when considering the risk of possible acute drug-induced liver failure.

BSEP inhibition was evaluated using human hepatocytes cultured between two layer of collagen (sandwich configuration). In this culture condition, hepatocytes express relevant transporters including BSEP and retain the bile canalicular structure. An inhibition of the biliary clearance of Taurocolic Acid (TCA), a known BSEP substrate, was used to assess BSEP interaction.

The compounds of formula (I) of the present invention are characterized by an in vitro BSEP inhibition at 50 µM≤50% that can be considered suitable and acceptable from a safety point of view, as shown in Table 5.

Even more advantageously, the compounds of formula (I) of the present invention are also endowed with a good permeability profile that, in its turn, can ensure a suitable bioavailability for an oral administration. The permeability was assessed in human Caco 2 cell line, an in vitro model that mimic human gastrointestinal barrier and so useful to predic oral absorption. A passive permeability value ≥15 nm/sec is considered suitable for an oral administration, as shown in Table 6.

Thus, in one aspect the present invention relates to a compound of general formula (I) as LPA1 antagonist

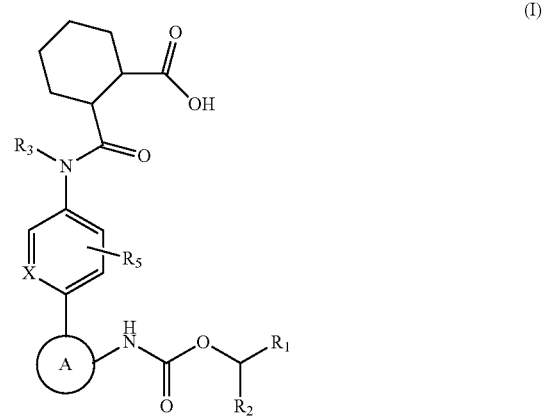

wherein X is $CR_5$, —CH— or N,
A is selected from the group consisting of

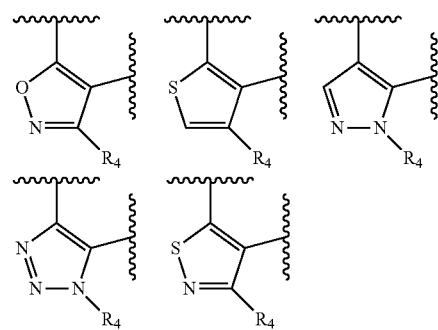

$R_1$ is selected from the group consisting of aryl, $(C_3-C_6)$ cycloalkyl, heterocycloalkyl, heteroaryl and $(C_1-C_4)$ alkyl wherein any of such aryl, heteroaryl, cycloalkyl, heterocycloalkyl and alkyl may be optionally substituted by one or more groups selected from $(C_1-C_4)$ alkyl, halo, $(C_1-C_4)$haloalkyl, CN, —O$(C_1-C_4)$alkyl, —$NR_6R_7$;

$R_2$ is H or $(C_1-C_4)$alkyl;

$R_3$ is H or $(C_1-C_4)$alkyl, $R_4$ is H or $(C_1-C_4)$alkyl.

$R_5$ is H or selected from the group consisting of $(C_1-C_4)$ alkyl, halo and CN;

$R_6$ and $R_7$ are at each occurrence independently H or selected from the group consisting of $(C_1-C_4)$alkyl, $(C_1-C_6)$haloalkyl and halo, or $R_6$ and $R_7$ may form together with the nitrogen atom to which they are attached a 4-6 membered saturated heterocyclic ring system optionally containing a further heteroatom selected from N, S and O, said heterocyclic ring system may be optionally substituted by one or more groups selected from $(C_1-C_4)$alkyl, $(C_1-C_4)$ haloalkyl and halo, with the proviso that when A is

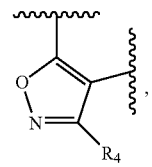

X is N.

The invention further concerns the corresponding deuterated derivatives of compounds of formula (I).

In a preferred embodiment, the invention refers to at least one of the compounds listed in the Table 1 below and pharmaceutical acceptable salts thereof.

TABLE 1

| | List of preferred compounds of Formula (I) | |
|---|---|---|
| Ex. No. | Structure | Chemical Name |
| Example 1 | | (1S,2S)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid |
| Example 2 | | (1S,2S)-2-((6-(5-((((R)-1-(2-chlorophenyl)ethoxy)carbonyl)amino)-1-methyl-1H-pyrazol-4-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 3 | | (1S,2S)-2-((6-(5-((((R)-1-(2-chlorophenyl)ethoxy)carbonyl)amino)-1-methyl-1H-1,2,3-triazol-4-yl)-2-methylpyridin-3-yl)carbamoyl)cyclohexane-1-carboxylic acid |
| Example 4 | | Single Diastereomer 2 of Trans-2-((4-(5-((((R)-1-(2-chlorophenyl)ethoxy)carbonyl)amino)-1-methyl-1H-pyrazol-4-yl)phenyl)carbamoyl)cyclohexane-1-carboxylic acid |
| Example 5 | | Single Diastereomer 1 of Trans-2-((4-(5-((((R)-1-(2-chlorophenyl)ethoxy)carbonyl)amino)-1-methyl-1H-pyrazol-4-yl)phenyl)carbamoyl)cyclohexane-1-carboxylic acid |

TABLE 1-continued

List of preferred compounds of Formula (I)

| Ex. No. | Structure | Chemical Name |
| --- | --- | --- |
| Example 6 | | Cis-2-((4-(3-((((R)-1-(2-chlorophenyl)ethoxy)carbonyl)amino)thiophen-2-yl)phenyl)carbamoyl)cyclohexane-1-carboxylic acid |
| Example 7 | | Single Diastereomer 1 of Cis-2-((4-(3-((((R)-1-(2-chlorophenyl)ethoxy)carbonyl)amino)thiophen-2-yl)phenyl)carbamoyl)cyclohexane-1-carboxylic acid |
| Example 8 | | Single Diastereomer 2 of Cis-2-((4-(3-((((R)-1-(2-chlorophenyl)ethoxy)carbonyl)amino)thiophen-2-yl)phenyl)carbamoyl)cyclohexane-1-carboxylic acid |

TABLE 1-continued

List of preferred compounds of Formula (I)

| Ex. No. | Structure | Chemical Name |
|---|---|---|
| Example 9 | | Trans-2-((4-(3-((((R)-1-(2-chlorophenyl)ethoxy)carbonyl)amino)thiophen-2-yl)phenyl)carbamoyl)cyclohexane-1-carboxylic acid |
| Example 10 | | Single Diastereomer 1 of Trans-2-((4-(3-((((R)-1-(2-chlorophenyl)ethoxy)carbonyl)amino)thiophen-2-yl)phenyl)carbamoyl)cyclohexane-1-carboxylic acid |
| Example 11 | | (1S,2S)-2-((6-(4-((((R)-1-(2-chloropyridin-3-yl)ethoxy)carbonyl)amino)-3-methylisoxazol-5-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
| --- | --- | --- |
| Example 12 | | (1R,2R)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid |
| Example 13 | | Single Diastereomer 2 of Cis-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid |
| Example 14 | | Single Diastereomer 1 of Cis-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 15 | | (1S,2S)-2-((2-methyl-6-(3-methyl-4-((((R)-1-(pyridin-3-yl)ethoxy)carbonyl)amino)isoxazol-5-yl)pyridin-3-yl)carbamoyl)cyclohexane-1-carboxylic acid |
| Example 16 | | (1S,2S)-2-((6-(4-((((R)-1-(2-chlorophenyl)ethoxy)carbonyl)amino)-3-methylisoxazol-5-yl)pyridin-3-yl)carbamoyl)cyclohexane-1-carboxylic acid |
| Example 17 | | (1S,2S)-2-((6-(4-(((1-(2-fluoropyridin-3-yl)ethoxy)carbonyl)amino)-3-methylisoxazol-5-yl)pyridin-3-yl)carabamoyl)cyclohexane--1-carboxylic acid |

TABLE 1-continued

List of preferred compounds of Formula (I)

| Ex. No. | Structure | Chemical Name |
|---|---|---|
| Example 18 | | Single Diastereomer 1 of (1S,2S)-2-((6-(4-(((1-(2-fluoropyridin-3-yl)ethoxy)carbonyl)amino)-3-methylisoxazol-5-yl)pyridin-3-yl)carbamoyl)cyclohexane-1-carboxylic acid |
| Example 19 | | (1S,2S)-2-((6-(4-(((1-(2-fluoropyridin-3-yl)ethoxy)carbonyl)amino)-3-methylisoxazol-5-yl)-2-methylpyridin-3-yl)carbamoyl)cyclohexane-1-carboxylic acid |
| Example 20 | | Single Diastereomer 2 of (1S,2S)-2-((6-(4-(((-1-(2-fluropyridin-3-yl)ethoxy)carbonyl)amino)-3-methylisoxazol-5-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
| --- | --- | --- |
| Example 21 | | (1S,2S)-2-((6-(3-((((R)-1-(2-chlorophenyl)ethoxy)carbonyl)amino)thiophen-2-yl)pyridin-3-yl)carbamoyl)cyclohexane-1-carboxylic acid |
| Example 22 | | (1S,2S)-2-((2-methyl-6-(3-methyl-4-((((R)-1-(thiazol-2-yl)ethoxy)carbonyl)amino)isoxazol-5-yl)pyridin-3-yl)carbamoyl)cyclohexane-1-carboxylic acid |
| Example 23 | | (1S,2S)-2-((4-(5-((((R)-1-(2-chlorophenyl)ethoxy)carbonyl)amino)-1-methyl-1H-1,2,3-triazol-4-yl)phenyl)carbamoyl)cyclohexane-1-carboxylic acid |

TABLE 1-continued

List of preferred compounds of Formula (I)

| Ex. No. | Structure | Chemical Name |
|---|---|---|
| Example 24 | | (1S,2S)-2-((6-(4-((((R)-1-(2-fluorophenyl)ethoxy)carbonyl)amino)-3-methylisoxazol-5-yl)-2-methylpyridin-3-yl)carbamoyl)cyclohexane-1-carboxylic acid |
| Example 25 | | (1S,2S)-2-((2-methyl-6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylic acid |
| Example 26 | | (1S,2S)-2-((6-(4-((((R)-1-cyclopentylethoxy)carbonyl)amino)-3-methylisoxazol-5-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
| --- | --- | --- |
| Example 27 | | (1S,2S)-2-((2-methyl-6-(3-methyl-4-((((R)-1-phenylethoxy)carbonyl)amino)isoxazol-5-yl)pyridin-3-yl)carbamoyl)cyclohexane-1-carboxylic acid |
| Example 28 | | (1S,2S)-2-((6-(4-((((R)-1-(2-bromophenyl)ethoxy)carbonyl)amino)-3-methylisoxazol-5-yl)-2-methylpyridin-3-yl)carbamoyl)cyclohexane-1-carboxylic acid |
| Example 29 | | (1S,2S)-2-((6-(4-((((R)-1-(2-chloropyridin-3-yl)ethoxy)carbonyl)amino)-3-methylisoxazol-5-yl)pyridin-3-yl)carbamoyl)cyclohexane-1-carboxylic acid |

TABLE 1-continued

List of preferred compounds of Formula (I)

| Ex. No. | Structure | Chemical Name |
| --- | --- | --- |
| Example 30 | | (1S,2S)-2-((6-(4-((((R)-1-(2-chloropyridin-3-yl)ethoxy)carbonyl)amino)-3-methylisoxazol-5-yl)pyridin-3-yl)(methyl)carbamoyl)cyclohexane-1-carboxylic acid |
| Example 31 | | (1S,2S)-2-((6-(4-((((R)-1-(2-chlorophenyl)ethoxy)carbonyl)amino)-3-methylisoxazol-5-yl)-5-fluoropyridin-3-yl)carbamoyl)cyclohexane-1-carboxylic acid |
| Example 32 | | (1S,2S)-2-((2-methyl-6-(3-methyl-4-((((R)-1-(o-tolyl)ethoxy)carbonyl)amino)isoxazol-5-yl)pyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 33 | | Cis-2-((2-methyl-6-(3-methyl-4-((((R)-1-(pyridin-3-yl)ethoxy)carbonyl)amino)isoxazol-5-yl)pyridin-3-yl)carbamoyl)cyclohexane-1-carboxylic acid |
| Example 34 | | (1S,2S)-2-((6-(4-((((R)-1-(2-fluorophenyl)ethoxy)carbonyl)amino)-3-methylisoxazol-5-yl)pyridin-3-yl)carbamoyl)cyclohexane-1-carboxylic acid |
| Example 35 | | (1S,2S)-2-((6-(4-((((2-chlorobenzyl)oxy)carbonyl)amino)-3-methylisoxazol-5-yl)pyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 36 | | (1S,2S)-2-((6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylic acid |
| Example 37 | | (1S,2S)-2-((6-(4-((((R)-1-(2-methoxyphenyl)ethoxy)carbonyl)amino)-3-methylisoxazol-5-yl)pyridin-3-yl)carbamoyl)cyclohexane-1-carboxylic acid |
| Example 38 | | (1S,2S)-2-((6-(4-((((R)-1-(2-methoxyphenyl)ethoxy)carbonyl)amino)-3-methylisoxazol-5-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 39 | | Cis-2-((2-methyl-6-(3-methyl-4-((((R)-1-phenylethoxy)carbonyl)amino)isoxazol-5-yl)pyridin-3-yl)carbamoyl)cyclohexane-1-carboxylic acid |
| Example 40 | | Cis-2-((6-(3-methyl-4-((((R)-1-phenylethoxy)carbonyl)amino)isoxazol-5-yl)pyridin-3-yl)carbamoyl)cyclohexane-1-carboxylic acid |
| Example 41 | | (1S,2S)-2-((6-(3-methyl-4-((((R)-1-phenylethoxy)carbonyl)amino)isoxazol-5-yl)pyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 42 | | (1S,2S)-2-((6-(4-((((R)-1-(2-chlorophenyl)ethoxy)carbonyl)amino)-3-methylisothiazol-5-yl)-2-methylpyridin-3-yl)carbamoyl)cyclohexane-1-carboxylic acid |
| Example 43 | | (1S,2S)-2-((2-methyl-6-(1-methyl-5-((((R)-1-phenylethoxy)carbonyl)amino)-1H-pyrazol-4-yl)pyridin-3-yl)carbamoyl)cyclohexane-1-carboxylic acid |
| Example 44 | | (1S,2S)-2-((2-methyl-6-(1-methyl-5-((((R)-1-phenylethoxy)carbonyl)amino)-1H-1,2,3-triazol-4-yl)pyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 45 | | (1S,2S)-2-((2-methyl-6-(1-methyl-5-((((R)-1-(2-(trifluoromethyl)phenyl)ethoxy)carbonyl)amino)-1H-1,2,3-triazol-4-yl)pyridin-3-yl)carbamoyl)cyclohexane-1-carboxylic acid |
| Example 46 | | (1S,2S)-2-((6-(5-((((R)-1-cyclopentylethoxy)carbonyl)amino)-1-methyl-1H-1,2,3-triazol-4-yl)-2-methylpyridin-3-yl)carbamoyl)cyclohexane-1-carboxylic acid |
| Example 47 | | (1S,2S)-2-((6-(5-((((R)-1-(2-fluorophenyl)ethoxy)carbonyl)amino)-1-methyl-1H-1,2,3-triazol-4-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
|---|---|---|
| Example 48 | | (1S,2S)-2-((6-(5-((((R)-1-(2-chlorophenyl)ethoxy)carbonyl)amino)-1-methyl-1H-1,2,3-triazol-4-yl)-2-methylpyridin-3-yl)carbamoyl)cyclohexane-1-carboxylic acid |
| Example 49 | | (1S,2S)-2-((2-methyl-6-(3-methyl-4-(((((R)-pentan-2-yl)oxy)carbonyl)amino)isoxazol-5-yl)pyridin-3-yl)carbamoyl)cyclohexane-1-carboxylic acid |
| Example 50 | | (1S,2S)-2-((6-(5-((((R)-1-(2-fluorophenyl)ethoxy)carbonyl)amino)-1-methyl-1H-pyrazol-4-yl)-2-methylpyridin-3-yl)carbamoyl)cyclohexane-1-carboxylic acid |

TABLE 1-continued

List of preferred compounds of Formula (I)

| Ex. No. | Structure | Chemical Name |
| --- | --- | --- |
| Example 51 | | (1S,2S)-2-((6-(5-((((R)-1-cyclopentylethoxy)carbonyl)amino)-1-methyl-1H-pyrazol-4-yl)-2-methylpyridin-3-yl)carbamoyl)cyclohexane-1-carboxylic acid |
| Example 52 | | (1S,2S)-2-((2-methyl-6-(1-methyl-5-(((((R)-pentan-2-yl)oxy)carbonyl)amino)-1H-1,2,3-triazol-4-yl)pyridin-3-yl)carbamoyl)cyclohexane-1-carboxylic acid |
| Example 53 | | (1S,2S)-2-((6-(5-((((R)-1-(2-chlorophenyl)ethoxy)carbonyl)amino)-1-methyl-1H-1,2,3-triazol-4-yl)-2-fluoropyridin-3-yl)carbamoyl)cyclohexane-1-carboxylic acid |

In one preferred embodiment, the invention refers to a compound of formula (I),
wherein A is

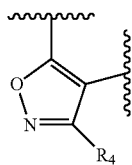

and X is N, represented by the formula Ia

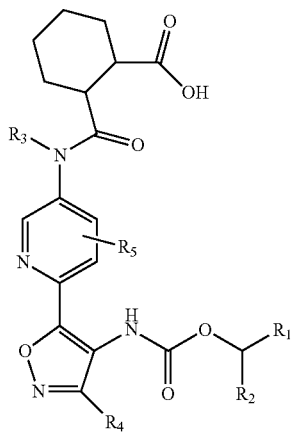

(Ia)

wherein
R₁ is selected from the group consisting of aryl, $(C_3-C_6)$ cycloalkyl, heterocycloalkyl, heteroaryl and $(C_1-C_4)$ alkyl wherein any of such aryl, heteroaryl, cycloalkyl, heterocycloalkyl and alkyl may be optionally substituted by one or more groups selected from $(C_1-C_4)$ alkyl, halo, $(C_1-C_4)$haloalkyl, CN, —O$(C_1-C_4)$alkyl, —NR₆R₇;

R₂ is H or $(C_1-C_4)$alkyl;
R₃ is H or $(C_1-C_4)$alkyl,
R₄ is H or $(C_1-C_4)$alkyl.
R₅ is H or selected from the group consisting of $(C_1-C_4)$ alkyl, halo and CN;
R₆ and R₇ are at each occurrence independently H or selected from the group consisting of $(C_1-C_4)$alkyl, $(C_1-C_6)$haloalkyl and halo, or
R₆ and R₇ may form together with the nitrogen atom to which they are attached a 4-6 membered saturated heterocyclic ring system optionally containing a further heteroatom selected from N, S and O, said heterocyclic ring system may be optionally substituted by one or more groups selected from $(C_1-C_4)$alkyl, $(C_1-C_4)$ haloalkyl and halo.

In one preferred embodiment, the invention refers to compound of formula (Ia), wherein R₁ is selected from the group consisting of aryl, $(C_4-C_6)$cycloalkyl, heterocycloalkyl, and heteroaryl, wherein any of such aryl and heteroaryl is optionally substituted by one or more groups selected from $(C_1-C_4)$alkyl, halo, $(C_1-C_4)$haloalkyl, CN;

R₂ is H or $(C_1-C_4)$alkyl;
R₃ is H or $(C_1-C_4)$alkyl,
R₄ is H or $(C_1-C_4)$alkyl.
R₅ is H or $(C_1-C_4)$alkyl and halo.

In a still preferred embodiment, the invention refers to at least one of the compounds listed in the Table 2 below and pharmaceutical acceptable salts thereof.

TABLE 2

List of preferred compounds of Formula (Ia)

| Ex. No. | Structure | Chemical Name |
|---|---|---|
| Example 1 |  | (1S,2S)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid |

TABLE 2-continued

List of preferred compounds of Formula (Ia)

| Ex. No. | Structure | Chemical Name |
|---|---|---|
| Example 11 | | (1S,2S)-2-((6-(4-((((R)-1-(2-chloropyridin-3-yl)ethoxy)carbonyl)amino)-3-methylisoxazol-5-yl)-2-methylpyridin-3-yl)carbamoyl)cyclohexane-1-carboxylic acid |
| Example 12 | | (1R,2R)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid |
| Example 13 | | Single Diastereomer 2 of Cis-2-((6-(4-((((R)-1-(2-chlorophenyl)ethoxy)carbonyl)amino)-3-methylisoxaozl-5-yl)-2-methylpyridin-3-yl)carbamoyl)cyclohexane-1-carboxylic acid |

TABLE 2-continued

List of preferred compounds of Formula (Ia)

| Ex. No. | Structure | Chemical Name |
| --- | --- | --- |
| Example 14 | | Single Diastereomer 1 of Cis-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid |
| Example 15 | | (1S,2S)-2-((2-methyl-6-(3-methyl-4-((((R)-1-(pyridin-3-yl)ethoxy)carbonyl)amino)isoxazol-5-yl)pyridin-3-yl)carbamoyl)cyclohexane-1-carboxylic acid |
| Example 16 | | (1S,2S)-2-((6-(4-((((R)-1-(2-chlorophenyl)ethoxy)carbonyl)amino)-3-methylisoxazol-5-yl)pyridin-3-yl)carbamoyl)cyclohexane-1-carboxylic acid |

TABLE 2-continued

List of preferred compounds of Formula (Ia)

| Ex. No. | Structure | Chemical Name |
|---|---|---|
| Example 17 | | (1S,2S)-2-((6-(4-(((1-(2-fluoropyridin-3-yl)ethoxy)carbonyl)amino)-3-methylisoxazol-5-yl)pyridin-3-yl)carbamoyl)cyclohexane-1-carboxylic acid |
| Example 18 | | Single Diastereomer 1 of (1S,2S)-2-((6-(4-(((1-(2-fluoropyridin-3-yl)ethoxy)carbonyl)amino)-3-methylisoxazol-5-yl)pyridin-3-yl)carbamoyl)cyclohexane-1-carboxylic acid |
| Example 19 | | (1S,2S)-2-((6-(4-(((1-(2-fluoropyridin-3-yl)ethoxy)carbonyl)amino)-3-methylisoxazol-5-yl)-2-methylpyridin-3-yl)carbamoyl)cyclohexane-1-carboxylic acid |

TABLE 2-continued

List of preferred compounds of Formula (Ia)

| Ex. No. | Structure | Chemical Name |
| --- | --- | --- |
| Example 20 | | Single Diastereomer 2 of (1S,2S)-2-((6-(4-(((()-1-(2-fluoropyridin-3-yl)ethoxy)carbonyl)amino)-3-methylisoxazol-5-yl)-2-methylpyridin-3-yl)carbamoyl)cyclohexane-1-carboxylic acid |
| Example 22 | | (1S,2S)-2-((2-methyl-6-(3-methyl-4-((((R)-1-(thiazol-2-yl)ethoxy)carbonyl)amino)isoxazol-5-yl)pyridin-3-yl)carbamoyl)cyclohexane-1-carboxylic acid |
| Example 24 | | (1S,2S)-2-((6-(4-((((R)-1-(2-fluorophenyl)ethoxy)carbonyl)amino)-3-methylisoxazol-5-yl)-2-methylpyridin-3-yl)carbamoyl)cyclohexane-1-carboxylic acid |

TABLE 2-continued

List of preferred compounds of Formula (Ia)

| Ex. No. | Structure | Chemical Name |
| --- | --- | --- |
| Example 25 | | (1S,2S)-2-((2-methyl-6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylic acid |
| Example 26 | | (1S,2S)-2-((6-(4-((((R)-1-cyclopentylethoxy)carbonyl)amino)-3-methylisoxazol-5-yl)-2-methylpyridin-3-yl)carbamoyl)cyclohexane-1-carboxylic acid |
| Example 27 | | (1S,2S)-2-((2-methyl-6-(3-methyl-4-((((R)-1-phenylethoxy)carbonyl)amino)isoxazol-5-yl)pyridin-3-yl)carbamoyl)cyclohexane-1-carboxylic acid |

TABLE 2-continued

List of preferred compounds of Formula (Ia)

| Ex. No. | Structure | Chemical Name |
| --- | --- | --- |
| Example 28 | | (1S,2S)-2-((6-(4-((((R)-1-(2-bromophenyl)ethoxy)carbonyl)amino)-3-methylisoxazol-5-yl)-2-methylpyridin-3-yl)carbamoyl)cyclohexane-1-carboxylic acid |
| Example 29 | | (1S,2S)-2-((6-(4-((((R)-1-(2-chloropyridin-3-yl)ethoxy)carbonyl)amino)-3-methylisoxazol-5-y)pyridin-3-yl)carbamoyl)cyclohexane-1-carboxylic acid |
| Example 30 | | (1S,2S)-2-((6-(4-((((R)-1-(2-chloropyridin-3-yl)ethoxy)carbonyl)amino)-3-methylisoxazol-5-yl)pyridin-3-y)(methyl)carbamoyl)cyclohexane-1-carboxylic acid |

TABLE 2-continued

List of preferred compounds of Formula (Ia)

| Ex. No. | Structure | Chemical Name |
| --- | --- | --- |
| Example 31 | | (1S,2S)-2-((6-(4-((((R)-1-(2-chlorophenyl)ethoxy)carbonyl)amino)-3-methylisoxazol-5-yl)-5-fluoropyridin-3-yl)carbamoyl)cyclohexane-1-carboxylic acid |
| Example 32 | | (1S,2S)-2-((2-methyl-6-(3-methyl-4-((((R)-1-(o-tolyl)ethoxy)carbonyl)amino)isoxazol-5-yl)pyridin-3-yl)carbamoyl)cyclohexane-1-carboxylic acid |
| Example 33 | | Cis-2-((2-methyl-6-(3-methyl-4-((((R)-1-(pyridin-3-yl)ethoxy)carbonyl)amino)isoxazol-5-yl)pyridin-3-yl)carbamoyl)cyclohexane-1-carboxylic acid |

TABLE 2-continued

List of preferred compounds of Formula (Ia)

| Ex. No. | Structure | Chemical Name |
| --- | --- | --- |
| Example 34 | | (1S,2S)-2-((6-(4-((((R)-1-(2-fluorophenyl)ethoxy)carbonyl)amino)-3-methylisoxazol-5-yl)pyridin-3-yl)carbamoyl)cyclohexane-1-carboxylic acid |
| Example 35 | | (1S,2S)-2-((6-(4-((((2-chlorobenzyl)oxy)carbonyl)amino)-3-methylisoxazol-5-yl)pyridin-3-yl)carbamoyl)cyclohexane-1-carboxylic acid |
| Example 36 | | (1S,2S)-2-((6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylic acid |

TABLE 2-continued

List of preferred compounds of Formula (Ia)

| Ex. No. | Structure | Chemical Name |
|---|---|---|
| Example 37 | | (1S,2S)-2-((6-(4-((((R)-1-(2-methoxyphenyl)ethoxy)carbonyl)amino)-3-methylisoxazol-5-yl)pyridin-3-yl)carbamoyl)cyclohexane-1-carboxylic acid |
| Example 38 | | (1S,2S)-2-((6-(4-((((R)-1-(2-methoxyphenyl)ethoxy)carbonyl)amino)-3-methylisoxazol-5-yl)-2-methylpyridin-3-yl)carbamoyl)cyclohexane-1-carboxylic acid |
| Example 39 | | Cis-2-((2-methyl-6-(3-methyl-4-((((R)-1-phenylethoxy)carbonyl)amino)isoxazol-5-yl)pyridin-3-yL)carbamoyl)cyclohexane-1-carboxylic acid |

TABLE 2-continued

List of preferred compounds of Formula (Ia)

| Ex. No. | Structure | Chemical Name |
| --- | --- | --- |
| Example 40 | | Cis-2-((6-(3-methyl-4-((((R)-1-phenylethoxy)carbonyl)amino)isoxazol-5-yl)pyridin-3-yl)carbamoyl)cyclohexane-1-carboxylic acid |
| Example 41 | | (1S,2S)-2-((6-(3-methyl-4-((((R)-1-phenylethoxy)carbonyl)amino)isoxazol-5-yl)pyridin-3-yl)carbamoyl)cyclohexane-1-carboxylic acid |
| Example 49 | | (1S,2S)-2-((2-methyl-6-(3-methyl-4-(((((R)-pentan-2-yl)oxy)carbonyl)amino)isoxazol-5-yl)pyridin-3-yl)carbamoyl)cyclohexane-1-carboxylic acid |

In a further preferred embodiment, the invention refers to a compound of formula (I),

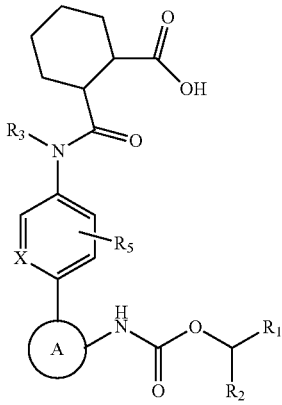

wherein X is CR₅, —CH— or N,

A is selected from the group consisting of

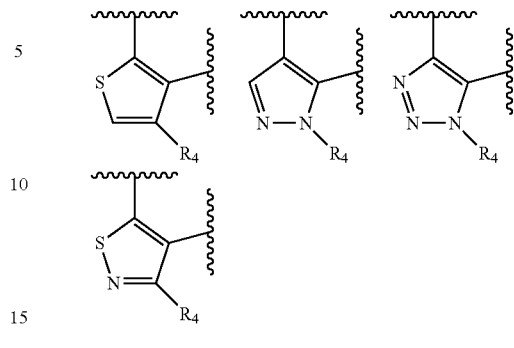

$R_1$ is selected from the group consisting of aryl, ($C_4$-$C_6$) cycloalkyl, heterocycloalkyl, and heteroaryl, wherein any of such aryl and heteroaryl is optionally substituted by one or more groups selected from ($C_1$-$C_4$)alkyl, halo, ($C_1$-$C_4$)haloalkyl, CN;

$R_2$ is ($C_1$-$C_4$)alkyl;

$R_3$ is H or ($C_1$-$C_4$)alkyl, $R_4$ is H or ($C_1$-$C_4$)alkyl.

$R_5$ is H or ($C_1$-$C_4$)alkyl.

In a still preferred embodiment, the invention refers to at least one of the compounds listed in the Table 3 below and pharmaceutical acceptable salts thereof.

TABLE 3

List of preferred compounds of Formula (I)

| Ex. No. | Structure | Chemical Name |
|---------|-----------|---------------|
| Example 2 |  | (1S,2S)-2-((6-(5-((((R)-1-(2-chlorophenyl)ethoxy)carbonyl)amino)-1-methyl-1H-pyrazol-4-yl)-2-methylpyridin-3-yl)carbamoyl)cyclohexane-1-carboxylic acid |

TABLE 3-continued

List of preferred compounds of Formula (I)

| Ex. No. | Structure | Chemical Name |
| --- | --- | --- |
| Example 3 | | (1S,2S)-2-((6-(5-((((R)-1-(2-chlorophenyl)ethoxy)carbonyl)amino)-1-methyl-1H-1,2,3-triazol-4-yl)-2-methylpyridin-3-yl)carbamoyl)cyclohexane-1-carboxylic acid |
| Example 4 | | Single Diastereomer 2 of Trans-2-((4-(5-((((R)-1-(2-chlorophenyl)ethoxy)carbonyl)amino)-1-methyl-1H-pyrazol-4-yl)phenyl)carbamoyl)cyclohexane-1-carboxylic acid |
| Example 5 | | Single Diastereomer 1 of Trans-2-((4-(5-((((R)-1-(2-chlorophenyl)ethoxy)carbonyl)amino)-1-methyl-1H-pyrazol-4-yl)phenyl)carbamoyl)cyclohexane-1-carboxylic acid |

TABLE 3-continued

List of preferred compounds of Formula (I)

| Ex. No. | Structure | Chemical Name |
|---|---|---|
| Example 6 | | Cis-2-((4-(3-((((R)-1-(2-chlorophenyl)ethoxy)carbonyl)amino)thiophen-2-yl)phenyl)carbamoyl)cyclohexane-1-carboxylic acid |
| Example 7 | | Single Diastereomer 1 of Cis-2-((4-(3-((((R)-1-(2-chlorophenyl)ethoxy)carbonyl)amino)thiophen-2-yl)phenyl)carbamoyl)cyclohexane-1-carboxylic acid |
| Example 8 | | Single Diastereomer 2 of Cis-2-((4-(3-((((R)-1-(2-chlorophenyl)ethoxy)carbonyl)amino)thiophen-2-yl)phenyl)carbamoyl)cyclohexane-1-carboxylic acid |

TABLE 3-continued

List of preferred compounds of Formula (I)

| Ex. No. | Structure | Chemical Name |
| --- | --- | --- |
| Example 9 | | Trans-2-((4-(3-((((R)-1-(2-chlorophenyl)ethoxy)carbonyl)amino)thiophen-2-yl)phenyl)carbamoyl)cyclohexane-1-carboxylic acid |
| Example 10 | | Single Diastereomer 1 of Trans-2-((4-(3-((((R)-1-(2-chlorophenyl)ethoxy)carbonyl)amino)thiophen-2-yl)phenyl)carbamoyl)cyclohexane-1-carboxylic acid |
| Example 21 | | (1S,2S)-2-((6-(3-((((R)-1-(2-chlorophenyl)ethoxy)carbonyl)amino)thiophen-2-yl)pyridin-3-yl)carbamoyl)cyclohexane-1-carboxylic acid |

TABLE 3-continued

List of preferred compounds of Formula (I)

| Ex. No. | Structure | Chemical Name |
|---|---|---|
| Example 23 | | (1S,2S)-2-((4-(5-((((R)-1-(2-chlorophenyl)ethoxy)carbonyl)amino)-1-methyl-1H-1,2,3-triazol-4-yl)phenyl)carbamoyl)cyclohexane-1-carboxylic acid |
| Example 42 | | (1S,2S)-2-((6-(4-((((R)-1-(2-chlorophenyl)ethoxy)carbonyl)amino)-3-methylisothiazol-5-yl)-2-methylpyridin-3-yl)carbamoyl)cyclohexane-1-carboxylic acid |
| Example 43 | | (1S,2S)-2-((2-methyl-6-(1-methyl-5-((((R)-1-phenylethoxy)carbonyl)amino)-1H-pyrazol-4-yl)pyridin-3-yl)carbamoyl)cyclohexane-1-carboxylic acid |

TABLE 3-continued

List of preferred compounds of Formula (I)

| Ex. No. | Structure | Chemical Name |
| --- | --- | --- |
| Example 44 | | (1S,2S)-2-((2-methyl-6-(1-methyl-5-((((R)-1-phenylethoxy)carbonyl)amino)-1H-1,2,3-triazol-4-yl)pyridin-3-yl)carbamoyl)cyclohexane-1-carboxylic acid |
| Example 45 | | (1S,2S)-2-((2-methyl-6-(1-methyl-5-((((R)-1-(2-(trifluoromethyl)phenyl)ethoxy)carbonyl)amino)-1H-1,2,3-triazol-4-yl)pyridin-3-yl)carbamoyl)cyclohexane-1-carboxylic acid |
| Example 46 | | (1S,2S)-2-((6-(5-((((R)-1-cyclopentylethoxy)carbonyl)amino)-1-methyl-1H-1,2,3-triazol-4-yl)-2-methylpyridin-3-yl)carbamoyl)cyclohexane-1-carboxylic acid |

TABLE 3-continued

List of preferred compounds of Formula (I)

| Ex. No. | Structure | Chemical Name |
| --- | --- | --- |
| Example 47 | | (1S,2S)-2-((6-(5-((((R)-1-(2-fluorophenyl)ethoxy)carbonyl)amino)-1-methyl-1H-1,2,3-triazol-4-y)-2-methylpyridin-3-yl)carbamoyl)cyclohexane-1-carboxylic acid |
| Example 48 | | (1S,2S)-2-((6-(5-((((R)-1-(2-chlorophenyl)ethoxy)carbonyl)amino)-1-ethyl-1H-1,2,3-triazol-4-yl)-2-methylpyridin-3-yl)carbamoyl)cyclohexane-1-carboxylic acid |
| Example 50 | | (1S,2S)-2-((6-(5-((((R)-1-(2-fluorophenyl)ethoxy)carbonyl)amino)-1-methyl-1H-pyrazol-4-yl)-2-methylpyridin-3-yl)carbamoyl)cyclohexane-1-carboxylic acid |

TABLE 3-continued

List of preferred compounds of Formula (I)

| Ex. No. | Structure | Chemical Name |
|---|---|---|
| Example 51 | | (1S,2S)-2-((6-(5-((((R)-1-cyclopentylethoxy)carbonyl)amino)-1-methyl-1H-pyrazol-4-yl)-2-methylpyridin-3-yl)carbamoyl)cyclohexane-1-carboxylic acid |
| Example 52 | | (1S,2S)-2-((2-methyl-6-(1-methyl-5-(((((R)-pentan-2-yl)oxy)carbonyl)amino)-1H-1,2,3-triazol-4-yl)pyridin-3-yl)carbamoyl)cyclohexane-1-carboxylic acid |
| Example 53 | | (1S,2S)-2-((6-(5-((((R)-1-(2-chlorophenyl)ethoxy)carbonyl)amino)-1-methyl-1H-1,2,3-triazol-4-yl)-2-fluoropyridin-3-yl)carbamoyl)cyclohexane-1-carboxylic acid |

It has been surprisingly found that the above indicated compounds are particularly effective as antagonists of LPA1 receptor, as e.g. indicated on Table 4 of the herein below experimental part.

In this respect, it has now been found that the compounds of formula (I) of the present invention have an antagonist drug potency expressed as half maximal inhibitory concentration ($IC_{50}$) on LPA1 lesser than 600 nM.

Preferably, the compounds of the present invention have an $IC_{50}$ on LPA1 lesser or equal than 250 nM.

More preferably, the compounds of the present invention have an $IC_{50}$ on LPA1 lesser or equal than 50 nM.

The compounds of the present invention are also characterized by a BSEP inhibition at 50 $\mu M \leq 50\%$.

The compounds of the invention are also characterized by a passive permeability value $\geq 15$ nm/sec.

In one aspect, the present invention refers to a compound of formula (I) for use as a medicament. Thus, the invention refers to a compound of formula (I) in the preparation of a medicament, preferably for use in the treatment of disorders associated with LPA receptors mechanism.

In a preferred embodiment, the invention refers to a compound of formula (I) for use in the treatment of disorders associated with LPA receptors mechanism.

In a further embodiment, the present invention refers to a compound of formula (I) for use in the treatment of a disease, disorder or condition associated with dysregulation of lysophosphatidic acid receptor 1 (LPA1).

In one embodiment, the present invention refers to a compound of formula (I) useful for the prevention and/or treatment of fibrosis and/or diseases, disorders, or conditions that involve fibrosis.

The terms "fibrosis" or "fibrosis disorder," as used herein, refers to conditions that are associated with the abnormal accumulation of cells and/or fibronectin and/or collagen and/or increased fibroblast recruitment and include but are not limited to fibrosis of individual organs or tissues such as the heart, kidney, liver, joints, lung, pleural tissue, peritoneal tissue, skin, cornea, retina, musculoskeletal and digestive tract.

Preferably, the compounds of formula (I) of the present invention are useful for the treatment and/or prevention of fibrosis such as pulmonary fibrosis, idiopathic pulmonary fibrosis (IPF), hepatic fibrosis, renal fibrosis, ocular fibrosis, cardiac fibrosis, arterial fibrosis and systemic sclerosis.

More preferably, the compounds of formula (I) of the present invention are useful for the treatment of idiopathic pulmonary fibrosis (IPF).

In one aspect, the invention also refers to a method for the prevention and/or treatment of disorders associated with LPA receptors mechanisms, said method comprises administering to a patient in need of such treatment a therapeutically effective amount of a compound of formula (I).

In a further aspect, the invention refers to a method for the prevention and/or treatment of disorder or condition associated with dysregulation of lysophosphatidic acid receptor 1 (LPA1) administering a patient in need of such treatment a therapeutically effective amount of a compound of formula (I).

In a further aspect, the invention refers to a method for the treatment and/or prevention of fibrosis such as pulmonary fibrosis, idiopathic pulmonary fibrosis (IPF), hepatic fibrosis, renal fibrosis, ocular fibrosis, cardiac fibrosis, arterial fibrosis and systemic sclerosis.

In a further aspect, the invention refers to the use of a compound of formula (I) according to the invention, for the treatment of disorders associated with LPA receptors mechanism.

In a further aspect, the invention refers to the use of the compound of formula (I) for the preparation of a medicament for the treatment of disorders associated with LPA receptors mechanism.

In a further aspect, the invention refers to the use of the compound of formula (I) for the preparation of a medicament for the treatment and/or prevention of fibrosis such as pulmonary fibrosis, idiopathic pulmonary fibrosis (IPF), hepatic fibrosis, renal fibrosis, ocular fibrosis, cardiac fibrosis, arterial fibrosis and systemic sclerosis.

In a further aspect, the present invention refers to the use of a compound of formula (I) for the treatment of a disease, disorder or condition associated with dysregulation of lysophosphatidic acid receptor 1 (LPA1).

As used herein, "safe and effective amount" in reference to a compound of formula (I) or a pharmaceutically acceptable salt thereof or other pharmaceutically-active agent means an amount of the compound sufficient to treat the patient's condition but low enough to avoid serious side effects and it can nevertheless be routinely determined by the skilled artisan.

The compounds of formula (I) may be administered once or according to a dosing regimen wherein a number of doses are administered at varying intervals of time for a given period of time. Typical daily dosages may vary depending upon the route of administration chosen.

The present invention also refers to a pharmaceutical composition comprising a compound of formula (I) in admixture with at least one or more pharmaceutically acceptable carrier or excipient.

In one embodiment, the invention refers to a pharmaceutical composition of compounds of formula (I) in admixture with one or more pharmaceutically acceptable carrier or excipient, for example those described in Remington's Pharmaceutical Sciences Handbook, XVII Ed., Mack Pub., N.Y., U.S.A.

Administration of the compounds of the invention and their pharmaceutical compositions may be accomplished according to patient needs, for example, orally, nasally, parenterally (subcutaneously, intravenously, intramuscularly, intraternally and by infusion) and by inhalation.

Preferably, the compounds of the present invention are administered orally or by inhalation.

More preferably, the compounds of the present invention are administered orally.

In one preferred embodiment, the pharmaceutical composition comprising the compound of formula (I) is a solid oral dosage form such as tablets, gelcaps, capsules, caplets, granules, lozenges and bulk powders.

In one embodiment, the pharmaceutical composition comprising the compound of formula (I) is a tablet.

The compounds of the invention can be administered alone or combined with various pharmaceutically acceptable carriers, diluents (such as sucrose, mannitol, lactose, starches) and known excipients, including suspending agents, solubilizers, buffering agents, binders, disintegrants, preservatives, colorants, flavorants, lubricants and the like.

In a further embodiment, the pharmaceutical composition comprising a compound of formula (I) is a liquid oral dosage forms such as aqueous and non-aqueous solutions, emulsions, suspensions, syrups, and elixirs. Such liquid dosage forms can also contain suitable known inert diluents such as water and suitable known excipients such as preservatives, wetting agents, sweeteners, flavorants, as well as agents for emulsifying and/or suspending the compounds of the invention.

In a further embodiment, the pharmaceutical composition comprising the compound of formula (I) is an inhalable preparation such as inhalable powders, propellant-containing metering aerosols or propellant-free inhalable formulations.

For administration as a dry powder, single- or multi-dose inhalers known from the prior art may be utilized. In that case the powder may be filled in gelatine, plastic or other capsules, cartridges or blister packs or in a reservoir.

A diluent or carrier chemically inert to the compounds of the invention, e.g. lactose or any other additive suitable for improving the respirable fraction may be added to the powdered compounds of the invention.

Inhalation aerosols containing propellant gas such as hydrofluoroalkanes may contain the compounds of the invention either in solution or in dispersed form. The propellant-driven formulations may also contain other ingredients such as co-solvents, stabilizers and optionally other excipients.

The propellant-free inhalable formulations comprising the compounds of the invention may be in form of solutions or suspensions in an aqueous, alcoholic or hydroalcoholic medium and they may be delivered by jet or ultrasonic nebulizers known from the prior art or by soft-mist nebulizers.

The compounds of the invention can be administered as the sole active agent or in combination with other pharmaceutical active ingredients.

The dosages of the compounds of the invention depend upon a variety of factors including among others the particular disease to be treated, the severity of the symptoms, the route of administration and the like.

The invention is also directed to a device comprising a pharmaceutical composition comprising a compound of Formula (I) according to the invention, in form of a single- or multi-dose dry powder inhaler or a metered dose inhaler.

All preferred groups or embodiments described above for compounds of formula I may be combined among each other and apply as well mutatis mutandis.

The compounds of the present invention can be prepared in a number of ways known to one skilled in the art of organic synthesis. It will be understood by those skilled in the art of organic synthesis that the functionality present on the molecule should be consistent with the transformation proposed. This will sometimes require a modification of the order of synthetic steps in order to obtain a desired compound of the invention. The compounds of Formula (I), including all the compounds here above listed, can be generally prepared according to the procedure outlined in Schemes shown below using generally known methods.

Scheme 1 describes the synthesis of isoxazole amido cyclohexane acid derivatives of formula (XI). A 4-nitrobenzoic acid or a 5-nitro picolinic acid (II) is converted to the corresponding acid chloride using a chlorinating agent such as $SOCl_2$ or Oxalyl chloride/catalytic DMF. This acid chloride is then reacted with a suitable β-enamino-ester (III) followed by condensation with hydroxylamine to provide isoxazole (IV). Deprotection of the ester and subsequent Curtius rearrangement in the presence of the commercially available alcohol (VI) provide the isoxazole carbamate (VII). Reduction of the nitro group under suitable conditions such as iron (Fe) in acidic conditions (ex. HCl) leads to the amino intermediate (VIII). Final compound (XI) can be obtained through amide coupling with a cyclohexane dicarboxylic acid mono ester of formula (IX) in the presence of an appropriate coupling reagent (e.g. HATU) followed by ester deprotection. Alternatively, intermediate (VIII) can be reacted with the commercially available anhydride (X) to provide directly final compound (XI).

SCHEME 1

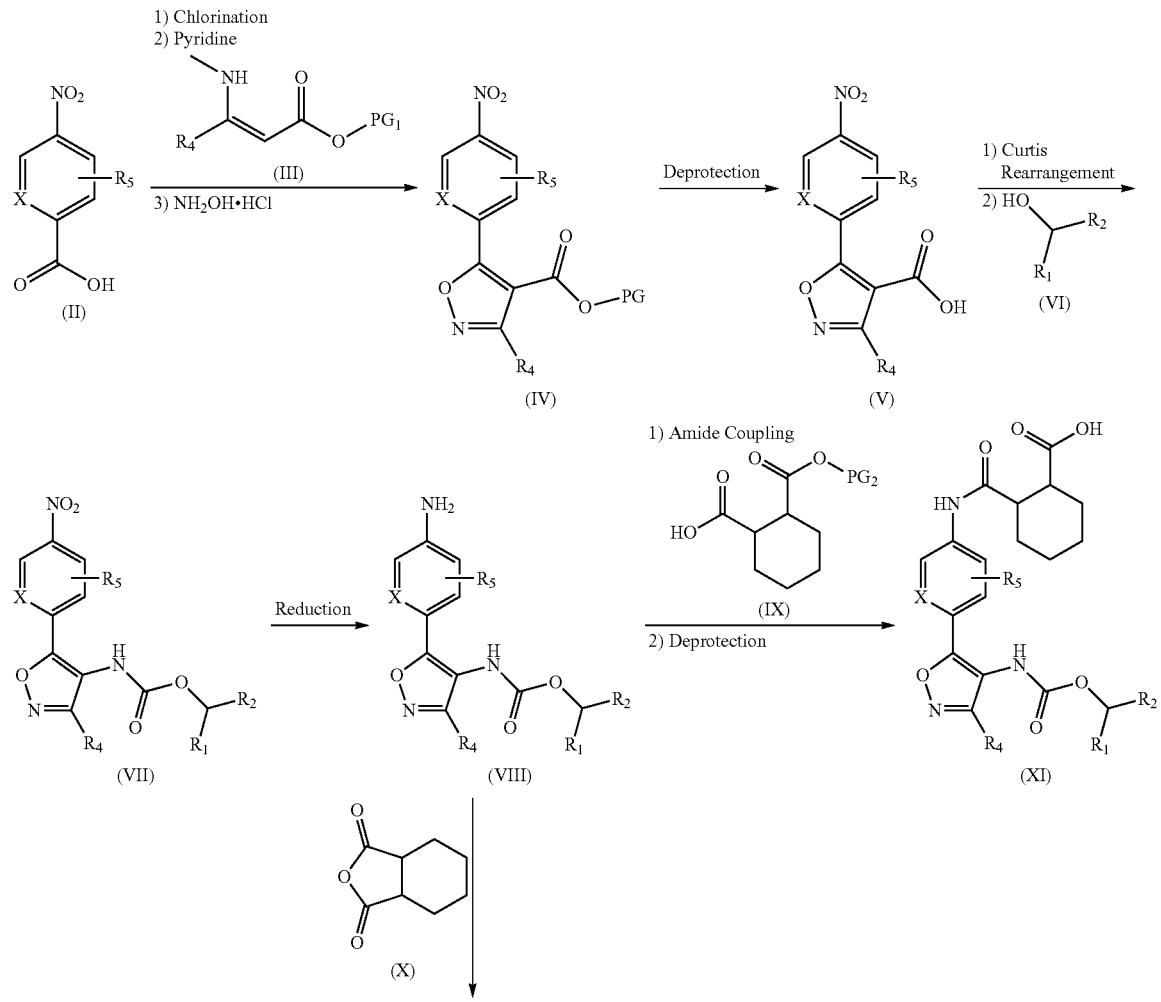

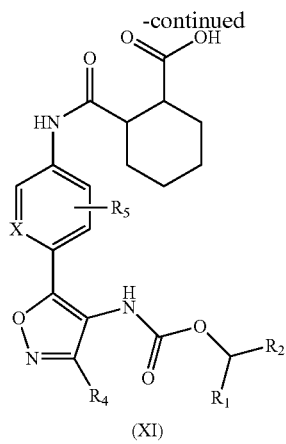

(XI)

Scheme 2 describes an alternative synthetic route to isoxazole amido cyclohexane acid derivatives of formula (XI). A 4-halo benzoic acid or a 5-halo picolinic acid (XII) is converted to the corresponding isoxazole carbamate (XIII) by the same synthetic sequence previously outlined in Scheme 1. Reaction of isoxazole (XIII) with benzophenone imine (XIV) under Buchwald reaction conditions (e.g. Buchwald, S. L. et al, *Chem. Rev.* 2016, 116, 12564-12649) followed by cleavage of the resulting imines (XV) under well-known procedures (e.g. hydroxylamine hydrochloride) provides intermediate (VIII). Final compound (XI) is then obtained by following the synthetic sequence previously outlined in Scheme 1.

SCHEME 2

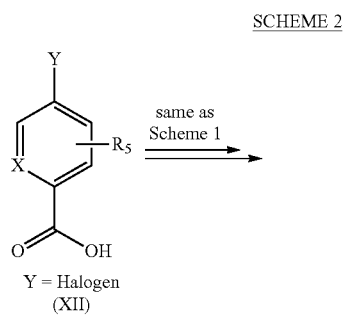

Y = Halogen
(XII)

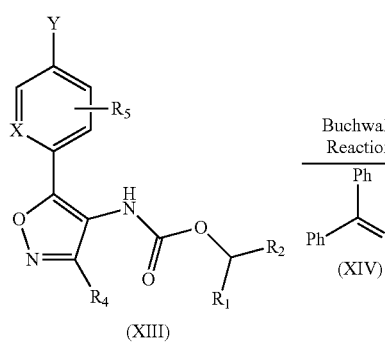

(XIII)

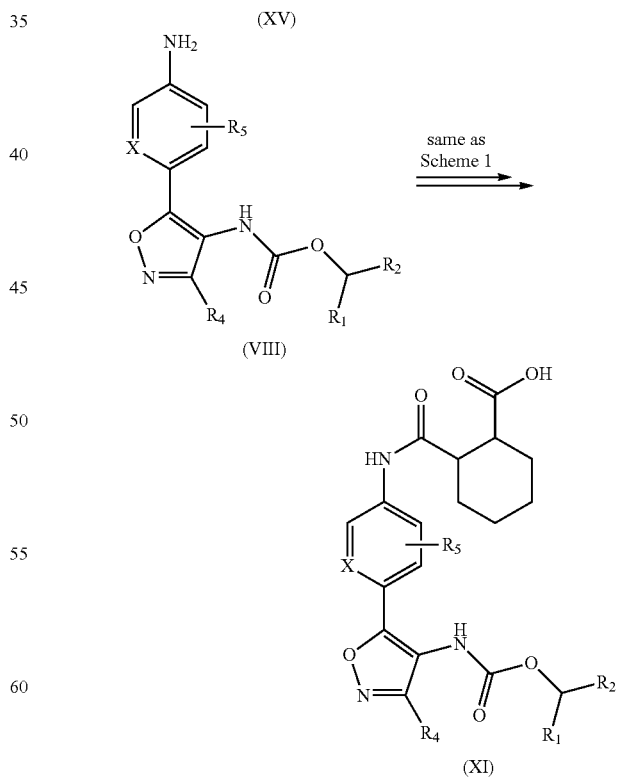

Scheme 3 describes another alternative synthetic route to isoxazole amido cyclohexane acid derivative (XI). Reaction of intermediate (XVI) with 4-methoxybenzylamine leads to PMB-protected intermediate (XVII). Subsequent deprotection under well-known procedures such as under strongly acidic conditions provides intermediate (XVIII) which is then reacted with the commercially available anhydride (X) to provide compound (XIX). Tert-butylation in the presence of a suitable reagent, such as N,N-Dimethylformamide di-tert-butyl acetal, provides intermediate (XX) which undergoes basic hydrolysis of the methyl ester followed by Curtius rearrangement to give compound (XXI). Final hydrolysis of the tert-butyl ester under acidic conditions leads to the final compound (XI).

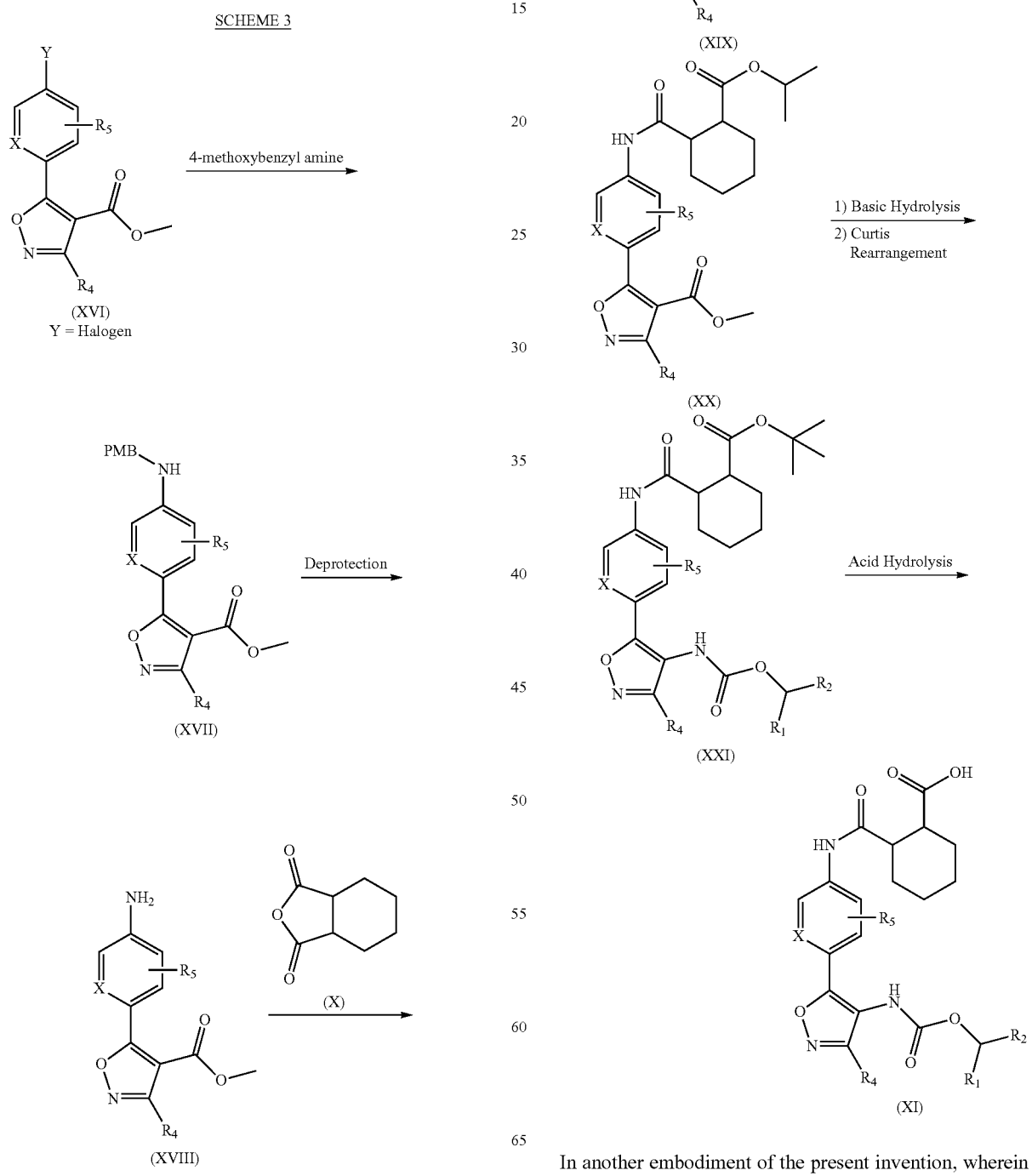

In another embodiment of the present invention, wherein R3 is not H, compound (XXIV) may be obtained according to Scheme 4. Reaction of Intermediate (VIII) with a suitable aldehyde (XXII) under reductive amination conditions provides compound (XXIII) which undergoes the same synthetic sequence previously outlined in Scheme 1 to provide final compound (XXIV).

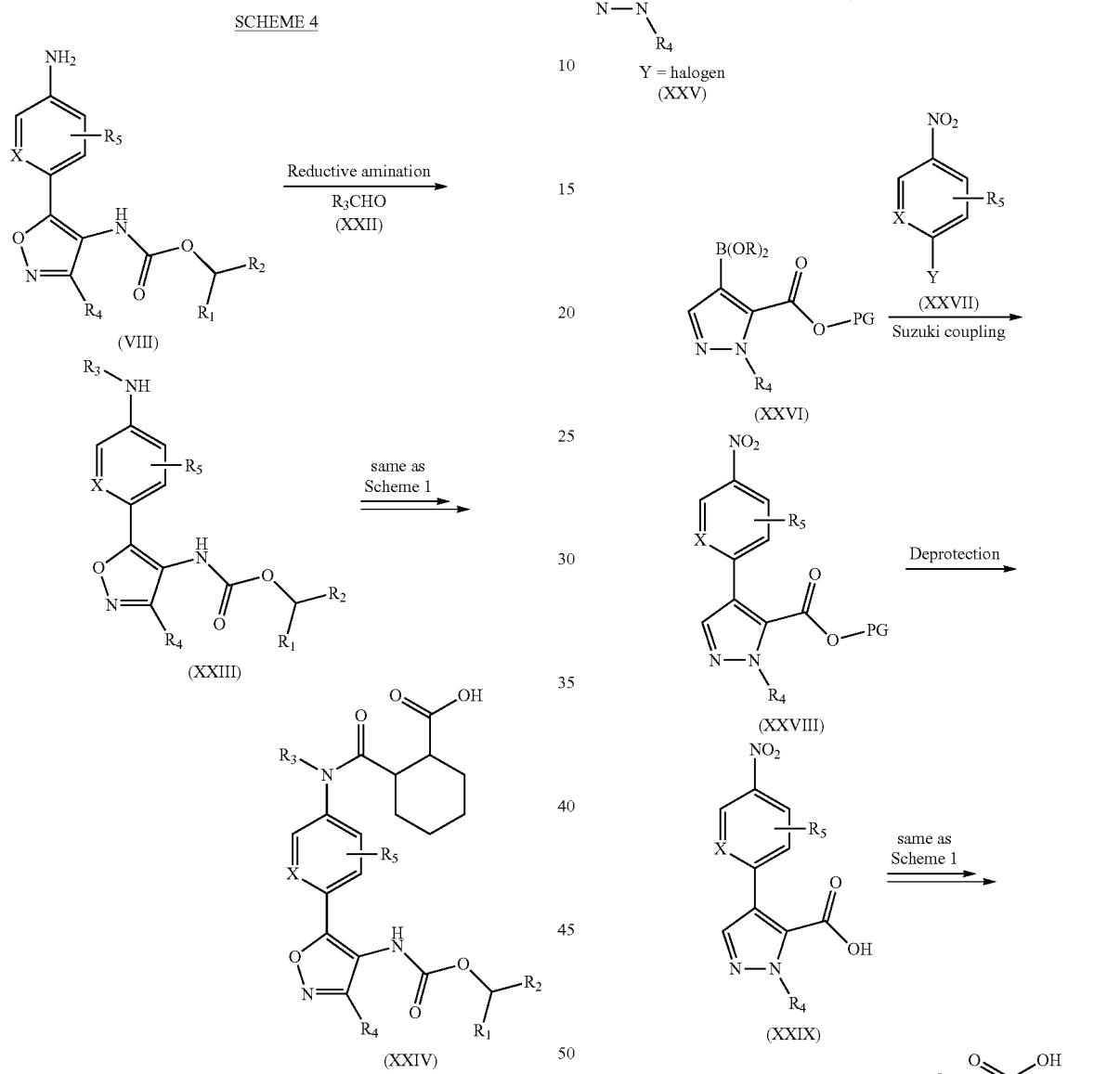

Scheme 5 describes the synthesis of pyrazole amido cyclohexane acid derivatives of formula (XXX). An appropriately protected halo-pyrazole ester (XXV) undergoes borylation (e.g. using pinacol diboronate in the presence of a suitable palladium catalyst such as [1,1'-Bis(diphenylphosphino)ferrocene]dichloropalladium(II)) to give boronate (XXVI) which is then subjected to Suzuki-Miyaura coupling with an appropriate 4-nitro phenyl/pyridine halide (XXVII) to provide the corresponding 4-nitro phenyl/pyridyl pyrazole (XXVIII). After deprotection, the obtained carboxylic acid (XXIX) is carried forward to the final compound (XXX) following the same synthetic route described in Scheme 1.

Scheme 6 describes an alternative synthetic route to obtain pyrazole amido cyclohexane acid derivative (XXX). A 4-nitro phenyl/pyridine halide (XXVII) undergoes borylation to give boronate (XXXI) which is then subjected to Suzuki-Miyaura coupling with the halo-pyrazole (XXXII) to afford halo-pyrazole amine (XXXIII). Subsequent alkoxycarbonylation (e.g. using N,N'-Disuccinimidyl Carbonate) in the presence of the commercially available alcohol (VI) provides carbamate (XXXIV). Final compound (XXX) is then obtained by following the synthetic sequence previously outlined in Scheme 1.

SCHEME 6

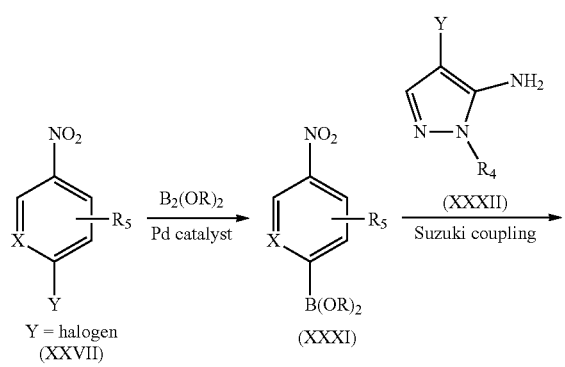

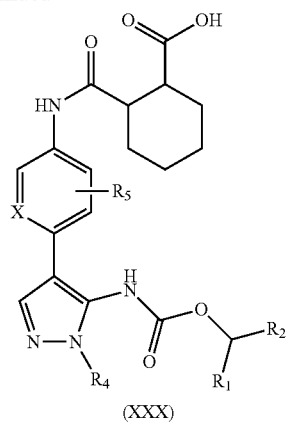

(XXX)

Scheme 7 describes the synthesis of triazole amido cyclohexane acid derivative (XL). A 4-nitro phenyl/pyridine halide (XXVII) undergoes Sonogashira coupling with propargyl alcohol (XXXV) in the presence of a suitable palladium catalyst such as Bis(triphenylphosphine)palladium(II) dichloride to give the corresponding nitro-phenyl/pyridinyl propargyl alcohol (XXXVI). Subsequent reaction with alkyl azide (XXXVII) with an appropriate catalyst provides the corresponding triazole alcohol (XXXVIII) which is then reacted with an oxidizing reagent (e.g. Potassium permanganate) to afford triazole carboxylic acid (XXXIX). Final compound (XL) is then obtained by the same synthetic sequence described in Scheme 1.

SCHEME 7

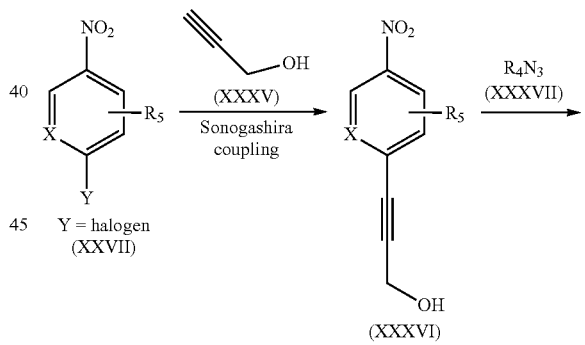

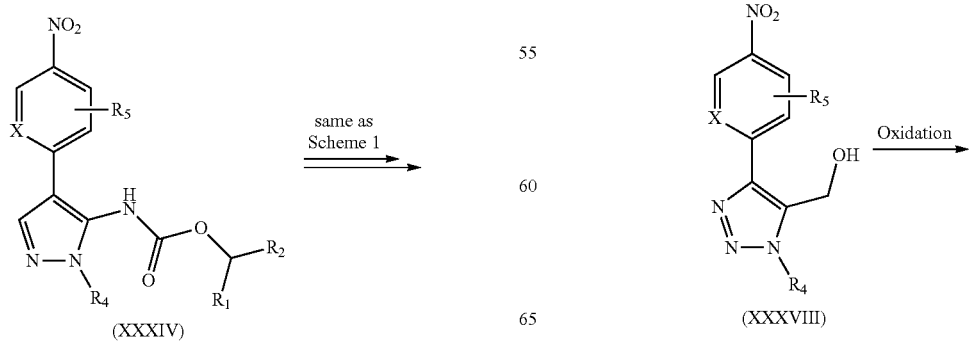

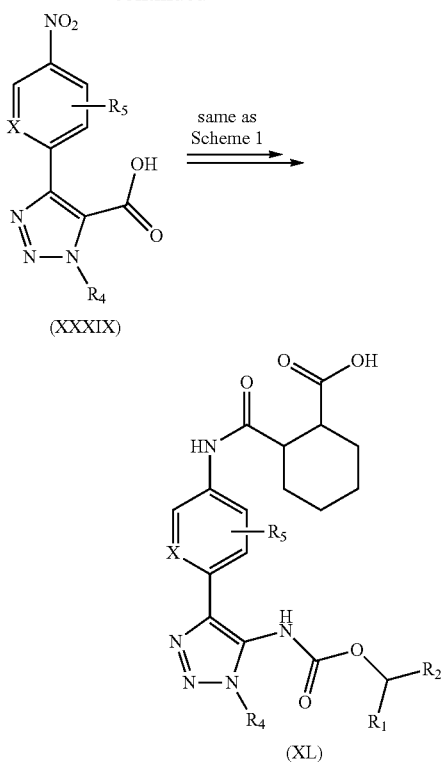

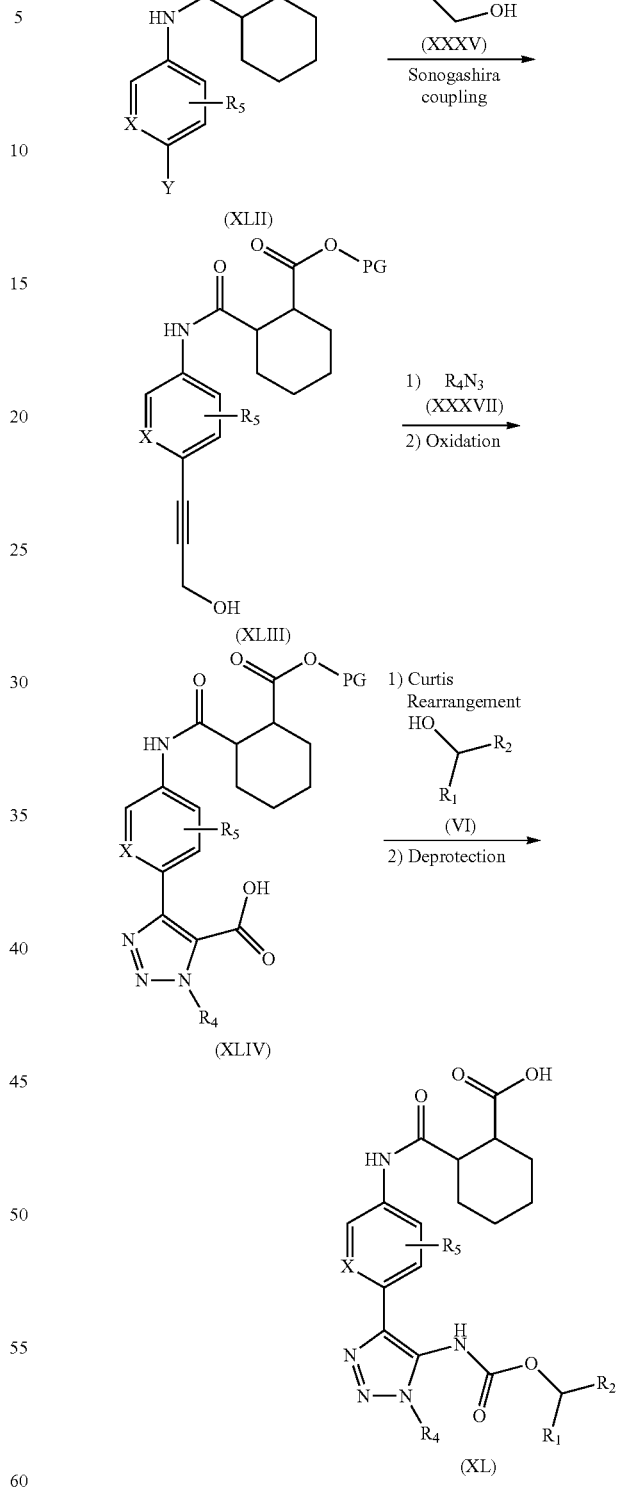

Scheme 8 describes an alternative synthetic route to obtain triazole amido cyclohexane acid derivative (XL). Reaction of 4-amino phenyl/pyridine halide (XLI) with the commercially available anhydride (X) and subsequent carboxylic acid protection provide intermediate (XLII). Subsequent Sonogashira coupling with propargyl alcohol in the presence of a suitable palladium catalyst such as Bis(triphenylphosphine)palladium(II) dichloride gives the corresponding propargyl (XXXV) alcohol intermediate (XLIII). Reaction of the latter with alkyl azide (XXXVII) with an appropriate catalyst followed by oxidation with a suitable oxidizing agent, such as Potassium permanganate, provides triazole carboxylic acid (XLIV). Curtius rearrangement in the presence of the commercially available alcohol (VI) and final carboxylic acid deprotection provide the triazole amido cyclohexane acid derivative (XL).

SCHEME 8

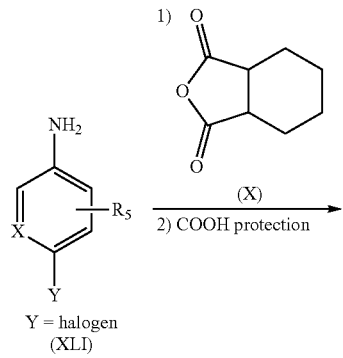

Alternatively, compound (XL) may be obtained according to Scheme 9. A nitro phenyl/pyridine-propynol (XXXVI), protected as tert-Butyldimethylsilyl ether (XLV), undergoes cycloaddition with Trimethylsilyl azide to afford the triazole (XLVI). Alkylation in the presence of a suitable base such as $K_2CO_3$ provides the $R_4$-substituted triazole (XLVII). Deprotection and subsequent oxidation of the alcohol provide the corresponding triazole carboxylic acid (XXXIX) which undergoes the same synthetic sequence previously outlined in Scheme 1 to provide final compound (XL).

SCHEME 9

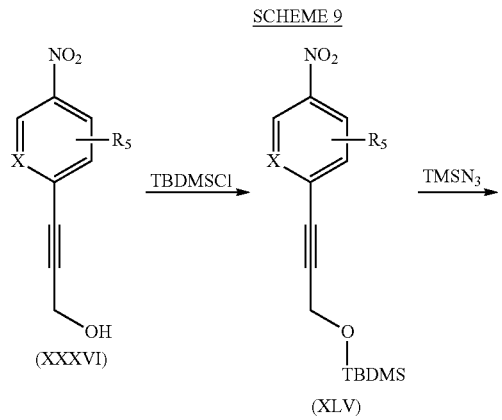

(XXXVI)

(XLV)

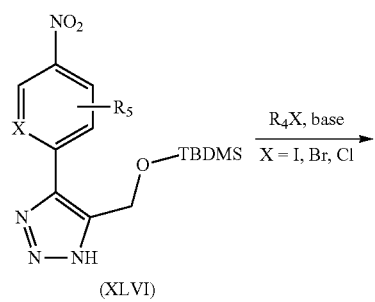

(XLVI)

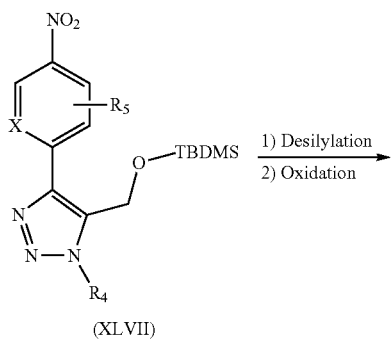

(XLVII)

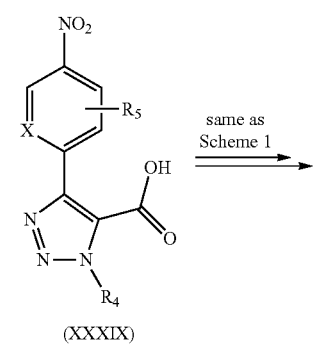

(XXXIX)

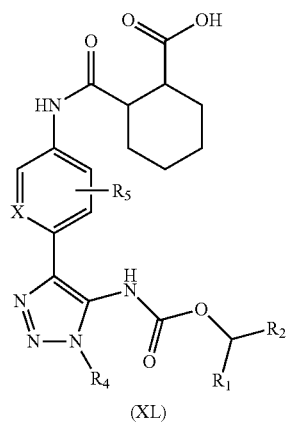

(XL)

In another embodiment of the present invention, wherein R4=CH$_3$, compound (LI) may be obtained according to Scheme 10. Trimethylsilyldiazomethane can be used for the cycloaddition to the nitro phenyl/pyridine-propynol (XXXVI) to afford, after desilylation, N-methyl triazole (XLIX). Oxidation of the alcohol provides the corresponding triazole carboxylic acid (L) which undergoes the same synthetic sequence previously outlined in Scheme 1 to provide final compound (LI).

SCHEME 10

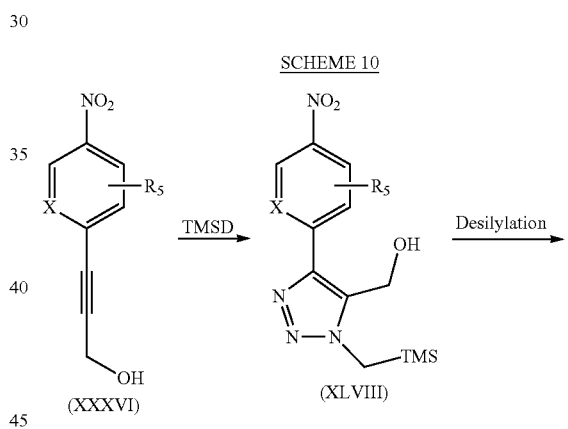

(XXXVI)  (XLVIII)

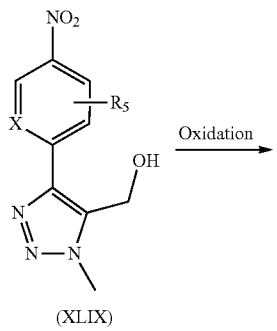

(XLIX)

-continued

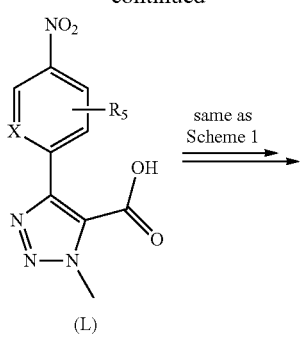
(L)

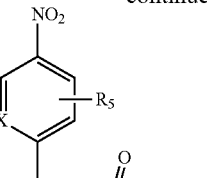
(LIII)

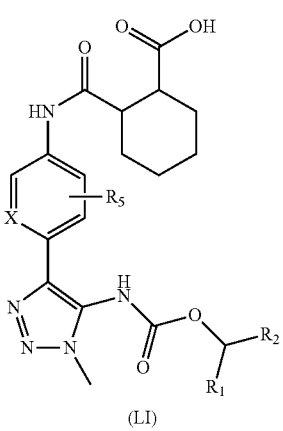
(LI)

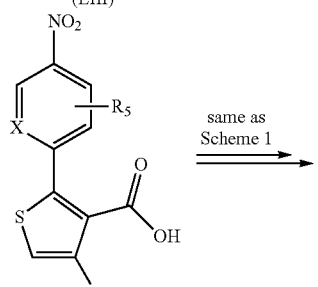
(LIV)

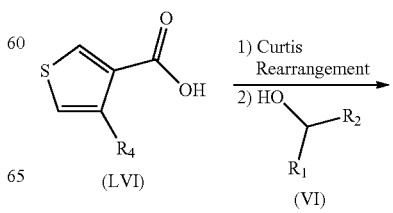
(LV)

Scheme 11 describes the synthesis of tiophene amido cyclohexane acid derivatives of formula (LV). A 4-nitro phenyl/pyridine boronate (XXXI) undergoes Suzuki-Miyaura coupling with a halo-thiophene carboxylic acid ester (LII) to afford a phenyl/pyridine thiophene carboxylic acid ester (LIII). Deprotection of the latter leads to carboxylic acid (LIV) which undergoes the same synthetic sequence previously outlined in Scheme 1 to provide final compound (LV).

Scheme 12 describes an alternative synthetic route to obtain tiophene amido cyclohexane acid derivatives of formula (LV). Thiophene carboxylic acid (LVI) undergoes Curtius rearrangement in the presence of the commercially available alcohol (VI) to afford the corresponding carbamate (LVII). Thiophene bromination with a suitable reagent such as N-Bromosuccinimide provides intermediate (LVIII) which is reacted with a 4-amino phenyl/pyridine organotin compound (LIX) under Stille cross coupling conditions (e.g. Farina V, et al. Org. React., 1997) to afford compound (LX). Final compound (LV) is then obtained by following the same synthetic sequence described in Scheme 1.

SCHEME 11

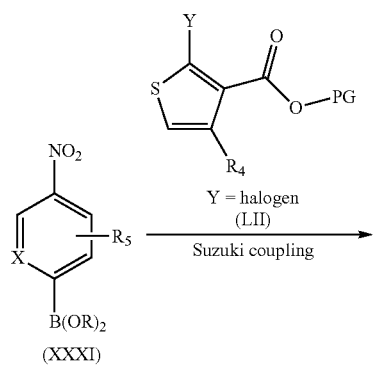

SCHEME 12

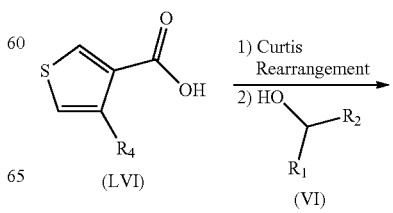

-continued

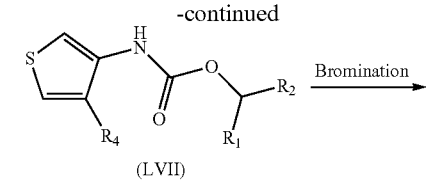
(LVII)

(LVIII)

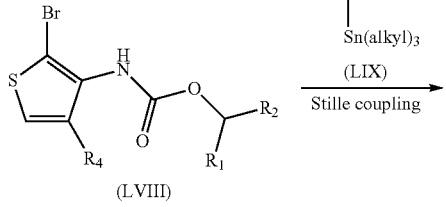
(LX)

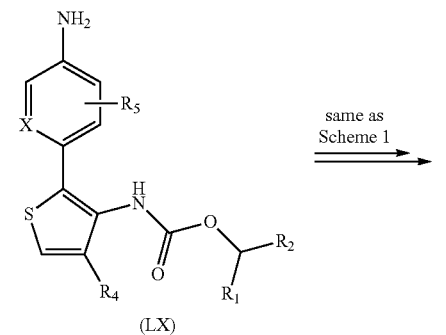
(LV)

SCHEME 13

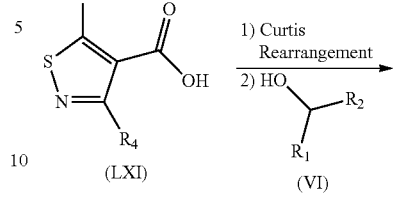
(LXI)

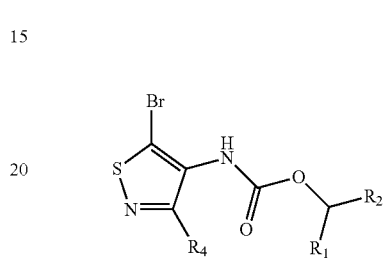
(LXII)

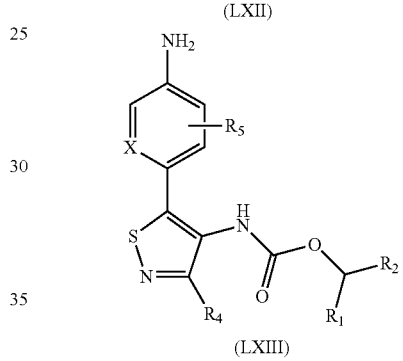
(LXIII)

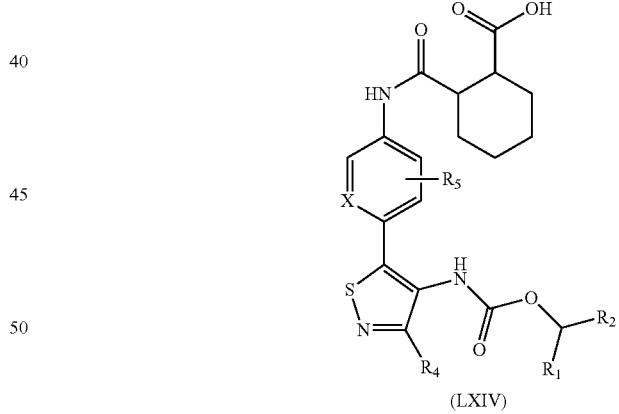
(LXIV)

Scheme 13 describes the synthesis of thiazole amido cyclohexane acid derivatives of formula (LXIV). Bromo isothiazole carboxylic acid (LXI) undergoes Curtius rearrangement in the presence of a commercially available alcohol (VI) to afford the corresponding carbamate (LXII). Subsequent reaction with a 4-amino phenyl/pyridine organotin compound (LIX) under Stille cross coupling conditions (e.g. Farina V, et al. Org. React., 1997) affords compound (LXIII). Final compound (LXIV) is then obtained by following the same synthetic sequence described in Scheme 1.

The various aspects of the invention described in this application are illustrated by the following examples which are not meant to limit the invention in any way.

PREPARATIONS OF INTERMEDIATES AND EXAMPLES

All reagents, for which the synthesis is not described in the experimental part, are either commercially available, or are known compounds or may be formed from known compounds by known methods by a person skilled in the art.

Abbreviation—Meaning $Cs_2CO_3$=Cesium carbonate
$Cp^*RuCl(PPh_3)_2$=Pentamethylcyclopentadienylbis(triphenylphosphine)ruthenium(II) chloride
CyHex=Cyclohexane
DCM=Dichloromethane
DMF=Dimethylformamide
DMSO=Dimethylsulfoxide
DPPA=Diphenylphosphoryl azide
EtOAc=Ethyl acetate
$Fe^o$=iron
h=hour
HATU=1-[Bis(dimethylamino)methylene]-1H-1,2,3-triazolo[4,5-b]pyridinium 3-oxid hexafluorophosphate
HCl=Hydrochloric acid
HCOOH=Formic acid
$H_2O$=Water
$K_2CO_3$=Potassium carbonate
KF=Potassium fluoride
$K_2HPO_4$=Potassium phosphate dibasic
$KHSO_4$=Potassium bisulfate
$KMnO_4$=Potassium permanganate
$K_3PO_4$=Potassium phosphate tribasic
LC-MS=liquid chromatography/mass spectrometry
LiOH=Lithium hydroxide
MeCN=Acetonitrile
MeOH=Methanol
$N_2$=Nitrogen
NaOH=Sodium hydroxide
$Na_2CO_3$=Sodium carbonate
$NaHCO_3$=Sodium bicarbonate
$Na_2SO_4$=Sodium sulfate
$NH_4Cl$=Ammonium chloride
$PdCl_2(PPh_3)_2$=Bis(triphenylphosphine)palladium(II) dichloride
$Pd_2(dba)_3$=Tris(dibenzylideneacetone)dipalladium(0)
$Pd_2(dba)_3CHCl_3$=Tris(dibenzylideneacetone)dipalladium (0)-chloroform adduct
$Pd(dppf)Cl_2$=[1,1'-Bis(diphenylphosphino)ferrocene]dichloropalladium(II)
$Pd(PPh_3)_4$=Tetrakis(triphenylphosphine)palladium(0)
pTLC=preparative thin layer chromatography
r.t.=room temperature
SFC=supercritical fluid chromatography
TBAF=tetrabutylammonium fluoride
THF=Tetrahydrofuran
XantPhos=4,5-Bis(diphenylphosphino)-9,9-dimethylxanthene
XPhos=2-Dicyclohexylphosphino-2',4',6'-triisopropylbiphenyl
XPhos Pd G2=Chloro(2-dicyclohexylphosphino-2',4',6'-triisopropyl-1,1'-biphenyl)[2-(2'-amino-1,1'-biphenyl)]palladium(II)

GENERAL EXPERIMENTAL DETAILS AND METHODS

Analytical Method
Instruments, Materials and Methods Employed for Analyses
$^1$H-NMR spectra were performed on a Varian MR-400 spectrometer operating at 400 MHZ (proton frequency), equipped with: a self-shielded Z-gradient coil 5 mm 1H/nX broadband probe head for reverse detection, deuterium digital lock channel unit, quadrature digital detection unit with transmitter offset frequency shift, or on AgilentVNMRS-500 or on a Bruker Avance 400 spectrometers or on a bruker Fourier 300. Chemical shift are reported as δ values in ppm relative to trimethylsilane (TMS) as an internal standard. Coupling constants (J values) are given in hertz (Hz) and multiplicities are reported using the following abbreviation (s=singlet, d=doublet, t=triplet, q=quartet, m=multiplet, br. s=broad singlet, nd=not determined).

LC/UV/MS Analytical Methods

LC/MS retention times are estimated to be affected by an experimental error of ±0.5 min. LCMS may be recorded under the following conditions: diode array DAD chromatographic traces, mass chromatograms and mass spectra may be taken on UPLC/PDA/MS Acquity™ system coupled with Micromass ZQ™ or Waters SQD single quadrupole mass spectrometer operated in positive and/or negative electron spray ES ionization mode and/or Fractionlynx system used in analytical mode coupled with ZQ™ single quadrupole operated in positive and/or negative ES ionisation mode or on a Shimadzu LCMS-2020 Single Quadrupole Liquid Chromatograph Mass Spectrometer and LCMS spectra were measured on Dionex UHPLC Ultimate 3000 with DAD detector/Thermo Scientific MSQ Plus.

Quality Control methods used operated under low pH conditions or under high pH conditions:

Method 1, low pH conditions column: Acquity CSH C18 2.1×50 mm 1.7 um, the column temperature was 40° C.; mobile phase solvent A was milliQ water+0.1% HCOOH, mobile phase solvent B MeCN+0.1% HCOOH. The flow rate was 1 mL/min.

The gradient table was t=0 min 97% A 3% B, t=1.5 min 0.1% A 99.9% B, t=1.9 min 0.1% A 99.9% B and t=2 min 97% A 3% B. The UV detection range was 210-350 nm and ES+/ES− range was 100 to 1500 AMU.

Method 2, low pH conditions: column Acquity UPLC 1.8 m C18 (2.1×50 mm), 100 Å, the column temperature was 25° C.; mobile phase solvent A was µQ-water for LCMS +0.1% HCOOH, mobile phase solvent B MeCN+0.1% HCOOH. The flow rate was 0.5 mL/min. The gradient table was t=0.00 min 90% A 10% B, t=4.00 min 95% A, 5% B, t=5.20 min 5% A, 95% B, t=6.00 min 5% A, 95% B. UV detection range was 205 and 254 nm and ES+/ES− range was 100 to 1000 AMU.

Method 3, low pH conditions: column Kinetex® 2.6 µm XB-C18 (4.6×50 mm), 110 A, the column temperature was 25° C.; mobile phase solvent A was µQ-water for LCMS +0.1% HCOOH, mobile phase solvent B MeCN+0.1% HCOOH. The flow rate was 1.0 mL/min. The gradient table was t=0.00 min 90% A 10% B, t=3.35 min 40% A, 60% B, t=3.75 min 40% A, 60% B, t=3.90 min 5% A, 95% B, t=4.75 min 5% A, 95% B, t=5.00 min 90% A, 10% B, t=6.00 min 90% A, 10% B, UV detection range was 190-340 nm and ES+/ES− range was 100 to 1000 AMU.

Method 4, low pH conditions: column Kinetex® 2.6 µm XB-C18 (4.6×50 mm), 110 A, the column temperature was 25° C.; mobile phase solvent A was µQ-water for LCMS +0.1% HCOOH, mobile phase solvent B MeCN+0.1% HCOOH. The flow rate was 1.0 mL/min. The gradient table was t=0.00 min 70% A 30% B, t=3.35 min 20% A, 80% B, t=3.75 min 20% A, 80% B, t=3.90 min 5% A, 95% B, t=4.75 min 5% A, 95% B, t=5.00 min 70% A, 30% B, t=6.00 min 70% A, 30% B, UV detection range was 190-340 nm and ES+/ES− range was 100 to 1000 AMU.

Method 5, low pH conditions: column Kinetex® 2.6 µm XB-C18 (4.6×50 mm), 110 A, the column temperature was 25° C.; mobile phase solvent A was µQ-water for LCMS +0.1% HCOOH, mobile phase solvent B MeCN+0.1% HCOOH. The flow rate was 1.0 mL/min. The gradient table was t=0.00 min 60% A 40% B, t=3.35 min 20% A, 80% B, t=3.75 min 20% A, 80% B, t=3.90 min 5% A, 95% B, t=4.75 min 5% A, 95% B, t=5.00 min 60% A, 40% B, t=6.00 min 60% A, 40% B, UV detection range was 190-340 nm and ES+/ES− range was 100 to 1000 AMU.

Method 6, low pH conditions: column Kinetex® 2.6 μm XB-C18 (4.6×50 mm), 110 A, the column temperature was 25° C.; mobile phase solvent A was μQ-water for LCMS +0.1% HCOOH, mobile phase solvent B MeCN+0.1% HCOOH. The flow rate was 1.0 mL/min. The gradient table was t=0.00 min 60% A 40% B, t=3.35 min 40% A, 60% B, t=3.75 min 40% A, 60% B, t=3.90 min 5% A, 95% B, t=4.75 min 5% A, 95% B, t=5.00 min 60% A, 40% B, t=6.00 min 60% A, 40% B, UV detection range was 190-340 nm and ES+/ES− range was 100 to 1000 AMU.

Method 7, low pH conditions: column Kinetex®2.6 μm XB-C18 (4.6×50 mm), 110 A, the column temperature was 25° C.; mobile phase solvent A was μQ-water for LCMS +0.1% HCOOH, mobile phase solvent B MeCN+0.1% HCOOH. The flow rate was 1.0 mL/min. The gradient table was t=0.00 min 70% A 30% B, t=3.35 min 20% A, 80% B, t=3.75 min 20% A, 80% B, t=3.90 min 5% A, 95% B, t=4.75 min 5% A, 95% B, t=5.00 min 70% A, 30% B, t=6.00 min 70% A, 30% B, UV detection range was 190-340 nm and ES+/ES− range was 100 to 1000 AMU.

Chiral Preparative HPLC for Chiral Compounds

Chiral resolutions were performed using both Semi-preparative HPLC (Agilent 1100 system and Waters 600 system) and SFC (SFC preparative system from Jasco) technologies.

Where the preparation of starting materials is not described, these are commercially available, known in the literature, or readily obtainable by those skilled in the art using standard procedures.

Flash chromatography is carried out using an Isolera MPLC system (manufactured by Biotage) using pre-packed silica gel or reverse-phase cartridges (supplied by Biotage).

Many of the compounds described in the following Examples have been prepared from stereochemically pure starting materials, for example 95% ee.

The stereochemistry of the compounds in the Examples, where indicated, has been assigned on the assumption that absolute configuration at resolved stereogenic centers of staring materials is maintained throughout any subsequent reaction conditions.

In the procedures that follow, after each starting material, reference to a compound number is sometimes provided. This is provided merely for assistance to the skilled chemist. The starting material may not necessarily have been prepared from the batch referred to.

When reference is made to the use of a "similar" or "analogous" procedure, as will be appreciated by those skilled in the art, such a procedure may involve minor variations, for example reaction temperature, reagent/solvent amount, reaction time, work-up conditions or chromatographic purification conditions.

Intermediate A1 methyl 5-(5-bromo-6-methylpyridin-2-yl)-3-methyl-isoxazole-4-carboxylate

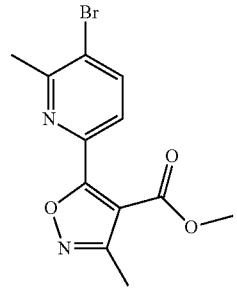

Step 1: 5-bromo-6-methylpicolinoyl chloride (Intermediate A1.1)

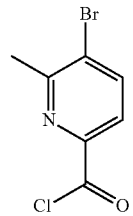

Oxalyl dichloride (3.98 mL, 46 mmol) and dry DMF (0.05 mL, 0.690 mmol) were added at 0° C. to a suspension of 5-bromo-6-methyl picolinic acid (5 g, 23 mmol) in dry DCM (54 mL). The mixture was stirred at r.t. for 3 h and the solvent was removed under reduced pressure to provide the title compound (5.90 g, crude) as a brown solid.

$^1$H NMR (400 MHz, DMSO-d$_6$) δ ppm 8.19 (d, J=8.22 Hz, 1H), 7.78 (d, J=8.22 Hz, 1H), 2.64 (s, 3H)

Step 2: methyl (E)-2-(5-bromo-6-methylpicolinoyl)-3-(methylamino)but-2-enoate (Intermediate A1.2)

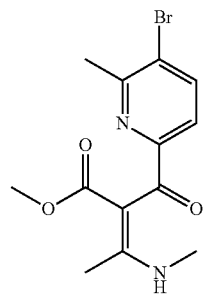

To a solution of methyl (E)-3-(methylamino)but-2-enoate (2.92 g, 22.65 mmol), prepared according to the procedure reported in *J. Org. Chem.*, 1965, 30, 3033-3037, in dry THF (22 mL), Pyridine (3 mL, 37.7 mmol) was added dropwise. The reaction was cooled in an ice bath and a solution of 5-bromo-6-methylpicolinoyl chloride (Intermediate A1.1, 5.9 g, 25 mmol)) in dry THF (33 mL) was slowly added. The reaction was warmed up to room temperature and stirred overnight. H$_2$O was added (200 mL) and the solution was extracted with EtOAc for 3 times. The combined organic layer was further washed with water and brine, dried over Na₂SO₄ and evaporated under reduced pressure to provide the title compound (7.78 g, crude) as a brown oil that was used in the next step without further purification.

LC-MS (ESI): m/z (M+1): 329.1 (Method 1)

Step 3: methyl 5-(5-bromo-6-methylpyridin-2-yl)-3-methyl-1,2-oxazole-4-carboxylate methyl (E)-2-(5-bromo-6-methylpicolinoyl)-3-(methylamino)but-2-enoate (Intermediate A1.2, 7.78 g, crude) was dissolved in Acetic acid (50 mL) and hydroxylamine hydrochloride (1.6 g, 23 mmol) was added and the mixture was heated at 80° C. for 15 min. The mixture was evaporated under vacuum, NaHCO₃ saturated aqueous solution (300 mL) was added and the mixture was extracted with EtOAc for 3 times. The combined organic layer was further washed with water and brine, dried over Na₂SO₄, and evaporated under reduced pressure. The crude was purified by flash chromatography eluting with a gradient of cyclohexane/EtOAc from 93/7 to 40/60 to provide the title compound (3.5 g, 11 mmol, 4800 yield) as a white solid.

LC-MS (ESI): m/z (M+1): 313 (Method 1)

¹H NMR (400 MHz, Chloroform-d) δ ppm 7.97 (d, J=8.19 Hz, 1H), 7.65 (d, J=8.19 Hz, 1H), 3.87 (s, 3H), 2.76 (s, 3H), 2.52 (s, 3H)

The Intermediates in the following table were prepared from reagents reported below by using methods analogous to Intermediate A1.

| Intermediate | Structure & Name | Reagents | Analytical data |
|---|---|---|---|
| A2 | methyl 3-methyl-5-(6-methyl-5-nitropyridin-2-yl)isoxazole-4-carboxylate | 6-methyl-5-nitro picolinic acid | LC-MS (ESI): m/z (M + 1): 278.2 (Method 1) ¹H NMR (400 MHz, Chloroform-d) δ ppm 8.44 (d, J = 8.47 Hz, 1H), 8.00 (d, J = 8.47 Hz, 1H), 3.90 (s, 3H), 2.95 (s, 3H), 2.54 (s, 3H) |
| A3 | methyl 3-methyl-5-(5-nitropyridin-2-yl)isoxazole-4-carboxylate | 5-nitro picolinic acid | LC-MS (ESI): m/z (M + 1): 264.1 (Method 1) ¹H NMR (400 MHz, DMSO-d₆) δ ppm 9.51 (dd, J = 2.6, 0.8 Hz, 1H), 8.80 (dd, J = 8.7, 2.6 Hz, 1H), 8.31 (dd, J = 8.7, 0.8 Hz, 1H), 3.79 (s, 3H), 2.47 (s, 3H) |
| A4 | methyl 5-(5-bromo-3-fluoropyridin-2-yl)-3-methylisoxazole-4-carboxylate | 5-bromo-3-fluoro-picolinic acid | LC-MS (ESI): m/z (M + 1): 300.95 (Method 2) ¹H NMR (300 MHz, DMSO-d₆) δ ppm 8.83 (t, J = 1.5 Hz, 1H), 8.54 (dd, J = 9.4, 1.8 Hz, 1H), 3.73 (s, 3H), 2.47 (s, 3H) |

Intermediate B1 methyl 1-methyl-4-(6-methyl-5-nitropyridin-2-yl)-1H-pyrazole-5-carboxylate

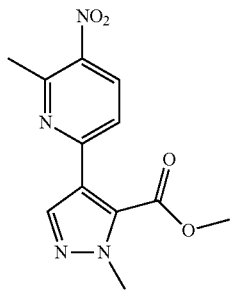

Step 1: methyl 1-methyl-4-(4,4,5,5-tetramethyl-1,3,2-dioxaborolan-2-yl)-1H-pyrazole-5-carboxylate (Intermediate B1.1)

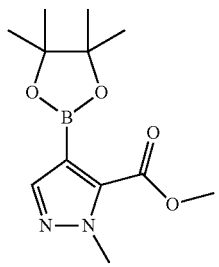

A mixture of methyl 4-bromo-1-methyl-1H-pyrazole-5-carboxylate (455 mg, 2.08 mmol), potassium acetate (611.58 mg, 6.23 mmol) and Bis(pinacolato)diboron (791.24 mg, 3.12 mmol) in 1,4-Dioxane (15 mL) was degassed under $N_2$ for 5 minutes, then Pd(dppf)Cl$_2$ (152.41 mg, 0.210 mmol) was added. The mixture was stirred at 85° C. overnight. Water was added and the mixture was extracted with EtOAc for 3 times, collected organic fractions were dried over Na$_2$SO$_4$, filtered and evaporated to give the title compound (2.3 g, crude) as brown oil which was used in the next step without further purification.

LC-MS (ESI): m/z (M+1): 267 (Method 1)

Step 2: methyl 1-methyl-4-(6-methyl-5-nitropyridin-2-yl)-1H-pyrazole-5-carboxylate To a solution of methyl 1-methyl-4-(4,4,5,5-tetramethyl-1,3,2-dioxaborolan-2-yl)-1H-pyrazole-5-carboxylate (Intermediate B1.1, 553 mg, 2.08 mmol) in 1,4-Dioxane (10 mL) 6-bromo-2-methyl-3-nitropyridine (541.2 mg, 2.49 mmol), K$_2$HPO$_4$ (1.09 g, 6.23 mmol), Water (10 mL) and X-Phos Pd G2 (163.3 mg, 0.210 mmol) were added under nitrogen. The mixture was stirred at 60° C. overnight. Water was added and the mixture was extracted with EtOAc for 3 times, collected organic phases were dried over Na$_2$SO$_4$, filtered and evaporated under reduced pressure. The residue was purified by flash chromatography eluting with a gradient of EtOAc in CyHex from 10% to 50% to afford the title compound (142 mg, 0.51 mmol, 25% yield) as a pink solid.

LC-MS (ESI): m/z (M+1): 277.05 (Method 1)

$^1$H NMR (400 MHz, DMSO-d$_6$) δ ppm 8.45 (d, J=8.58 Hz, 1H), 8.08 (s, 1H), 7.79 (d, J=8.36 Hz, 1H), 4.02 (s, 3H), 3.86 (s, 3H), 2.76 (s, 3H)

Intermediate C1 ethyl 2-(4-nitrophenyl)thiophene-3-carboxylate

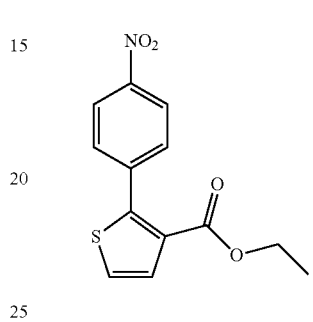

A mixture of ethyl 2-bromothiophene-3-carboxylate (1 g, 4.3 mmol), (4-nitrophenyl)boronic acid (0.6 g, 3.6 mmol), Na$_2$CO$_3$ (1.1 g, 10.8 mmol) in 1,2-dimethoxyethane (15 mL) and Water (5 mL) was degassed by applying alternatively vacuum and nitrogen. Pd(dppf)Cl$_2$ (0.13 g, 0.18 mmol) was then added and the mixture was heated at 80° C. for 1 h. The mixture was then diluted with EtOAc, washed with water and brine, dried over Na$_2$SO$_4$ and evaporated under reduced pressure. The residue was purified by flash chromatography eluting with a gradient of EtOAc in CyHex from 0% to 10% to afford the title compound (795 mg, 2.87 mmol, 80% yield) as a white solid.

LC-MS (ESI): m/z (M+1): 278.1 (Method 1)

$^1$H NMR (400 MHz, DMSO-d$_6$) δ ppm 8.44-8.12 (m, 2H), 7.92-7.69 (m, 3H), 7.60-7.43 (m, 1H), 4.16 (d, J=7.04 Hz, 2H), 1.14 (t, J=7.04 Hz, 3H)

Intermediate D1 methyl 5-(5-(((1S,2S)-2-(tert-butoxycarbonyl)cyclohexane-1-carboxamido)-6-methylpyridin-2-yl)-3-methylisoxazole-4-carboxylate

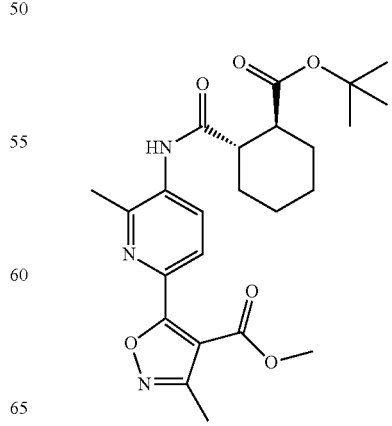

Step 1: methyl 5-(5-((4-methoxybenzyl)amino)-6-methylpyridin-2-yl)-3-methylisoxazole-4-carboxylate (Intermediate D1.1)

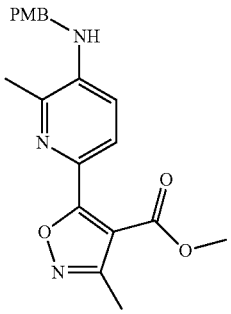

A stirred suspension in anhydrous toluene (79 mL) of methyl 5-(5-bromo-6-methylpyridin-2-yl)-3-methyl-1,2-oxazole-4-carboxylate (Intermediate A1, 11.2 g, 39.4 mmol), 4-methoxybenzylamine (6.48 g, 47.3 mmol) and cesium carbonate (18.0 g, 55.2 mmol) was purged with argon for 10 min, followed by addition of Pd$_2$(dba)$_3$CHCl$_3$ (0.8 g, 0.8 mmol) and XantPhos (1.37 g, 2.4 mmol). The reaction was stirred overnight at 90° C. The mixture was filtered and the solvent was evaporated to obtain an oil which was dissolved in DCM and precipitated with CyHex. The crude was purified by flash chromatography using a gradient of EtOAc in n-hexane from 0% to 50% affording the title compound (11.20 g, 30.50 mmol, 77% yield) as a yellow solid.

LC-MS (ESI): m/z (M+1): 368.2 (Method 2)
$^1$H NMR (300 MHz, DMSO-d$_6$) δ ppm 7.61 (d, J=8.5 Hz, 1H), 7.30 (d, J=8.6 Hz, 2H), 6.89 (d, J=8.6 Hz, 2H), 6.77 (d, J=8.6 Hz, 1H), 6.67 (t, J=6.1 Hz, 1H), 4.38 (d, J=6.0 Hz, 2H), 3.74 (s, 3H), 3.72 (s, 3H), 2.42 (s, 3H), 2.35 (s, 3H)

Step 2: methyl 5-(5-amino-6-methylpyridin-2-yl)-3-methylisoxazole-4-carboxylate (Intermediate D1.2)

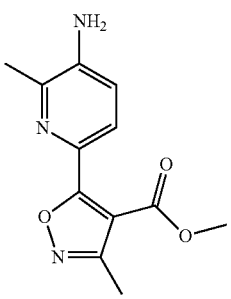

4M HCl in 1,4-Dioxane (150 mL, 599.2 mmol) was added to methyl 5-(5-{[(4-methoxyphenyl)methyl]amino}-6-methylpyridin-2-yl)-3-methyl-1,2-oxazole-4-carboxylate (Intermediate D1.1) (11.0 g, 30.0 mmol) in 1,4-Dioxane (300 mL). The reaction was stirred overnight at 60° C., the solvent was evaporated, then DCM and water were added and the mixture was basified with NH$_4$OH to pH 10. The layers were separated and water phase was washed with DCM (3×550 mL). Combined organic layers were washed with brine (300 mL) and dried over sodium sulfate to give 8.50 g of crude. The product was triturated in Et$_2$O (85 ml) to provide the title compound as a yellow solid (6.75 g, 27.3 mmol, 91% yield).

LC-MS (ESI): m/z (M+1): 248.2 (Method 2)
$^1$H NMR (300 MHz, DMSO-d$_6$) δ ppm 7.61 (d, J=8.4 Hz, 1H), 6.98 (d, J=8.4 Hz, 1H), 5.94-5.78 (m, 2H), 3.76 (s, 3H), 2.36 (s, 3H), 2.31 (s, 3H)

Step 3: (1S,2S)-2-((6-(4-(methoxycarbonyl)-3-methylisoxazol-5-yl)-2-methylpyridin-3-yl)carbamoyl)cyclohexane-1-carboxylic acid (Intermediate D1.3)

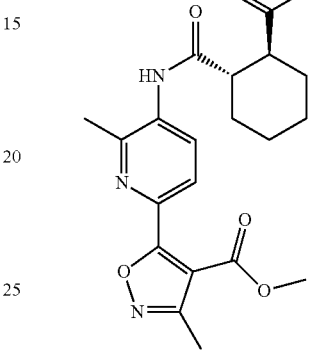

(−) Trans-1,2-Cyclohexanedicarboxylic anhydride (4.46 g, 28.9 mmol) was added to a solution of methyl 5-(5-amino-6-methylpyridin-2-yl)-3-methyl-1,2-oxazole-4-carboxylate (Intermediate D1.2) (6.50 g, 26.3 mmol) in DMF (105 mL). The mixture was stirred overnight at 55° C. The solution was diluted with water (400 mL) and the product was extracted with EtOAc (3×250 mL). Combined organic layers were washed with 10% KHSO$_4$ (3×150 mL), dried over sodium sulphate and evaporated to give the title compound as a yellow foam (9.01 g, 22.5 mmol, 89% yield).

LC-MS (ESI): m/z (M+1): 402.3 (Method 2)
$^1$H NMR (300 MHz, DMSO-d$_6$) δ ppm 12.13 (s, 1H), 9.65 (s, 1H), 8.02 (d, J=8.4 Hz, 1H), 7.80 (d, J=8.4 Hz, 1H), 3.77 (s, 3H), 2.73-2.68 (m, 1H), 2.62-2.53 (m, 1H), 2.48 (s, 3H), 2.41 (s, 3H), 2.07-2.00 (m, 2H), 1.83-1.67 (m, 2H), 1.43-1.22 (m, 4H)

Step 4: methyl 5-(5-((1S,2S)-2-(tert-butoxycarbonyl)cyclohexane-1-carboxamido)-6-methylpyridin-2-yl)-3-methylisoxazole-4-carboxylate (1S,2S)-2-({6-[4-(methoxycarbonyl)-3-methyl-1,2-oxazol-5-yl]-2-methylpyridin-3-yl}carbamoyl)cyclohexane-1-carboxylic acid (Intermediate D1.3) (8.71 g, 21.7 mmol) was dissolved in anhydrous toluene (64 mL) under argon. The mixture was heated to reflux. N,N-dimethylformamide di-tert-butyl acetal (17.66 g, 86.8 mmol) was added dropwise by syringe pump over 30 min to the refluxing mixture. Additional portion of N,N-dimethylformamide di-tert-butyl acetal (4.41 g, 27.1 mmol) was added dropwise by syringe pump over 10 min to the refluxing mixture. The reaction was cooled down to room temperature, then was diluted with EtOAc (400 mL) and the organic layer was washed with sodium bicarbonate sat. solution (3×200 mL), water (200 mL) and brine (200 mL). The organic layer was dried over sodium sulfate and evaporated to obtain 11 g of crude as an oil.
Purification by flash chromatography using a gradient of EtOAc in hexane from 0 to 50% gave the title compound as a yellow foam (7.95 g 18.2 mmol. 80% yield).

LC-MS (ESI): m/z (M+1): 458.4 (Method 2)

¹H NMR (300 MHz, DMSO-d₆) δ ppm 9.66 (s, 1H), 8.04 (d, J=8.4 Hz, 1H), 7.81 (d, J=8.4 Hz, 1H), 3.76 (s, 3H), 2.76-2.65 (m, 1H), 2.56-2.52 (m, 1H), 2.48 (s, 3H), 2.41 (s, 3H), 2.07-1.92 (m, 2H), 1.84-1.69 (m, 2H), 1.35 (s, 9H), 1.34-1.24 (m, 4H)

Intermediate E1

5-(5-bromo-6-methylpyridin-2-yl)-3-methylisoxazole-4-carboxylic acid

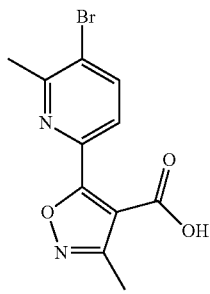 [SMILES: Cc1nc(-c2onc(C)c2C(=O)O)ccc1Br]

Methyl 5-(5-bromo-6-methylpyridin-2-yl)-3-methylisoxazole-4-carboxylate (Intermediate A1, 2.0 g, 6.4 mmol) was dissolved in THF (20 mL) and lithium hydroxide 2M solution in H₂O (16 mL, 32 mmol) was added and the mixture was stirred at 50° C. for 2 h. The mixture was acidified to neutral pH with HCl 1N in H₂O and extracted with EtOAc for 3 times. The combined organic layer was further washed with water and brine, dried over Na₂SO₄ and evaporated under reduced pressure to afford the title compound (1.8 g, 6 mmol, 90% yield) as a pale yellow solid.

LC-MS (ESI): m/z (M+1): 299.1 (Method 1)

¹H NMR (400 MHz, DMSO-d₆) δ ppm 8.33 (d, J=8.37 Hz, 1H), 7.99 (d, J=8.36 Hz, 1H), 2.67 (s, 3H), 2.44 (s, 3H)

The Intermediates in the following table were prepared from reagents reported below by using methods analogous to Intermediate E1.

| Intermediate | Structure & Name | Reagents | Analytical data |
|---|---|---|---|
| E2 | 1-methyl-4-(6-methyl-5-nitropyridin-2-yl)-1H-pyrazole-5-carboxylic acid | B1 | LC-MS (ESI): m/z (M + 1): 263.06 (Method 1)<br>¹H NMR (400 MHz, DMSO-d₆) δ ppm 8.64 (d, J = 8.80 Hz, 1 H), 8.38 (s, 1 H), 8.12 (d, J = 8.80 Hz, 1 H), 4.15 (s, 3 H), 2.82 (s, 3 H) |
| E3 | 2-(4-nitrophenyl)thiophene-3-carboxylic acid | C1 | LC-MS (ESI): m/z (M + 1): 250.1 (Method 1)<br>¹H NMR (400 MHz, DMSO-d₆) δ ppm 12.88 (s, 1H), 8.30-8.23 (m, 2H), 7.82-7.72 (m, 3H), 7.51 (d, J = 5.28 Hz, 1H) |

-continued

| Intermediate | Structure & Name | Reagents | Analytical data |
|---|---|---|---|
| E4 | 3-methyl-5-(6-methyl-5-nitropyridin-2-yl)isoxazole-4-carboxylic acid | A2 | LC-MS (ESI): m/z (M + 1): 264.2 (Method 1) <br> $^1$H NMR (400 MHz, DMSO-d$_6$) δ ppm 8.67 (d, J = 8.55 Hz, 1H), 8.20 (d, J = 8.55 Hz, 1H), 2.82 (s, 3H), 2.47 (s, 3H) |
| E5 | 3-methyl-5-(5-nitropyridin-2-yl)isoxazole-4-carboxylic acid | A3 | LC-MS (ESI): m/z (M + 1): 250 (Method 1) <br> $^1$H NMR (400 MHz, DMSO-d$_6$) δ ppm 13.83 (s, 1H), 9.53 (d, J = 2.6 Hz, 1H), 8.82 (dd, J = 8.7, 2.6 Hz, 1H), 8.35 (d, J = 8.7 Hz, 1H), 2.47 (s, 3H) |
| E6 | 5-(5-bromo-3-fluoropyridin-2-yl)-3-methylisoxazole-4-carboxylic acid | A4 | LC-MS (ESI): m/z (M + 1): 300.95 (Method 2) <br> $^1$H NMR (300 MHz, DMSO-d$_6$) δ ppm 13.44 (bs, 1H), 8.81 (t, J = 1.5 Hz, 1H), 8.52 (dd, J = 9.3, 1.8 Hz, 1H), 2.46 (s, 3H) |
| E7 | | D1 | LC-MS (ESI): m/z (M + 1): 444.3 (Method 2) <br> $^1$H NMR (300 MHz, DMSO-d$_6$) δ ppm 9.91 (s, 1H), 8.35 (dd, J = 8.6, 4.5 Hz, 1H), 8.10 (d, J = 8.6 Hz, 1H), 2.87-2.63 (m, 2H), 2.56 (s, 3H), 2.48 (s, 3H), 2.13-1.92 (m, 2H), 1.86-1.66 (m, 2H), 1.36 (s, 9H), 1.35-1.18 (m, 4H) <br> Proton from carboxylic acid isn't presented. |

| Intermediate | Structure & Name | Reagents | Analytical data |
|---|---|---|---|
| | 5-(5-((1S,2S)-2-(tert-butoxycarbonyl)cyclohexane-1-carboxamido)-6-methylpyridin-2-yl)-3-methylisoxazole-4-carboxylic acid | | |
| E8 | 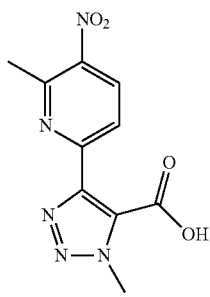<br>5-(5-bromopyridin-2-yl)-3-methylisoxazole-4-carboxylic acid | 5-(5-Bromo-pyridin-2-yl)-3-methyl-isoxazole-4-carboxylic acid ethyl ester | LC-MS (ESI): m/z (M + 1): 283 (Method 2) |

Intermediate F1

1-methyl-4-(6-methyl-5-nitropyridin-2-yl)-1H-1,2,3-triazole-5-carboxylic acid

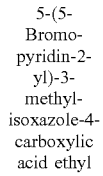

Step 1: 3-(6-methyl-5-nitropyridin-2-yl)prop-2-yn-1-ol (Intermediate F1.1)

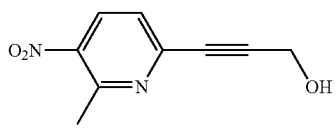

To a solution of 6-bromo-2-methyl-3-nitropyridine (3.6 g, 16.6 mmol) in dry MeCN (35 mL), 2-propyn-1-ol (1.45 mL, 24.88 mmol) and triethylamine (5.55 mL, 39.81 mmol) were added, followed by copper iodide (0.13 g, 0.700 mmol) and PdCl$_2$(PPh$_3$)$_2$ (0.49 g, 0.700 mmol) at 0° C. The reaction mixture was stirred at r.t. for 3 h, then the salts were filtered off through a celite pad and the filtrate was concentrated under reduced pressure. The crude was purified by flash chromatography using a gradient of EtOAc in cyclohexane from 0% to 60% affording the title compound (2.45 g, 12.75 mmol, 77% yield) as a brown solid.

LC-MS (ESI): m/z (M+1): 193 (Method 1)

$^1$H NMR (400 MHz, Chloroform-d) δ ppm 8.29 (d, J=8.39 Hz, 1H), 7.47 (dd, J=8.40, 0.64 Hz, 1H), 4.58 (d, J=6.29 Hz, 2H), 2.89 (s, 3H), 1.86 (t, J=6.23 Hz, 1H)

Step 2: (4-(6-methyl-5-nitropyridin-2-yl)-1-((trimethylsilyl)methyl)-1H-1,2,3-triazol-5-yl)methanol (Intermediate F1.2)

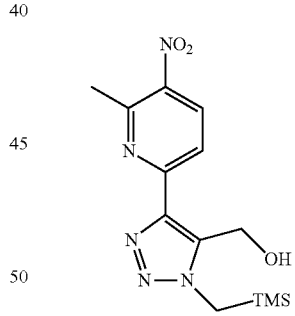

To a solution of 3-(6-methyl-5-nitropyridin-2-yl)prop-2-yn-1-ol (Intermediate F1.1, 1.2 g, 6.18 mmol) in dry 1,4-Dioxane (19 mL), trimethylsilylmethyl azide (1.38 mL, 9.27 mmol) was added. Three nitrogen/vacuum cycles were applied, then Cp*RuCl(PPh$_3$)$_2$ (0.3 g, 0.370 mmol) was added. The mixture was stirred at 90° C. for 5 h, then concentrated under reduced pressure to afford a crude mixture that was purified by flash chromatography using a gradient of EtOAc in cyclohexane from 0% to 60% affording the title compound (360 mg, 1.12 mmol, 18% yield).

LC-MS (ESI): m/z (M+1): 322.1 (Method 1)

Step 3: (1-methyl-4-(6-methyl-5-nitropyridin-2-yl)-1H-1,2,3-triazol-5-yl)methanol (Intermediate F1.3)

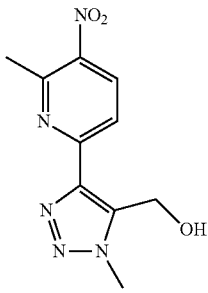 [SMILES: Cc1nc(-c2nnn(C)c2CO)ccc1[N+](=O)[O-]]

To a solution of (4-(6-methyl-5-nitropyridin-2-yl)-1-((trimethylsilyl)methyl)-1H-1,2,3-triazol-5-yl)methanol (Intermediate F1.2, 360 mg, 1.12 mmol) in dry THF (4 mL), TBAF 1M in THF (1.06 mL, 1.06 mmol) was added at 0° C. The reaction mixture was stirred for 30 min, then solid NaHCO$_3$ was added and the reaction was vigorously stirred at RT for 15 min. The solid was filtered off and the filtrate concentrated under reduced pressure. The crude was purified by flash column chromatography using a gradient of EtOAc in cyclohexane from 0% to 70% affording the title compound (110 mg, 0.44 mmol, 41.5% yield) as a pale orange solid.

LC-MS (ESI): m/z (M+1): 250 (Method 1)

Step 4: 1-methyl-4-(6-methyl-5-nitropyridin-2-yl)-1H-1,2,3-triazole-5-carboxylic acid To a solution of (1-methyl-4-(6-methyl-5-nitropyridin-2-yl)-1H-1,2,3-triazol-5-yl)methanol (Intermediate F1.3, 110 mg, 0.44 mmol) in MeCN (2.1 mL) and Water (0.3 mL), KMnO$_4$ (139.5 mg, 0.88 mmol) was added and the resulting purple solution was stirred at r.t. overnight. HCl 3M was then added up to pH<4 and the solvent was removed under reduced pressure. The crude was purified by flash chromatography using a gradient of MeOH in DCM from 0% to 4% affording the title compound (96.5 mg, 0.367 mmol, 83% yield).

LC-MS (ESI): m/z (M+1): 264 (Method 1)
$^1$H NMR (400 MHz, DMSO-d$_6$) δ ppm 8.75 (d, J=8.66 Hz, 1H), 8.35 (d, J=8.63 Hz, 1H), 4.32 (s, 3H), 2.85 (s, 3H)

The Intermediate in the following table was prepared from reagents reported below by using methods analogous to Intermediate F1.

| Intermediate | Structure & Name | Reagents | Analytical data |
|---|---|---|---|
| F2 | 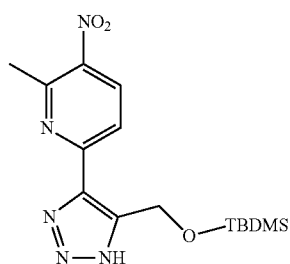 1-methyl-4-(4-nitrophenyl)-1H-1,2,3-triazole-5-carboxylic acid | 1-Iodo-4-nitro-benzene | LC-MS (ESI): m/z (M + 1): 249.03 (Method 1) $^1$H NMR (400 MHz, DMSO-d$_6$) δ ppm 8.32 (d, J = 8.94 Hz, 2H), 8.05 (d, J = 8.92 Hz, 2H), 4.29 (s, 3H) |

Intermediate G1

1-ethyl-4-(6-methyl-5-nitropyridin-2-yl)-1H-1,2,3-triazole-5-carboxylic acid

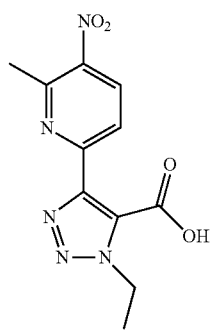 [SMILES: CCn1nnc(-c2ccc([N+](=O)[O-])c(C)n2)c1C(=O)O]

Step 1: 6-(3-((tert-butyldimethylsilyl)oxy)prop-1-yn-1-yl)-2-methyl-3-nitropyridine (Intermediate G1.1)

3-(6-methyl-5-nitropyridin-2-yl)prop-2-yn-1-ol (Intermediate F1.1, 712 mg, 3.7 mmol) and imidazole (0.5 g, 7.4 mmol) were dissolved in THF (24 mL) and DMF (1 mL), then tert-butyl-chloro-dimethylsilane (1.12 g, 7.4 mmol) was added under nitrogen atmosphere. The reaction mixture was stirred overnight at 40° C. Water was added and the organic phase was removed under reduced pressure. The residue was extracted with EtOAc, washed sequentially with a saturated NaHCO$_3$ solution and brine. Organic phase was evaporated and the crude was purified by flash chromatography using a gradient of EtOAc in cyclohexane from 0% to 15% to give the title compound (1.05 g, 3.4 mmol, 92.5% yield) as a pale-yellow oil.

LC-MS (ESI): m/z (M+1): 307.2 (Method 1)

Step 2: 6-(5-(((tert-butyldimethylsilyl)oxy)methyl)-1H-1,2,3-triazol-4-yl)-2-methyl-3-nitropyridine (Intermediate G1.2)

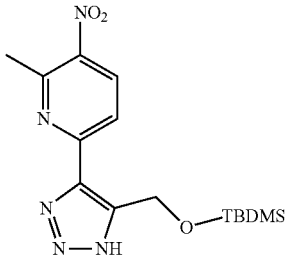

To a solution of 6-(3-(((tert-butyldimethylsilyl)oxy)prop-1-yn-1-yl)-2-methyl-3-nitropyridine (Intermediate G1.1, 1.05 g, 3.4 mmol) in DMF (28 mL), trimethylsilyl azide (10 mL, 75.3 mmol) was added. The reaction was set under $N_2$ and heated at 100° C. for 1 h. The solvent was removed under reduced pressure and the crude was purified via reverse phase flash chromatography using a gradient of MeCN (1% HCOOH) in acidic water (1% HCOOH) from 20 to 65% to afford the title compound (507 mg, 1.45 mmol, 42% yield) as a yellow-orange solid.

LC-MS (ESI): m/z (M+1): 350.2 (Method 1)

Step 3: 6-(5-(((tert-butyldimethylsilyl)oxy)methyl)-1-ethyl-1H-1,2,3-triazol-4-yl)-2-methyl-3-nitropyridine (Intermediate G1.3)

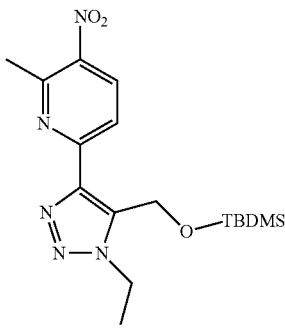

A solution of 6-(5-(((tert-butyldimethylsilyl)oxy)methyl)-1H-1,2,3-triazol-4-yl)-2-methyl-3-nitropyridine (Intermediate G1.2, 504 mg, 1.18 mmol) in MeCN (28 mL) was cooled at 0° C. and potassium carbonate (408.6 mg, 2.96 mmol) was added, followed by iodoethane (142 μL, 1.77 mmol). The reaction was stirred at r.t. for 4 hours, then the solvent was removed under reduced pressure and the residue was taken up with DCM and water. The water phase was extracted trice with DCM. The combined organic phase was filtered and the solvent was removed under reduced pressure. The crude was then purified by flash column chromatography using a gradient of EtOAc in cyclohexane from 0 to 15% to afford the title compound (169.4 mg, 0.45 mmol, 38% yield) as a white solid.

LC-MS (ESI): m/z (M+1): 378.3 (Method 1)

Step 4: (1-ethyl-4-(6-methyl-5-nitropyridin-2-yl)-1H-1,2,3-triazol-5-yl)methanol (Intermediate G1.4)

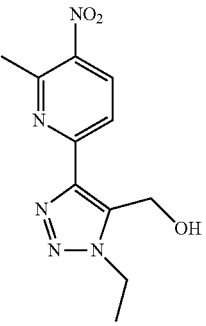 [SMILES: CCn1nnc(-c2ccc([N+](=O)[O-])c(C)n2)c1CO]

To a solution of 6-(5-(((tert-butyldimethylsilyl)oxy)methyl)-1-ethyl-1H-1,2,3-triazol-4-yl)-2-methyl-3-nitropyridine (Intermediate G1.3, 169.4 mg, 0.45 mmol) in dry THF (7 mL), tetrabutylammonium fluoride (0.47 mL, 0.47 mmol) 1M in THF was added at 0° C. The reaction mixture was stirred for 10 min, then solid $NaHCO_3$ was added and the mixture was vigorously stirred at r.t. for 5 min. The solid was filtered off and the filtrate was concentrated under reduced pressure. The crude was purified by flash column chromatography using a gradient of EtOAc in cyclohexane from 0% to 50% to afford the title compound (90 mg, 0.34 mmol, 87.8% yield) as a white solid.

LC-MS (ESI): m/z (M+1): 264.1 (Method 1)

$^1$H NMR (400 MHz, Chloroform-d) δ 8.49 (d, J=8.68 Hz, 1H), 8.36 (d, J=8.68 Hz, 1H), 6.15 (t, J=6.93 Hz, 1H), 4.89 (d, J=6.95 Hz, 2H), 4.48 (q, J=7.37 Hz, 2H), 2.95 (s, 3H), 1.58 (t, J=7.35 Hz, 3H)

Step 5: 1-ethyl-4-(6-methyl-5-nitropyridin-2-yl)-1H-1,2,3-triazole-5-carboxylic acid To a solution of (1-ethyl-4-(6-methyl-5-nitropyridin-2-yl)-1H-1,2,3-triazol-5-yl)methanol (Intermediate G1.4, 90 mg, 0.34 mmol,) in MeCN (1.6 mL) and Water (0.22 mL), $KMnO_4$ (56.92 mg, 0.360 mmol) was added and the resulting purple solution was stirred at RT overnight. HCl 3M was then added up to pH<4 and the solvent was removed under reduced pressure. The crude was purified by flash chromatography using a gradient of MeOH in DCM from 0% to 2% affording the title compound (81 mg, 0.29 mmol, 85% yield) as a white solid.

LC-MS (ESI): m/z (M+1): 278.1 (Method 1)

$^1$H NMR (400 MHz, Chloroform-d) δ ppm 8.73-8.64 (m, 2H), 5.03 (q, J=7.19 Hz, 2H), 3.03 (s, 3H), 1.63 (t, J=7.19 Hz, 3H)

Intermediate H1

4-(6-fluoro-5-(((1S,2S)-2-(methoxycarbonyl)cyclohexane-1-carboxamido)pyridin-2-yl)-1-methyl-1H-1,2,3-triazole-5-carboxylic acid

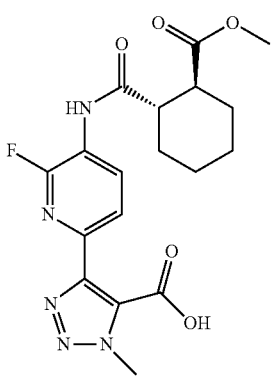 [SMILES: COC(=O)[C@H]1CCCC[C@@H]1C(=O)Nc1ccc(-c2nnn(C)c2C(=O)O)nc1F]

Step 1: (1S,2S)-2-((6-bromo-2-fluoropyridin-3-yl)carbamoyl)cyclohexane-1-carboxylic acid (Intermediate H1.1)

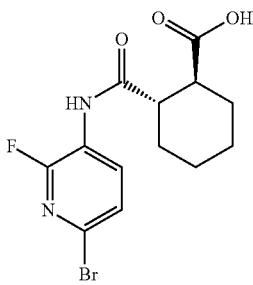 [SMILES: O=C(O)[C@H]1CCCC[C@@H]1C(=O)Nc1ccc(Br)nc1F]

To a solution of 6-bromo-2-fluoropyridin-3-amine (1.5 g, 7.1 mmol) in MeCN (36.03 mL), (−)-trans-1,2-Cyclohexanedicarboxylic anhydride (1.2 g, 7.8 mmol) was added. The mixture was stirred at 40° C. for 24 h. The solvent was removed under vacuum, then the crude was diluted with sat aq NH$_4$Cl and extracted with EtOAc. Combined organic layers were evaporated under reduced pressure to provide the title compound (7.1 mmol, crude) that was used in the next step without further purification.

LC-MS (ESI): m/z (M+1): 347.0 (Method 1)

$^1$H NMR (400 MHz, DMSO-d$_6$) δ ppm 12.10 (s, 1H), 10.05 (s, 1H), 8.38 (dd, J=9.79, 8.25 Hz, 1H), 7.56 (d, J=8.29 Hz, 1H), 3.08-2.99 (m, 1H), 2.74 (t, J=11.16 Hz, 1H), 1.99 (h, J=9.25, 8.67 Hz, 3H), 1.80-1.71 (m, 3H), 1.57-1.36 (m, 1H), 1.26 (d, J=8.31 Hz, 3H)

Step 2: methyl (1S,2S)-2-((6-bromo-2-fluoropyridin-3-yl)carbamoyl)cyclohexane-1-carboxylate (Intermediate H1.2)

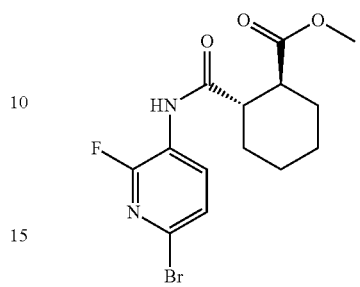

(1S,2S)-2-((6-bromo-2-fluoropyridin-3-yl)carbamoyl)cyclohexane-1-carboxylic acid (Intermediate H1.1, 7.1 mmol, crude) was added to a solution of p-Toluenesulfonic Acid Monohydrate (1.5 g, 7.8 mmol) in MeOH (50 mL). The mixture was stirred at 60° C. for 5 h. The solvent was removed under vacuum, then the crude was diluted with sat. aq. NH$_4$Cl and extracted with EtOAc. The organic layer was evaporated under reduced pressure and the crude was purified by flash chromatography using a gradient of EtOAc in cyclohexane from 0% to 35% affording the title compound (2.4 g, 6.7 mmol, 94% yield) as an orange oil.

LC-MS (ESI): m/z (M+1): 359.0 (Method 1)

Step 3: methyl (1S,2S)-2-((2-fluoro-6-(3-hydroxyprop-1-yn-1-yl)pyridin-3-yl)carbamoyl)cyclohexane-1-carboxylate (Intermediate H1.3)

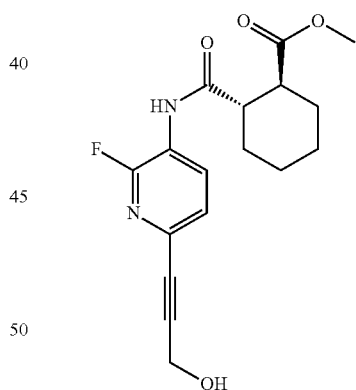

To a solution of methyl (1S,2S)-2-((6-bromo-2-fluoropyridin-3-yl)carbamoyl)cyclohexane-1-carboxylate (Intermediate H1.2, 2.4 g, 6.7 mmol) in dry MeCN (24 mL), 2-propyn-1-ol (0.6 mL, 10 mmol) and triethylamine (2.2 mL, 16 mmol) were added, followed by copper iodide (0.05 g, 0.3 mmol) and PdCl$_2$(PPh$_3$)$_2$ (0.2 g, 0.3 mmol) at 0° C. The reaction mixture was stirred at RT for 24 h, then the salts were filtered off through a celite pad and the filtrate was concentrated under reduced pressure. The crude was purified by flash chromatography using a gradient of EtOAc in cyclohexane from 0% to 60% affording the title compound (881 mg, 2.6 mmol, 39% yield) as a brown solid.

LC-MS (ESI): m/z (M+1): 335.2 (Method 1)

¹H NMR (400 MHz, DMSO-d₆) δ ppm 10.08 (s, 1H), 8.42 (dd, J=10, 8 Hz, 1H), 7.41 (d, J=8 Hz, 1H), 5.39 (dt, J=11, 6 Hz, 1H), 4.30 (d, J=6 Hz, 1H), 4.17 (d, J=6 Hz, 1H), 3.54 (s, 3H), 2.80 (t, J=11 Hz, 1H), 2.61 (dd, J=11, 8 Hz, 1H), 2.23-1.88 (m, 2H), 1.73 (s, 2H), 1.42-1.13 (m, 4H)

Step 4: methyl (1S,2S)-2-((2-fluoro-6-(5-(hydroxymethyl)-1-((trimethylsilyl)methyl)-1H-1,2,3-triazol-4-yl)pyridin-3-yl)carbamoyl)cyclohexane-1-carboxylate (Intermediate H1.4)

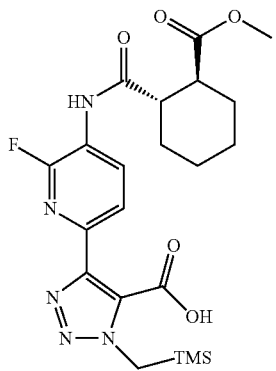 [SMILES: COC(=O)[C@H]1CCCC[C@@H]1C(=O)Nc1ccc(-c2nnn(C[Si](C)(C)C)c2C(=O)O)nc1F]

To a solution of methyl (1S,2S)-2-((2-fluoro-6-(3-hydroxyprop-1-yn-1-yl)pyridin-3-yl)carbamoyl)cyclohexane-1-carboxylate (Intermediate H1.3, 881 mg, 2.6 mmol) in dry 1,4-Dioxane (13 mL), trimethylsilylmethyl azide (2.6 mL, 4 mmol) was added. Three nitrogen/vacuum cycles were applied, then Cp*RuCl(PPh₃)₂ (0.13 g, 0.16 mmol) was added. The mixture was stirred at 70° C. for 24 h and concentrated under reduced pressure to afford a crude mixture that was purified by flash chromatography using a gradient of EtOAc in cyclohexane from 0% to 60% affording the title compound (541 mg, 1.17 mmol, 44% yield).

LC-MS (ESI): m/z (M+1): 464.2 (Method 1)

Step 5: methyl (1S,2S)-2-((2-fluoro-6-(5-(hydroxymethyl)-1-methyl-1H-1,2,3-triazol-4-yl)pyridin-3-yl)carbamoyl)cyclohexane-1-carboxylate (Intermediate H1.5)

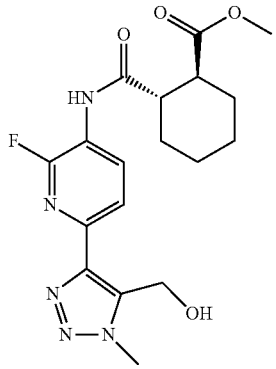 [SMILES: COC(=O)[C@H]1CCCC[C@@H]1C(=O)Nc1ccc(-c2nnn(C)c2CO)nc1F]

To a solution of methyl (1S,2S)-2-((2-fluoro-6-(5-(hydroxymethyl)-1-((trimethylsilyl)methyl)-1H-1,2,3-triazol-4-yl)pyridin-3-yl)carbamoyl)cyclohexane-1-carboxylate (Intermediate H1.4, 541 mg, 1.17 mmol) in dry THF (6 mL), TBAF 1M in THF (1.23 mL, 1.23 mmol) was added at 0° C. The reaction mixture was stirred for 1 h, then solid NaHCO₃ was added and the reaction was vigorously stirred at r.t. for 15 min. The solid was filtered off and the filtrate was concentrated under reduced pressure affording the title compound (1.17 mmol, crude) that was used in the next step without further purification.

LC-MS (ESI): m/z (M+1): 392.2 (Method 1)

Step 6: 4-(6-fluoro-5-((1S,2S)-2-(methoxycarbonyl)cyclohexane-1-carboxamido) pyridin-2-yl)-1-methyl-1H-1,2,3-triazole-5-carboxylic acid To a solution of methyl (1S,2S)-2-((2-fluoro-6-(5-(hydroxymethyl)-1-methyl-1H-1,2,3-triazol-4-yl)pyridin-3-yl)carbamoyl)cyclohexane-1-carboxylate (Intermediate H1.5, 1.17 mmol) in MeCN (8 mL) and Water (1 mL), KMnO₄ (194 mg, 1.2 mmol) was added and the resulting purple solution was stirred at r.t. overnight. HCl 3M was then added up to pH<4 and the solvent was removed under reduced pressure. The crude was purified by reverse phase flash chromatography using a gradient of MeCN in water from 5% to 55% affording the title compound (179 mg, 0.44 mmol, 38% yield).

LC-MS (ESI): m/z (M+1): 406.1 (Method 1)

Intermediate I1

1-methyl-4-(4-nitrophenyl)-1H-pyrazol-5-amine

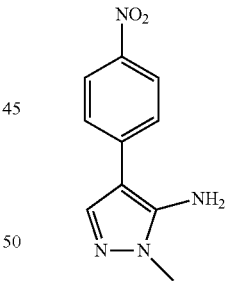

A mixture of 4-bromo-2-methylpyrazol-3-amine (800 mg, 4.5 mmol), (4-nitrophenyl)boronic acid (1.14 g, 6.8 mmol), Pd(dppf)Cl₂ (446 mg, 0.68 mmol) and K₃PO₄ (1.93 g, 9.09 mmol) was degassed. Water (8 mL) and 1,4-Dioxane (24 mL) were added and the mixture was stirred at 120° C. for 2 h. The mixture was cooled to r.t. and concentrated under reduced pressure. The residue was extracted with DCM, the solvent was evaporated and the residue was triturated with MeOH to give the title compound (1.13 g, 5 mmol, crude) as a light brown solid that was used in the next step without further purification.

LC-MS (ESI): m/z (M+1): 219.1 (Method 1)

Intermediate J1

(R)-1-(2-chlorophenyl)ethyl (5-(5-bromo-6-methylpyridin-2-yl)-3-methylisoxazol-4-yl)carbamate

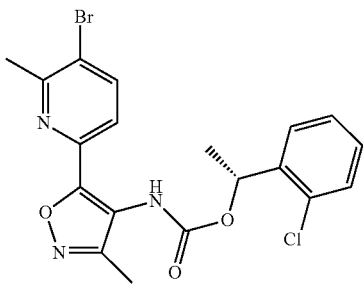 [SMILES: Cc1nc(-c2onc(C)c2NC(=O)O[C@H](C)c2ccccc2Cl)ccc1Br]

A 100 mL three-necked flask equipped with stir bar, reflux condenser, thermometer and nitrogen/vacuum stopcock was charged with Intermediate E1 (1.8 g, 6 mmol) and (R)-1-(2-chlorophenyl)ethanol (1.14 g, 7.3 mmol). The system was closed and three cycles of vacuum/nitrogen back-filling were applied. Dry Toluene (20 mL) was added, followed by triethylamine (1.65 mL, 12.12 mmol) and DPPA (1.96 mL, 9.1 mmol). The solution was slowly heated to 125° C. and stirred at reflux over 30 min. The resulting slurry was cooled to r.t., filtered over a phase separator, and the filtrate was concentrated under reduced pressure. The crude was purified by flash column chromatography eluting with a gradient of EtOAc in cyclohexane from 5% to 50% to afford the title compound (2.69 g, 5.97 mmol, 98.5% yield) as a pale yellow oil.

LC-MS (ESI): m/z (M+1): 452.3 (Method 1)

The Intermediates in the following table were prepared from reagents reported below by using methods analogous to Intermediate J1.

| Intermediate | Structure & Name | Reagents | Analytical data |
|---|---|---|---|
| J2 | (R)-1-(2-chlorophenyl)ethyl (1-methyl-4-(6-methyl-5-nitropyridin-2-yl)-1H-pyrazol-5-yl)carbamate | E2 + (R)-1-(2-chlorophenyl)ethanol | LC-MS (ESI): m/z (M + 1): 416.11 (Method 1) |
| J3 | (R)-1-(2-chlorophenyl)ethyl (1-methyl-4-(6-methyl-5-nitropyridin-2-yl)-1H-1,2,3-triazol-5-yl)carbamate | F1 + (R)-1-(2-chlorophenyl)ethanol | LC-MS (ESI): m/z (M + 1): 417 (Method 1) $^1$H NMR (400 MHz, Chloroform-d) δ ppm 9.28 (s, 1H), 8.47 (d, J = 8.67 Hz, 1H), 8.19 (dd, J = 8.66, 0.63 Hz, 1H), 7.50 (dd, J = 7.55, 1.98 Hz, 1H), 7.41 (dd, J = 7.73, 1.57 Hz, 1H), 7.25-7.28 (m, 1H), 7.29-7.36 (m, 1H), 6.28 (q, J = 6.55 Hz, 1H), 4.13 (s, 3H), 2.97 (s, 3H), 1.67 (d, J = 6.56 Hz, 3H) |

| Intermediate | Structure & Name | Reagents | Analytical data |
|---|---|---|---|
| J4 | (R)-1-(2-chlorophenyl)ethyl N-[2-(4-nitrophenyl)thiophen-3-yl)carbamate | E3 + (R)-1-(2-chlorophenyl)ethanol | LC-MS (ESI): m/z (M − 1): 401.2 (Method 1) |
| J5 | (R)-1-(2-chlorophenyl)ethyl N-[2-(4-nitrophenyl)thiophen-3-yl)carbamate | E4 + (1R)-1-(2-chloropyridin-3-yl)ethan-1-ol | LC-MS (ESI): m/z (M + 1): 418.2 (Method 1) |
| J6 | (R)-1-(pyridin-3-yl)ethyl (5-(5-bromo-6-methylpyridin-2-yl)-3-methylisoxazol-4-yl)carbamate | E1 + (R)-1-(3-Pyridyl)ethanol | LC-MS (ESI): m/z (M + 1): 417.3 (Method 1) |
| J7 | ((R)-1-(2-chlorophenyl)ethyl (3-methyl-5-(5-nitropyridin-2-yl)isoxazol-4-yl)carbamate | E5 + (R)-1-(2-chlorophenyl)ethanol | LC-MS (ESI): m/z (M + 1): 403.1 (Method 1) $^1$H NMR (400 MHz, DMSO-$d_6$) δ ppm 9.55 (br s, 1H), 9.33 (dd, J = 2.7, 0.7 Hz, 1H), 8.69 (dd, J = 8.8, 2.7 Hz, 1H), 8.04 (d, J = 8.8 Hz, 1H), 7.59-7.34 (m, 3H), 5.97 (q, J = 6.5 Hz, 1H), 2.23 (s, 3H), 1.51 (br s, 3H) |

-continued

| Intermediate | Structure & Name | Reagents | Analytical data |
|---|---|---|---|
| J8 | 1-(2-fluoropyridin-3-yl)ethyl(3-methyl-5-(5-nitropyridin-2-yl)isoxazol-4-yl)carbamate | E5 + (1-(2-Fluoropyridin-3-yl)ethanol | LC-MS (ESI): m/z (M + 1): 388.1 (Method 1) $^1$H NMR (400 MHz, DMSO-d$_6$) δ ppm 9.47 (s, 1H), 9.30 (dd, J = 2.6, 0.7 Hz, 1H), 8.69 (dd, J = 8.8, 2.7 Hz, 1H), 8.20 (s, 1H), 8.12-7.90 (m, 2H), 7.51-7.38 (m, 1H), 5.83 (q, J = 6.6 Hz, 1H), 2.22 (s, 3H), 1.59 (br s, 3H) |
| J9 | 1-(2-fluoropyridin-3-yl)ethyl (5-(5-bromo-6-methylpyridin-2-yl)-3-methylisoxazol-4-yl)carbamate | E1 + (1-(2-Fluoropyridin-3-yl)ethanol | LC-MS (ESI): m/z (M + 1): 435.2 (Method 1) $^1$H NMR (400 MHz, Chloroform-d) δ ppm 8.79-8.51 (m, 1 H), 8.19 (d, J = 4.84 Hz, 1 H), 7.96 (d, J = 8.36 Hz, 1 H), 7.92-7.77 (m, 1 H), 7.55 (d, J = 8.14 Hz, 1 H), 7.25-7.14 (m, 1 H), 6.12-5.94 (m, 1 H), 2.75 (s, 3 H), 2.46 (s, 3 H), 1.67 (d, J = 6.82 Hz, 3 H) |
| J10 | (R)-1-(2-chlorophenyl)ethyl thiophen-3-ylcarbamate | 3-Thiophene-carboxylic acid + (R)-1-(2-chlorophenyl)ethanol | LC-MS (ESI): m/z (M − 1): 281.9 (Method 1) $^1$H NMR (400 MHz, DMSO-d$_6$) δ ppm 10.12 (s, 1 H), 7.57-7.31 (m, 5 H), 7.17 (br s, 1 H), 7.01 (dd, J = 5.15, 1.37 Hz, 1 H), 6.05 (q, J = 6.56 Hz, 1 H), 1.53 (d, J = 6.58 Hz, 3 H) |
| J11 | (R)-1-(thiazol-2-yl)ethyl (5-(5-bromo-6-methylpyridin-2-yl)-3-methylisoxazol-4-yl)carbamate | E1 + (1R)-1-(1,3-thiazol-2-yl)ethan-1-ol | LC-MS (ESI): m/z (M + 1): 423.02 (Method 1) $^1$H NMR (400 MHz, DMSO-d$_6$) δ ppm 9.42 (s, 1H), 8.19 (d, J = 8.30 Hz, 1H), 7.87-7.65 (m, 2H), 7.60 (d, J = 8.30 Hz, 1H), 6.01 (s, 1H), 2.60 (s, 4H), 2.22 (s, 4H), 1.66 (s, 3H) |

| Intermediate | Structure & Name | Reagents | Analytical data |
| --- | --- | --- | --- |
| J12 | (R)-1-(2-chlorophenyl)ethyl (1-methyl-4-(4-nitrophenyl)-1H-1,2,3-triazol-5-yl)carbamate | F2 + (R)-1-(2-chlorophenyl) ethanol | LC-MS (ESI): m/z (M + 1): 402.06 (Method 1) |
| J13 | tert-butyl (1S,2S)-2-((6-(4-((((R)-1-(2-fluorophenyl)ethoxy)carbonyl)amino)-3-methylisoxazol-5-yl)-2-methylpyridin-3-yl)carbamoyl)cyclohexane-1-carboxylate | E7 + (R)-1-(2-fluorophenyl) ethanol | LC-MS (ESI): m/z (M + 1): 581.20 (Method 2) $^1$H NMR (300 MHz, DMSO-d$_6$) δ 9.60 (s, 1H), 9.17 (bs, 1H), 8.03-7.87 (m, 1H), 7.61 (d, J = 8.4 Hz, 1H), 7.35 (s, 1H), 7.31-7.06 (m, 3H), 6.05-5.81 (m, 1H), 2.78-2.60 (m, 1H), 2.49-2.44 (m, 1H), 2.41 (s, 3H), 2.17 (s, 3H), 2.10-1.89 (m, 2H), 1.87-1.64 (m, 2H), 1.62-1.42 (m, 3H), 1.36 (s, 9H), 1.31 (t, J = 6.6 Hz, 4H) |
| J14 | tert-butyl (1S,2S)-2-((2-methyl-6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylate | E7 + (R)-1-(2-trifluoromethyl phenyl) ethanol | LC-MS (ESI): m/z (M + 1): 631.08 (Method 5) $^1$H NMR (300 MHz, DMSO-d$_6$) δ ppm 9.60 (s, 1H), 9.20 (bs, 1H), 8.03-7.90 (m, 1H), 7.91-7.64 (m, 3H), 7.61 (d, J = 8.4 Hz, 1H), 7.58-7.46 (m, 1H), 6.14-5.92 (m, 1H), 2.70-2.64 (m, 1H), 2.48-2.42 (m, 1H), 2.39 (s, 3H), 2.15 (s, 3H), 2.09-1.90 (m, 2H), 1.89-1.64 (m, 2H), 1.64-1.46 (m, 2H), 1.36 (s, 9H), 1.30-1.21 (m, 5H) |

| Intermediate | Structure & Name | Reagents | Analytical data |
|---|---|---|---|
| J15 | tert-butyl (1S,2S)-2-((6-(4-((((R)-1-cyclopentylethoxy)carbonyl)amino)-3-methylisoxazol-5-yl)-2-methylpyridin-3-yl)carbamoyl)cyclohexane-1-carboxylate | E7 (R)-1-cyclopentyl ethan-1-ol | LC-MS (ESI): m/z (M + 1): 555.25 (Method 2) $^1$H NMR (300 MHz, DMSO-d$_6$) δ ppm 9.63 (s, 1H), 8.89 (bs, 1H), 8.02-7.91 (m, 1H), 7.65 (d, J = 8.4 Hz, 1H), 4.60 (t, J = 6.6 Hz, 1H), 2.69 (t, J = 11.3 Hz, 1H), 2.46 (s, 3H), 2.20 (s, 3H), 1.99 (s, 3H), 1.76 (s, 2H), 1.53 (d, J = 16.4 Hz, 7H), 1.35 (s, 9H), 1.30 (d, J = 7.2 Hz, 4H), 1.21 (d, J = 19.0 Hz, 5H) |
| J16 | (R)-1-phenylethyl (5-(5-bromo-6-methylpyridin-2-yl)-3-methylisoxazol-4-yl)carbamate | E1 + (R)-1-phenylethan-1-ol | LC-MS (ESI): m/z (M + 1): 415.95 (Method 2) $^1$H NMR (300 MHz, DMSO-d$_6$) δ ppm 9.20 (s, 1H), 8.14 (d, J = 8.3 Hz, 1H), 7.54 (d, J = 8.3 Hz, 1H), 7.46-7.26 (m, 5H), 5.72 (q, J = 6.8 Hz, 1H), 2.56 (s, 3H), 2.18 (s, 3H), 1.46 (s, 3H) |
| J17 | tert-butyl (1S,2S)-2-((6-(4-((((R)-1-(2-bromophenyl)ethoxy)carbonyl)amino)-3-methylisoxazol-5-yl)-2-methylpyridin-3-yl)carbamoyl)cyclohexane-1-carboxylate | E7 + (R)-1-(2-bromophenyl)ethanol | LC-MS (ESI): m/z (M + 1): 641.15 (Method 2) $^1$H NMR (300 MHz, DMSO-d$_6$) δ ppm 9.61 (s, 1H), 9.24 (bs, 1H), 8.07-7.90 (m, 1H), 7.77-7.32 (m, 5H), 7.32-7.14 (m, 1H), 5.93 (s, 1H), 2.68 (d, J = 10.1 Hz, 1H), 2.42 (s, 3H), 2.18 (s, 3H), 2.00 (s, 2H), 1.77 (s, 2H), 1.65-1.41 (m, 3H), 1.36 (s, 9H), 1.34-1.22 (m, 4H) |

-continued

| Intermediate | Structure & Name | Reagents | Analytical data |
|---|---|---|---|
| J18 | (R)-1-(2-chloropyridin-3-yl)ethyl (3-methyl-5-(5-nitropyridin-2-yl)isoxazol-4-yl)carbamate | E5 + (R)-1-(2-chloropyridin-3-yl)ethan-1-ol | LC-MS (ESI): m/z (M + 1): 404 (Method 1) $^1$H NMR (400 MHz, Chloroform-d) δ ppm 9.54 (dd, J = 2.63, 0.74 Hz, 1H), 8.67 (dd, J = 8.75, 2.58 Hz, 1H), 8.51 (s, 1H), 8.39 (dd, J = 4.78, 1.91 Hz, 1H), 8.05 (dd, J = 8.73, 0.74 Hz, 1H), 7.86 (dd, J = 7.76, 1.93 Hz, 1H), 7.33 (dd, J = 7.68, 4.90 Hz, 1H), 6.18 (q, J = 6.55 Hz, 1H), 2.49 (s, 3H), 1.68 (d, J = 6.58 Hz, 3H) |
| J19 | ((R)-1-(2-chlorophenyl)ethyl (5-(5-bromo-3-fluoropyridin-2-yl)-3-methylisoxazol-4-yl)carbamate | E6 + (R)-1-(2-bromophenyl)ethanol | LC-MS (ESI): m/z (M + 1): 453.95 (Method 2) $^1$H NMR (300 MHz, DMSO-d$_6$) δ ppm 9.52 (s, 1H), 8.64 (t, J = 1.5 Hz, 1H), 8.32 (d, J = 9.9 Hz, 1H), 7.64-7.50 (m, 1H), 7.45 (d, J = 7.9 Hz, 2H), 7.40-7.29 (m, 1H), 5.89 (q, J = 6.5 Hz, 1H), 2.24 (s, 3H), 1.49 (s, 3H) |
| J20 | (R)-1-(o-tolyl)ethyl (5-(5-bromo-6-methylpyridin-2-yl)-3-methylisoxazol-4-yl)carbamate | E1 + (R)-1-(o-tolyl)ethan-1-ol | LC-MS (ESI): m/z (M + 1): 430.05 (Method 2) $^1$H NMR (300 MHz, DMSO-d$_6$) δ ppm 9.19 (s, 1H), 8.13 (d, J = 8.3 Hz, 1H), 7.53 (d, J = 8.3 Hz, 1H), 7.43-7.03 (m, 4H), 5.88 (q, J = 6.7 Hz, 1H), 2.56 (s, 3H), 2.29 (s, 3H), 2.17 (s, 3H), 1.47 (s, 3H) |
| J21 | | E8 + (R)-1-(2-fluorophenyl)ethanol | LC-MS (ESI): m/z (M + 1): 420 (Method 2) $^1$H NMR (300 MHz, DMSO-d$_6$) δ ppm 9.32 (s, 1H), 8.73 (d, J = 1.9 Hz, 1H), 8.20 (dd, J = 8.5, 2.4 Hz, 1H), 7.74 (dd, J = 8.5, 0.8 Hz, 1H), 7.48-7.08 (m, 4H), 5.91 (q, J = 6.7 Hz, 1H), 2.18 (s, 3H), 1.53 (s, 3H) |

-continued

| Intermediate | Structure & Name | Reagents | Analytical data |
|---|---|---|---|
| | (R)-1-(2-fluorophenyl)ethyl (3-methyl-5-(5-bromopyridin-2-yl)isoxazol-4-yl)carbamate | | |
| J22 | 2-chlorobenzyl (3-methyl-5-(5-nitropyridin-2-yl)isoxazol-4-yl)carbamate | E5 + (2-chlorophenyl) methanol | LC-MS (ESI): m/z (M + 1): 389.0 (Method 1) $^1$H NMR (400 MHz, DMSO-d$_6$) δ ppm 9.68-9.40 (m, 1 H), 9.35 (br. s., 1 H), 8.79-8.65 (m, 1 H), 8.09 (d, J = 8.80 Hz, 1 H), 7.64-7.33 (m, 4 H), 5.21 (br. s., 2 H), 2.27 (s, 3 H) |
| J23 | (R)-1-(2-(trifluoromethyl)phenyl) ethyl (5-(5-bromopyridin-2-yl)-3-methylisoxazol-4-yl)carbamate | E8 + (R)-1-(2-trifluoromethyl phenyl) ethanol | LC-MS (ESI): m/z (M + 1): 469.95 (Method 2) $^1$H NMR (300 MHz, DMSO-d$_6$) δ ppm 9.13 (s, 1H), 8.85-8.40 (m, 3H), 8.30 (d, J = 8.5 Hz, 1H), 7.94-7.65 (m, 1H), 7.57 (d, J = 8.4 Hz, 1H), 7.47-7.29 (m, 1H), 5.95-5.68 (m, 1H), 2.46 (s, 3H), 2.16 (s, 3H) |
| J24 | (R)-1-(2-methoxyphenyl)ethyl (5-(5-bromopyridin-2-yl)-3-methylisoxazol-4-yl)carbamate | E8 + (R)-1-(2-methoxy-phenyl)ethanol | LC-MS (ESI): m/z (M + 1): 432.00 (Method 2) $^1$H NMR (300 MHz, DMSO-d$_6$) δ ppm δ 9.24 (s, 1H), 8.77 (d, J = 2.4, 0.7 Hz, 1H), 8.21 (dd, J = 8.5, 2.4 Hz, 1H), 7.75 (d, J = 8.5, 0.8 Hz, 1H), 7.52-7.36 (m, 1H), 7.36-7.12 (m, 1H), 7.00 (d, J = 8.3 Hz, 1H), 6.98-6.88 (m, 1H), 5.97 (q, J = 6.5 Hz, 1H), 3.79 (s, 3H), 2.19 (s, 3H), 1.44 (s, 3H) |
| J25 | | E1 + (R)-1-(2-methoxy-phenyl)ethanol | LC-MS (ESI): m/z (M + 1): 447.15 (Method 2) $^1$H NMR (300 MHz, DMSO-d$_6$) δ ppm 8.14 (d, J = 8.3 Hz, 1H), 7.55 (d, J = 8.3 Hz, 1H), 7.47-7.38 (m, 1H), 7.32-7.22 (m, 1H), 7.24-7.12 (m, 1H), 6.99 (d, J = 8.3 Hz, 1H), 6.98-6.87 (m, 1H), 5.98 (q, J = 6.7 Hz, 1H), 3.79 (s, 3H), 2.57 (s, 3H), 2.19 (s, 3H), 1.52-1.29 (m, 3H) |

| Intermediate | Structure & Name | Reagents | Analytical data |
|---|---|---|---|
| | (R)-1-(2-methoxyphenyl)ethyl (5-(5-bromo-6-methylpyridin-2-yl)-3-methylisoxazol-4-yl)carbamate | | |
| J26 | (R)-1-phenylethyl (5-(5-bromopyridin-2-yl)-3-methylisoxazol-4-yl)carbamate | E8 + (R)-1-phenylethan-1-ol | LC-MS (ESI): m/z (M + 1): 402.00 (Method 2) ¹H NMR (300 MHz, DMSO-d₆) ¹H NMR (300 MHz, DMSO-d₆) δ 9.24 (bs, 1H), 8.73 (d, J = 2.3 Hz, 1H), 8.20 (dd, J = 8.5, 2.4 Hz, 1H), 7.74 (d, J = 8.4, 0.8 Hz, 1H), 7.64-7.22 (m, 5H), 5.72 (q, J = 6.5 Hz, 1H), 2.18 (s, 3H), 1.50 (s, 3H) |
| J27 | (R)-1-(2-chlorophenyl)ethyl (5-bromoisothiazol-4-yl)carbamate | 5-bromoisothiazole-4-carboxylic acid + (R)-1-(2-chlorophenyl)ethanol | LC-MS (ESI): m/z (M − 1): 376.95 (Method 1) ¹H NMR (400 MHz, DMSO-d₆) δ ppm 9.30-9.63 (m, 1 H) 7.29-7.52 (m, 4 H) 6.01 (q, J = 6.53 Hz, 1 H) 2.28 (s, 3 H) 1.55 (br. s., 3 H) |
| J28 | (R)-1-phenylethyl (1-methyl-4-(6-methyl-5-nitropyridin-2-yl)-1H-pyrazol-5-yl)carbamate | E2 + (R)-1-phenylethan-1-ol | LC-MS (ESI): m/z (M − 1): 382.22 (Method 1) ¹H NMR (400 MHz, DMSO-d₆) δ ppm 9.42-9.95 (m, 1 H) 8.34 (d, J = 8.58 Hz, 1 H) 8.11 (s, 1 H) 7.61 (d, J = 8.58 Hz, 1 H) 7.15-7.49 (m, 5 H) 5.76 (s, 1 H) 3.69 (s, 3 H) 2.69 (s, 3 H) 1.23-1.68 (m, 3 H) |
| J29 | (R)-1-phenylethyl (1-methyl-4-(6-methyl-5-nitropyridin-2-yl)-1H-1,2,3-triazol-5-yl)carbamate | F1 + (R)-1-phenylethan-1-ol | LC-MS (ESI): m/z (M + 1): 383.2 (Method 1) |

| Intermediate | Structure & Name | Reagents | Analytical data |
|---|---|---|---|
| J30 | 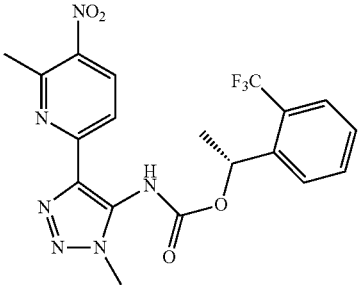 [SMILES: Cc1nc(-c2nnn(C)c2NC(=O)O[C@H](C)c2ccccc2C(F)(F)F)ccc1[N+](=O)[O-]]<br>(R)-1-(2-(trifluoromethyl)phenyl)ethyl (1-methyl-4-(6-methyl-5-nitropyridin-2-yl)-1H-1,2,3-triazol-5-yl)carbamate | F1 + (R)-1-(2-trifluoromethyl phenyl) ethanol | LC-MS (ESI): m/z (M + 1): 451.2 (Method 1)<br>$^1$H NMR (400 MHz, DMSO-$d_6$) δ ppm 9.25 (s, 1H), 8.46 (d, J = 8.67 Hz, 1H), 8.18 (dd, J = 8.64, 0.62 Hz, 1H), 7.76-7.67 (m, 2H), 7.61 (t, J = 7.63 Hz, 1H), 7.51-7.37 (m, 1H), 6.30 (q, J = 6.49 Hz, 1H), 4.11 (s, 3H), 2.96 (s, 3H), 1.68 (d, J = 6.47 Hz, 3H) |
| J31 | 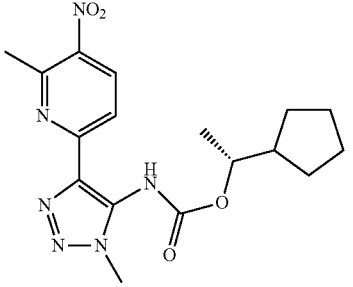 [SMILES: Cc1nc(-c2nnn(C)c2NC(=O)O[C@H](C)C2CCCC2)ccc1[N+](=O)[O-]]<br>(R)-1-cyclopentylethyl (1-methyl-4-(6-methyl-5-nitropyridin-2-yl)-1H-1,2,3-triazol-5-yl)carbamate | F1 + (R)-1-cyclopentyl ethan-1-ol | LC-MS (ESI): m/z (M + 1): 375.2 (Method)<br>$^1$H NMR (400 MHz, Chloroform-d) δ ppm 1 Hz, 1H), 4.81 (dq, J = 7.67, 6.26 Hz, 1H), 4.17 (s, 3H), 2.94 (s, 3H), 1.86-1.71 (m, 2H), 1.58 (s, 5H), 1.45-1.38 (m, 1H), 1.35 (d, J = 6.22 Hz, 3H), 1.32 1.18 (m, 1H) |
| J32 | 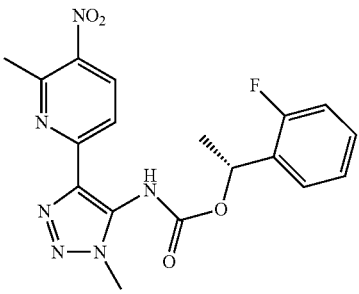 [SMILES: Cc1nc(-c2nnn(C)c2NC(=O)O[C@H](C)c2ccccc2F)ccc1[N+](=O)[O-]]<br>(R)-1-(2-fluorophenyl)ethyl (1-methyl-4-(6-methyl-5-nitropyridin-2-yl)-1H-1,2,3-triazol-5-yl)carbamate | F1 + (R)-1-(2-fluorophenyl) ethanol | LC-MS (ESI): m/z (M + 1): 401.2 (Method 1)<br>$^1$H NMR (400 MHz, Chloroform-d) δ ppm 9.22 (s, 1H), 8.43 (d, J = 8.66 Hz, 1H), 8.16 (d, J = 8.63 Hz, 1H), 7.41 (t, J = 7.43 Hz, 1H), 7.34-7.27 (m, 1H), 7.18-7.11 (m, 1H), 7.07 (ddd, J = 10.58, 8.24, 1.20 Hz, 1H), 6.15 (q, J = 6.64 Hz, 1H), 4.11 (s, 3H), 2.93 (s, 3H), 1.67 (d, J = 6.63 Hz, 3H) |

| Intermediate | Structure & Name | Reagents | Analytical data |
|---|---|---|---|
| J33 | 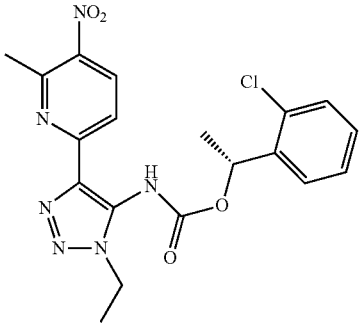 [SMILES: CCn1nnc(-c2ccc([N+](=O)[O-])c(C)n2)c1NC(=O)O[C@H](C)c1ccccc1Cl]<br>(R)-1-(2-chlorophenyl)ethyl (1-ethyl-4-(6-methyl-5-nitropyridin-2-yl)-1H-1,2,3-triazol-5-yl)carbamate | G1 + (R)-1-(2-chlorophenyl) ethanol | LC-MS (ESI): m/z (M + 1): 431.2 (Method 1)<br>$^1$H NMR (400 MHz, Chloroform-d) δ ppm 9.22 (br s, 1H), 8.46 (d, J = 8.62 Hz, 1H), 8.20 (dd, J = 8.63, 0.64 Hz, 1H), 7.51-7.45 (m, 1H), 7.40 (dd, J = 7.49, 1.78 Hz, 1H), 7.35-7.21 (m, 2H), 6.28 (q, J = 6.51 Hz, 1H), 4.55 (qd, J = 7.30, 0.95 Hz, 2H), 2.95 (s, 3H), 1.66 (d, J = 6.56 Hz, 3H), 1.58 (t, J = 7.29 Hz, 3H) |
| J34 | 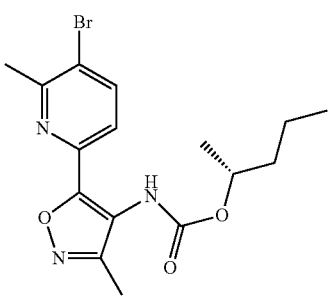 [SMILES: CCC[C@@H](C)OC(=O)Nc1c(C)noc1-c1ccc(Br)c(C)n1]<br>((R)-pentan-2-yl (5-(5-bromo-6-methylpyridin-2-yl)-3-methylisoxazol-4-yl)carbamate | E1 + (R)-(-)-2-Pentanol | LC-MS (ESI): m/z (M + 1): 382.1 (Method 1)<br>$^1$H NMR (400 MHz, DMSO-$d_6$) δ ppm 8.83-9.03 (m, 1 H), 8.20 (d, J = 8.36 Hz, 1 H), 7.58 (d, J = 8.58 Hz, 1 H), 4.63-4.78 (m, 1 H), 2.63 (s, 3 H), 2.21 (s, 3 H), 1.05-1.66 (m, 7 H), 0.78-0.94 (m, 3 H) |
| J35 | 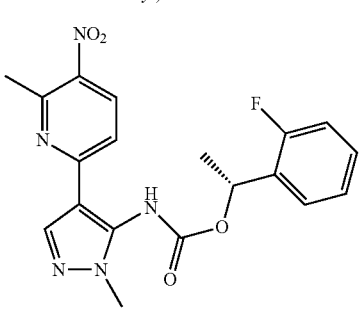<br>(R)-1-(2-fluorophenyl)ethyl (1-methyl-4-(6-methyl-5-nitropyridin-2-yl)-1H-pyrazol-5-yl)carbamate | E2 + (R)-1-(2-fluorophenyl) ethanol | LC-MS (ESI): m/z (M + 1): 400.17 (Method 1)<br>$^1$H NMR (400 MHz, DMSO-$d_6$) δ ppm 9.34-10.05 (m, 1 H) 8.33 (s, 1 H) 8.12 (s, 1 H) 7.62 (d, J = 8.58 Hz, 1 H) 7.13-7.44 (m, 4 H) 5.87-6.06 (m, 1 H) 3.69 (s, 3 H) 2.69 (br. s., 3 H) 1.27-1.75 (m, 3 H) |
| J36 | 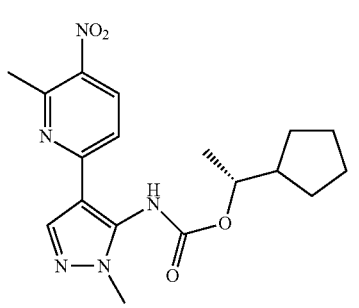 [SMILES: Cc1nc(-c2cnn(C)c2NC(=O)O[C@H](C)C2CCCC2)ccc1[N+](=O)[O-]]<br> | E2 + (R)-1-cyclopentyl ethan-1-ol | LC-MS (ESI): m/z (M + 1): 374.21 (Method 1)<br>$^1$H NMR (400 MHz, DMSO-$d_6$) δ ppm 9.24-9.74 (m, 1 H) 8.43 (d, J = 8.58 Hz, 1 H) 8.11 (s, 1 H) 7.66 (d, J = 8.58 Hz, 1 H) 4.62 (br. s., 1 H) 3.62-3.77 (m, 3 H) 2.77 (s, 3 H) 0.96-2.07 (m, 12 H) |

-continued

| Intermediate | Structure & Name | Reagents | Analytical data |
|---|---|---|---|
| | (R)-1-cyclopentylethyl (1-methyl-4-(6-methyl-5-nitropyridin-2-yl)-1H-pyrazol-5-yl)carbamate | | |
| J37 | 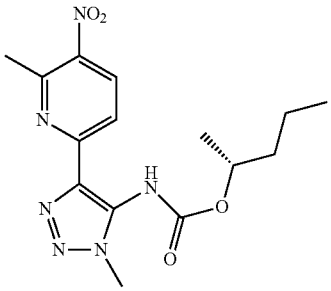 [SMILES: CCC[C@@H](C)OC(=O)Nc1c(-c2ccc([N+](=O)[O-])c(C)n2)nnn1C]<br>(R)-pentan-2-yl (1-methyl-4-(6-methyl-5-nitropyridin-2-yl)-1H-1,2,3-triazol-5-yl)carbamate | F1 + (R)-(-)-2-Pentanol | LC-MS (ESI): m/z (M + 1): 349 (Method 1)<br>$^1$H NMR (400 MHz, DMSO-$d_6$) δ ppm 9.62 (s, 1H), 8.52 (d, J = 8.6 Hz, 1H), 8.07 (d, J = 8.6 Hz, 1H), 4.73 (s, 1H), 3.92 (s, 3H), 2.78 (s, 3H), 1.18 (s, 7H), 0.84 (s, 3H) |
| J38 | 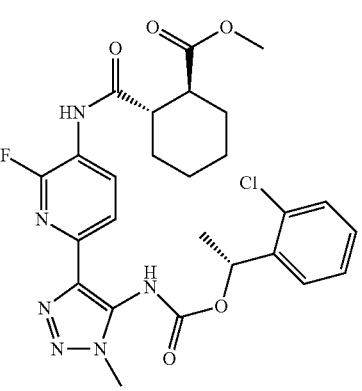 [SMILES: COC(=O)[C@H]1CCCC[C@@H]1C(=O)Nc1ccc(-c2nnn(C)c2NC(=O)O[C@H](C)c2ccccc2Cl)nc1F]<br>methyl (1S,2S)-2-((6-(5-((((R)-1-(2-chlorophenyl)ethoxy)carbonyl)amino)-1-methyl-1H-1,2,3-triazol-4-yl)-2-fluoropyridin-3-yl)carbamoyl)cyclohexane-1-carboxylate | H1 + (R)-1-(2-chlorophenyl)ethanol | LC-MS (ESI): m/z (M + 1): 559.14 (Method 1)<br>$^1$H NMR (400 MHz, DMSO-$d_6$) δ ppm 10.00 (1 H, br. s.), 9.88 (1 H, br. s.), 8.44 (1 H, t, J = 9.13 Hz), 7.86-7.81 (1 H, m), 7.51-7.26 (3 H, m), 6.00 (1 H, d, J = 6.16 Hz), 3.93-3.83 (3 H, m), 3.59-3.56 (3 H, m), 2.82 (1 H, t, J = 11.22 Hz), 2.67-2.59 (1 H, m), 2.07-1.95 (2 H, m), 1.82-1.73 (2 H, m), 1.57 (2 H, d, J = 3.52 Hz), 1.35-1.25 (3 H, m) |

Intermediate K1

(1R)-1-(2-chlorophenyl)ethyl N-(1-methyl-4-(4-nitrophenyl)-1H-pyrazol-5-yl)carbamate

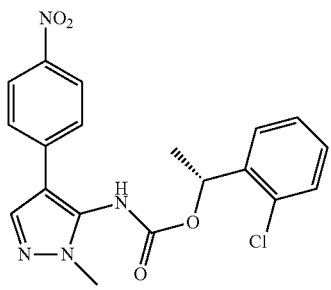 [SMILES: C[C@@H](OC(=O)Nc1c(-c2ccc([N+](=O)[O-])cc2)cnn1C)c1ccccc1Cl]

To a solution of (R)-1-(2-chlorophenyl)ethanol (631.6 mg, 4.03 mmol) in DCM (16 mL)/MeCN (16 mL), N,N'-Disuccinimidyl Carbonate (939 mg, 3.7 mmol) and DMAP (152 mg, 1.25 mmol) were added and the mixture was stirred for 1 h at 40° C. The reaction was cooled to r.t. then 1-methyl-4-(4-nitrophenyl)-1H-pyrazol-5-amine (Intermediate I1, 800 mg, 3.7 mmol) was added and the solution was stirred at 40° C. overnight. The reaction mixture was concentrated and partitioned between a citrate buffer solution (pH 5.2) and EtOAc, the organic layer was washed with NaHCO$_3$ saturated solution, dried over a phase separator and the solvent was evaporated under reduced pressure. The residue was purified by flash chromatography eluting with a gradient of EtOAc in cyclohexane from 5% to 50% to afford the title compound (632 mg, 1.57 mmol, 43% yield) as a yellow oil.

LC-MS (ESI): m/z (M+1): 401.2 (Method 1)

$^1$H NMR (400 MHz, DMSO-d$_6$) δ ppm 9.90 (s, 1H), 8.19 (d, J=8.6 Hz, 2H), 7.98 (s, 1H), 7.75 (d, J=8.7 Hz, 2H), 7.69-7.26 (m, 4H), 6.06-5.92 (m, 1H), 3.67 (s, 3H), 1.67-1.42 (m, 3H)

Intermediate L1

(R)-1-(2-chlorophenyl)ethyl (5-(5-amino-6-methylpyridin-2-yl)-3-methylisoxazol-4-yl)carbamate

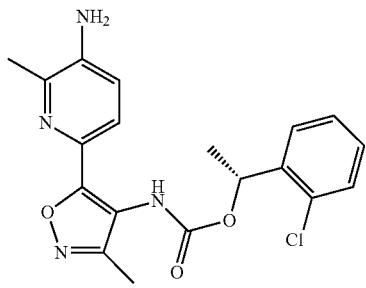 [SMILES: Cc1nc(-c2onc(C)c2NC(=O)O[C@H](C)c2ccccc2Cl)ccc1N]

Step 1: (R)-1-(2-chlorophenyl)ethyl (5-(5-((diphenylmethylene)amino)-6-methylpyridin-2-yl)-3-methylisoxazol-4-yl)carbamate (Intermediate L1.1)

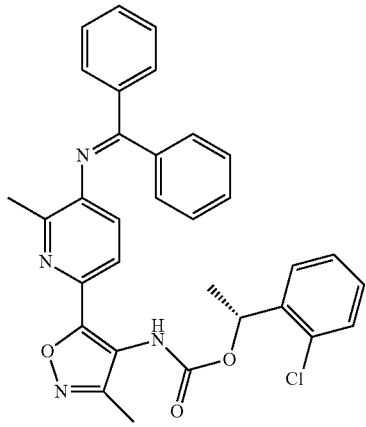 [SMILES: Cc1nc(-c2onc(C)c2NC(=O)O[C@H](C)c2ccccc2Cl)ccc1N=C(c1ccccc1)c1ccccc1]

A 5 mL tube equipped with a stir bar was charged with Intermediate J1 (850 mg, 1.89 mmol), Cs$_2$CO$_3$ (1.84 g, 5.66 mmol), Pd$_2$(dba)$_3$ (81 mg, 0.09 mmol) and Xantphos (164 mg, 0.28 mmol). The tube was sealed and three cycles of vacuum/nitrogen back-filling were performed. 1,4-Dioxane (12 mL) and benzophenone imine (0.47 mL, 2.83 mmol) were added and three cycles of vacuum/nitrogen back-filling were repeated. The tube was sealed and the mixture was heated at 90° C. for 16 h. The mixture was filtered, the solid was washed with EtOAc (3×5 mL) and the filtrate was concentrated under reduced pressure. The residue was purified by flash column chromatography eluting with a gradient of EtOAc in cyclohexane from 5% to 80% to provide the title compound (840 mg, 1.5 mmol, 80% yield) as a yellow oil.

LC-MS (ESI): m/z (M+1): 551.37 (Method 1)

Step 2: (1R)-1-(2-chlorophenyl)ethyl N-[5-(5-amino-6-methylpyridin-2-yl)-3-methyl-1,2-oxazol-4-yl]carbamate (R)-1-(2-chlorophenyl)ethyl (5-(5-((diphenylmethylene)amino)-6-methylpyridin-2-yl)-3-methylisoxazol-4-yl)carbamate (Intermediate L1.1, 840 mg, 1.5 mmol) was dissolved in MeOH (10 mL), then sodium acetate (437.67 mg, 5.34 mmol) and hydroxylamine hydrochloride (222.46 mg, 3.2 mmol) were sequentially added. The mixture was stirred at RT overnight and then concentrated under reduced pressure to remove most of the MeOH, diluted with sat. aq. NaHCO$_3$ (20 mL) and extracted with DCM (3×15 mL). The collected organic fractions were washed with brine (40 mL), dried over Na$_2$SO$_4$, filtered and concentrated under reduced pressure. The oily brown residue was purified by flash column chromatography eluting with a gradient of EtOAc in cyclohexane from 5% to 50% to afford the title compound (300 mg, 0.776 mmol, 52% yield) as a yellow oil.

LC-MS (ESI): m/z (M+1): 387.4 (Method 1)

The Intermediates in the following table were prepared from reagents reported below by using methods analogous to Intermediate L1.

| Intermediate | Structure & Name | Reagents | Analytical data |
|---|---|---|---|
| L2 | (R)-1-(pyridin-3-yl)ethyl (5-(5-amino-6-methylpyridin-2-yl)-3-methylisoxazol-4-yl)carbamate | J6 | LC-MS (ESI): m/z (M + 1): 354.2 (Method 1) $^1$H NMR (400 MHz, DMSO-d$_6$) δ ppm 9.08-8.86 (m, 1 H), 8.71-8.56 (m, 1 H), 8.55-8.43 (m, 1 H), 7.91-7.73 (m, 1 H), 7.34 (d, J = 8.36 Hz, 2 H), 6.93 (d, J = 8.36 Hz, 1 H), 5.86-5.70 (m, 1 H), 5.63 (s, 2 H), 2.25 (s, 3 H), 2.10 (s, 3 H), 1.65-1.44 (m, 3 H) |

-continued

| Intermediate | Structure & Name | Reagents | Analytical data |
|---|---|---|---|
| L3 | 1-(2-fluoropyridin-3-yl)ethyl (5-(5-amino-6-methylpyridin-2-yl)-3-methylisoxazol-4-yl)carbamate | J9 | LC-MS (ESI): m/z (M + 1): 372.2 (Method 1)<br>$^1$H NMR (400 MHz, DMSO-$d_6$) δ ppm 9.18-8.88 (m, 1H), 8.32-7.89 (m, 2H), 7.48-7.36 (m, 2H), 7.35 (d, J = 8.36 Hz, 1H), 6.94 (d, J = 8.36 Hz, 1H), 5.93-5.73 (m, 1H), 5.62 (s, 2H), 2.25 (s, 3H), 2.11 (s, 3H), 1.71-1.39 (m, 2H) |
| L4 | (R)-1-(thiazol-2-yl)ethyl (5-(5-amino-6-methylpyridin-2-yl)-3-methylisoxazol-4-yl)carbamate | J11 | LC-MS (ESI): m/z (M + 1): 360.09 (Method 1)<br>$^1$H NMR (400 MHz, DMSO-$d_6$) δ ppm 9.12 (s, 1H), 7.81-7.75 (m, 2H), 7.41 (d, J = 8.32 Hz, 1H), 6.97 (d, J = 8.35 Hz, 1H), 6.01 (br s, 1H), 5.64 (s, 2H), 2.29 (s, 3H), 2.15 (s, 3H), 1.67 (s, 3H) |
| L5 | (R)-1-phenylethyl (5-(5-amino-6-methylpyridin-2-yl)-3-methylisoxazol-4-yl)carbamate | J16 | LC-MS (ESI): m/z (M + 1): 353.15 (Method 2)<br>$^1$H NMR (300 MHz, DMSO-$d_6$) δ ppm 8.91 (s, 1H), 7.56-7.15 (m, 6H), 6.95 (d, J = 8.4 Hz, 1H), 5.73 (q, J = 6.8 Hz, 1H), 5.64 (s, 2H), 2.28 (s, 3H), 2.11 (s, 3H), 1.51 (s, 3H) |
| L6 | (R)-1-(2-chlorophenyl)ethyl (5-(5-amino-3-fluoropyridin-2- | J19 | LC-MS (ESI): m/z (M + 1): 391.10 (Method 2)<br>$^1$H NMR (300 MHz, DMSO-$d_6$) δ ppm 9.05 (s, 1H), 7.88 (t, J = 2.1 Hz, 1H), 7.63-7.49 (m, 1H), 7.49-7.39 (m, 2H), 7.39-7.24 (m, 1H), 6.76 (dd, J = 13.2, 2.2 Hz, 1H), 6.24 (s, 2H), 5.91 (d, J = 7.1 Hz, 1H), 2.13 (s, 3H), 1.49 (s, 3H) |

-continued

| Intermediate | Structure & Name | Reagents | Analytical data |
|---|---|---|---|
| | yl)-3-methylisoxazol-4-yl)carbamate | | |
| L7 | (R)-1-(o-tolyl)ethyl (5-(5-amino-6-methylpyridin-2-yl)-3-methylisoxazol-4-yl)carbamate | J20 | LC-MS (ESI): m/z (M + 1): 367.10 (Method 2)<br>$^1$H NMR (300 MHz, DMSO-d$_6$) δ ppm 8.90 (s, 1H), 7.56-7.39 (m, 1H), 7.35 (d, J = 8.3 Hz, 1H), 7.26-7.09 (m, 3H), 6.94 (d, J = 8.3 Hz, 1H), 5.87 (q, J = 7.0 Hz, 1H), 5.64 (s, 2H), 2.31 (s, 3H), 2.28 (s, 3H), 2.10 (s, 3H), 1.49 (s, 3H) |
| L8 | (R)-1-(2-fluorophenyl)ethyl (5-(5-aminopyridin-2-yl)-3-methylisoxazol-4-yl)carbamate | J21 | LC-MS (ESI): m/z (M + 1): 357.15 (Method 2)<br>$^1$H NMR (300 MHz, DMSO-d$_6$) δ ppm 9.00 (s, 1H), 8.01 (d, J = 2.4 Hz, 1H), 7.62-7.50 (m, 1H), 7.45 (d, J = 8.6 Hz, 1H), 7.42-7.13 (m, 3H), 6.96 (dd, J = 8.6, 2.7 Hz, 1H), 6.03-5.81 (m, 3H), 2.10 (s, 3H), 1.54 (s, 3H) |
| L9 | (R)-1-(2-(trifluoromethyl)phenyl)ethyl (5-(5-aminopyridin-2-yl)-3-methylisoxazol-4-yl)carbamate | J23 | LC-MS (ESI): m/z (M + 1): 407.20 (Method 2)<br>$^1$H NMR (300 MHz, DMSO-d$_6$) δ 9.01 (s, 1H), 8.00 (d, J = 2.7 Hz, 1H), 7.90-7.78 (m, 2H), 7.72 (d, J = 8.1 Hz, 1H), 7.60-7.51 (m, 1H), 7.44 (d, J = 8.5 Hz, 1H), 6.95 (dd, J = 8.5, 2.8 Hz, 1H), 5.98 (q, J = 7.0 Hz, 1H), 5.91 (s, 2H), 2.07 (s, 3H), 1.54 (s, 3H) |

-continued

| Intermediate | Structure & Name | Reagents | Analytical data |
|---|---|---|---|
| L10 | (R)-1-(2-methoxyphenyl)ethyl (5-(5-aminopyridin-2-yl)-3-methylisoxazol-4-yl)carbamate | J24 | LC-MS (ESI): m/z (M + 1): 369.15, (Method 2) <br> $^1$H NMR (300 MHz, DMSO-$d_6$) δ ppm 8.93 (bs, 1H), 8.03 (d, J = 2.7 Hz, 1H), 7.56-7.36 (m, 2H), 7.34-7.20 (m, 1H), 7.04-6.88 (m, 3H), 5.96 (q, J = 6.6 Hz, 1H), 5.91 (s, 2H), 3.80 (s, 3H), 2.11 (s, 3H), 1.44 (s, 3H) |
| L11 | (R)-1-(2-methoxyphenyl)ethyl (5-(5-amino-6-methylpyridin-2-yl)-3-methylisoxazol-4-yl)carbamate | J25 | LC-MS (ESI): m/z (M + 1): 383.15 (Method 2) <br> $^1$H NMR (300 MHz, DMSO-$d_6$) δ ppm 8.91 (bs, 1H), 7.37 (d, J = 8.3 Hz, 2H), 7.31-7.18 (m, 1H), 7.05-6.90 (m, 3H), 5.98 (q, J = 6.9 Hz, 1H), 5.69-5.57 (m, 2H), 3.79 (s, 3H), 2.29 (s, 3H), 2.12 (s, 3H), 1.44 (s, 3H) |
| L12 | (R)-1-phenylethyl (5-(5-aminopyridin-2-yl)-3-methylisoxazol-4-yl)carbamate | J26 | LC-MS (ESI): m/z (M + 1): 339.15 (Method 2) <br> $^1$H NMR (300 MHz, DMSO-$d_6$) δ ppm 8.92 (s, 1H), 8.02 (d, J = 2.1 Hz, 1H), 7.54-7.22 (m, 5H), 6.96 (dd, J = 8.6, 2.7 Hz, 1H), 5.92 (s, 2H), 5.73 (q, J = 6.8 Hz, 1H), 2.10 (s, 3H), 1.38 (s, 3H) |
| L13 | | J34 | LC-MS (ESI): m/z (M + 1): 319.2 (Method 1) <br> $^1$H NMR (400 MHz, DMSO-$d_6$) δ ppm 8.40-8.88 (m, 1 H) 7.39 (d, J = 8.36 Hz, 1 H) 6.98 (d, J = 8.36 Hz, 1 H) 5.62 (s, 2 H) 4.55-4.83 (m, 1 H) 2.31 (s, 3 H) 2.15 (s, 3 H) 1.01-1.75 (m, 7 H) 0.79-0.99 (m, 3 H) |

| Intermediate | Structure & Name | Reagents | Analytical data |
|---|---|---|---|
| | (R)-pentan-2-yl (5-(5-amino-6-methylpyridin-2-yl)-3-methylisoxazol-4-yl)carbamate | | |

Intermediate M1

(R)-1-(2-chlorophenyl)ethyl (4-(5-amino-6-methylpyridin-2-yl)-1-methyl-11H-pyrazol-5-yl)carbamate

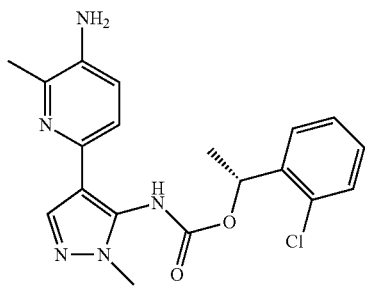 [SMILES: Cc1nc(-c2cnn(C)c2NC(=O)O[C@H](C)c2ccccc2Cl)ccc1N]

(R)-1-(2-chlorophenyl)ethyl (1-methyl-4-(6-methyl-5-nitropyridin-2-yl)-1H-pyrazol-5-yl)carbamate (Intermediate J2, 45 mg, 0.11 mmol) was dissolved in DCM (2.5 mL), MeOH (1 mL) and concentrated HCl (0.5 mL, 0.11 mmol), then Fe° (42.31 mg, 0.76 mmol) was added and the mixture was stirred at r.t. 3 h. The solvent was concentrated under reduced pressure and the residue was basified with a 2N aqueous NaOH solution and extracted with EtOAc 3 times. Collected organic fractions were washed with brine, dried over $Na_2SO_4$, filtered and concentrated under reduced pressure to provide the title compound (30 mg, 0.078 mmol, 72% yield) as a yellow solid, which was used in the next step without further purification.

LC-MS (ESI): m/z (M+1): 386.14 (Method 1)

The Intermediates in the following table were prepared from reagents reported below by using methods analogous to Intermediate M1.

| Intermediate | Structure & Name | Reagents | Analytical data |
|---|---|---|---|
| M2 | (R)-1-(2-chlorophenyl)ethyl (4-(5-amino-6-methylpyridin-2-yl)-1-methyl-1H-1,2,3-triazol-5-yl)carbamate | J3 | LC-MS (ESI): m/z (M + 1): 387.1 (Method 1)<br>$^1$H NMR (400 MHz, Chloroform-d) δ ppm 9.62 (s, 1H), 7.84 (d, J = 11.28, 8.32 Hz, 1H), 7.51 (d, J = 7.45 Hz, 1H), 7.21-7.42 (m, 2H), 7.29-7.33 (m, 1H), 7.06 (d, J = 8.28, 5.41 Hz, 1H), 6.24 (q, J = 6.51 Hz, 1H), 4.08 (s, 3H), 3.70 (s, 2H), 2.47 (d, J = 16.55 Hz, 3H), 1.64 (d, J = 6.50 Hz, 3H) |
| M3 | (R)-1-(2-chlorophenyl)ethyl N-(4-(4-aminophenyl)-1-methyl-1H-pyrazol-5-yl)carbamate | K1 | LC-MS (ESI): m/z (M + 1): 371.1 (Method 1) |

-continued

| Intermediate | Structure & Name | Reagents | Analytical data |
|---|---|---|---|
| M4 | (R)-1-(2-chlorophenyl)ethyl N-(2-(4-aminophenyl)thiophen-3-yl)carbamate | J4 | LC-MS (ESI): m/z (M + 1): 373.2 (Method 1)<br>$^1$H NMR (400 MHz, DMSO-$d_6$) δ ppm 9.24-8.79 (m, 1 H), 7.28 (d, J = 5.50 Hz, 4 H), 7.17 (d, J = 8.36 Hz, 2 H), 6.97 (d, J = 5.50 Hz, 1 H), 6.70-6.43 (m, 2 H), 5.96 (d, J = 5.72 Hz, 1 H), 5.30 (s, 2 H), 1.65-1.15 (m, 3 H) |
| M5 | (R)-1-(2-chloropyridin-3-yl)ethyl (5-(5-amino-6-methylpyridin-2-yl)-3-methylisoxazol-4-yl)carbamate | J5 | LC-MS (ESI): m/z (M + 1): 388.3 (Method 1) |
| M6 | (R)-1-(2-chlorophenyl)ethyl (5-(5-aminopyridin-2-yl)-3-methylisoxazol-4-yl)carbamate | J7 | LC-MS (ESI): m/z (M + 1): 373.1 (Method 1)<br>$^1$H NMR (400 MHz, DMSO-$d_6$) δ ppm 8.05 (s, 1H), 7.90 (br s, 1H), 7.51-7.15 (m, 5H), 6.93-6.82 (m, 1H), 6.01-5.85 (m, 1H), 5.75 (br s, 2H), 1.88 (br s, 3H), 1.36 (d, J = 6.6 Hz, 3H). |
| M7 | 1-(2-fluoropyridin-3-yl)ethyl (5-(5-aminopyridin-2-yl)-3- | J8 | LC-MS (ESI): m/z (M + 1): 358.1 (Method 1)<br>$^1$H NMR (400 MHz, DMSO-$d_6$) δ ppm 9.03 (s, 1H), 8.27-7.93 (m, 3H), 7.44 (d, J = 8.5 Hz, 2H), 6.95 (dd, J = 8.6, 2.7 Hz, 1H), 5.91 (s, 2H), 5.87-5.78 (m, 1H), 2.10 (s, 3H), 1.56 (s, 3H) |

| Intermediate | Structure & Name | Reagents | Analytical data |
| --- | --- | --- | --- |
| | methylisoxazol-4-yl)carbamate | | |
| M8 | (R)-1-(2-chlorophenyl)ethyl (4-(4-aminophenyl)-1-methyl-1H-1,2,3-triazol-5-yl)carbamate | J12 | LC-MS (ESI): m/z (M + 1): 372.08 (Method 1) |
| M9 | (R)-1-(2-chloropyridin-3-yl)ethyl (5-(5-aminopyridin-2-yl)-3-methylisoxazol-4-yl)carbamate | J18 | LC-MS (ESI): m/z (M + 1): 374.0 (Method 1)<br>$^1$H NMR (400 MHz, Chloroform-d) δ ppm 8.57-8.27 (m, 2H), 8.14 (d, J = 2.80 Hz, 1H), 7.83 (s, 1H), 7.65 (dd, J = 8.51, 0.70 Hz, 1H), 7.26 (s, 1H), 7.09 (dd, J = 8.53, 2.80 Hz, 1H), 6.14 (q, J = 6.54 Hz, 1H), 3.97 (s, 2H), 2.41 (s, 3H), 1.64 (dd, J = 6.60, 1.92 Hz, 3H) |
| M10 | 2-chlorobenzyl (5-(5-aminopyridin-2-yl)-3-methylisoxazol-4-yl)carbamate | J22 | LC-MS (ESI): m/z (M + 1): 359.1 (Method 1) |
| M11 | | J28 | LC-MS (ESI): m/z (M + 1): 352.19 (Method 1)<br>$^1$H NMR (400 MHz, DMSO-d$_6$) δ ppm 9.21-9.63 (m, 1 H) 7.73 (s, 1 H) 7.37 (br. s., 5 H) 7.07 (d, J = 8.14 Hz, 1 H) 6.87 (d, J = 8.36 Hz, 1 H) 5.75 (d, J = 5.72 Hz, 1 H) 4.98 (s, 2 H) 3.61 (s, 3 H) 2.26 (s, 3 H) 1.36-1.66 (m, 3 H) |

| Intermediate | Structure & Name | Reagents | Analytical data |
|---|---|---|---|
| | (R)-1-phenylethyl (4-(5-amino-6-methylpyridin-2-yl)-1-methyl-1H-pyrazol-5-yl)carbamate | | |
| M12 | (R)-1-phenylethyl (4-(5-amino-6-methylpyridin-2-yl)-1-methyl-1H-1,2,3-triazol-5-yl)carbamate | J29 | LC-MS (ESI): m/z (M + 1): 353.2 (Method 1)<br>$^1$H NMR (400 MHz, Chloroform-d) δ ppm 9.52 (br s, 1H), 7.84 (d, J = 8.25 Hz, 1H), 7.46-7.29 (m, 5H), 7.05 (d, J = 8.27 Hz, 1H), 5.90 (q, J = 6.59 Hz, 1H), 4.07 (s, 3H), 3.69 (s, 2H), 2.47 (s, 3H), 1.65 (d, J = 6.62 Hz, 3H) |
| M13 | ((R)-1-(2-(trifluoromethyl)phenyl)ethyl (4-(5-amino-6-methylpyridin-2-yl)-1-methyl-1H-1,2,3-triazol-5-yl)carbamate | J30 | LC-MS (ESI): m/z (M + 1): 421.2 (Method 1)<br>$^1$H NMR (400 MHz, DMSO-$d_6$) δ ppm 9.55 (s, 1H), 7.82 (d, J = 8.28 Hz, 1H), 7.67 (dd, J = 12.40, 7.94 Hz, 2H), 7.56 (t, J = 7.63 Hz, 1H), 7.40 (t, J = 7.68 Hz, 1H), 7.03 (d, J = 8.25 Hz, 1H), 6.25 (q, J = 6.48 Hz, 1H), 4.03 (s, 3H), 3.67 (s, 2H), 2.46 (s, 3H), 1.62 (d, J = 6.48 Hz, 3H) |
| M14 | (R)-1-cyclopentylethyl (4-(5-amino-6-methylpyridin-2-yl)-1-methyl-1H-1,2,3-triazol-5-yl)carbamate | J31 | LC-MS (ESI): m/z (M + 1): 345.2 (Method 1)<br>$^1$H NMR (400 MHz, DMSO-$d_6$) δ ppm 9.33 (s, 1H), 7.82 (d, J = 8.26 Hz, 1H), 7.03 (d, J = 8.26 Hz, 1H), 4.76 (dq, J = 7.49, 6.25 Hz, 1H), 4.09 (s, 3H), 3.66 (s, 2H), 2.43 (s, 3H), 2.06 (h, J = 8.15 Hz, 1H), 1.75 (td, J = 14.44, 4.88 Hz, 1H), 1.67-1.48 (m, 5H), 1.43-1.32 (m, 1H), 1.30 (d, J = 6.24 Hz, 3H), 1.27 (s, 1H) |

| Intermediate | Structure & Name | Reagents | Analytical data |
|---|---|---|---|
| M15 | 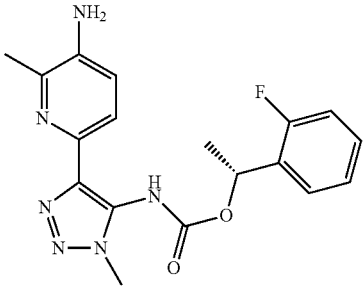 [SMILES: Cc1nc(-c2nnn(C)c2NC(=O)O[C@H](C)c2ccccc2F)ccc1N]<br>(R)-1-(2-fluorophenyl)ethyl (4-(5-amino-6-methylpyridin-2-yl)-1-methyl-1H-1,2,3-triazol-5-yl)carbamate | J32 | LC-MS (ESI): m/z (M + 1): 371.2 (Method)<br>$^1$H NMR (400 MHz, Chloroform-d) δ ppm 9.55 (br s, 1H), 7.82 (d, J = 8.25 Hz, 1H), 7.42 (t, J = 7.54 Hz, 1H), 7.26 (m, 1H), 7.13 (dd, J = 8.15, 6.88 Hz, 1H), 7.10 - 7.00 (m, 2H), 6.13 (q, J = 6.54 Hz, 1H), 4.05 (s, 3H), 3.66 (s, 2H), 2.45 (s, 3H), 1.64 (d, J = 6.60 Hz, 3H) |
| M16 | 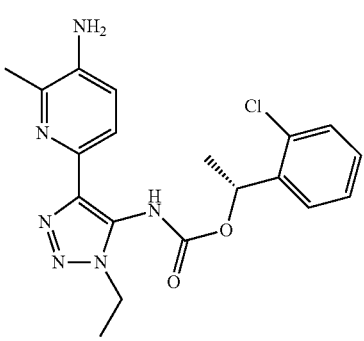 [SMILES: CCn1nnc(-c2ccc(N)c(C)n2)c1NC(=O)O[C@H](C)c1ccccc1Cl]<br>(R)-1-(2-chlorophenyl)ethyl (4-(5-amino-6-methylpyridin-2-yl)-1-ethyl-1H-1,2,3-triazol-5-yl)carbamate | J33 | LC-MS (ESI): m/z (M + 1): 401.2 (Method 1)<br>$^1$H NMR (400 MHz, Chloroform-d) δ ppm 9.58 (br s, 1H), 7.86 (d, J = 8.26 Hz, 1H), 7.50 (d, J = 7.39 Hz, 1H), 7.38 (dd, J = 7.07, 2.20 Hz, 1H), 7.26 (s, 2H), 7.06 (d, J = 8.27 Hz, 1H), 6.24 (q, J = 6.51 Hz, 1H), 4.56-4.46 (m, 2H), 3.68 (s, 2H), 2.48 (s, 3H), 1.63 (d, J = 6.55 Hz, 3H), 1.53 (d, J = 7.30 Hz, 3H) |
| M17 | 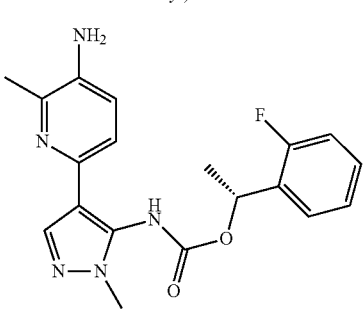<br>(R)-1-(2-fluorophenyl)ethyl (4-(5-amino-6-methylpyridin-2-yl)-1-methyl-1H-pyrazol-5-yl)carbamate | J35 | LC-MS (ESI): m/z (M + 1): 370.2 (Method 1) |
| M18 | 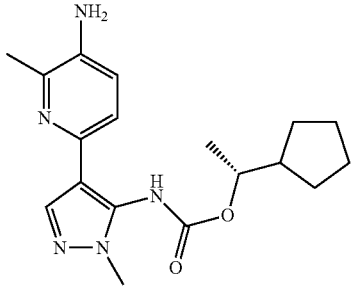 [SMILES: Cc1nc(-c2cnn(C)c2NC(=O)O[C@H](C)C2CCCC2)ccc1N] | J36 | LC-MS (ESI): m/z (M + 1): 344.23 (Method 1)<br>$^1$H NMR (400 MHz, DMSO-d$_6$) δ ppm 9.00-9.38 (m, 1 H) 7.73 (s,1 H) 7.06-7.17 (m, 1 H) 6.90 (s, 1 H) 4.97 (s, 2 H) 4.53-4.72 (m, 1 H) 3.63 (s, 3 H) 2.28 (s, 3 H) 1.87-2.07 (m, 1 H) 1.37-1.82 (m, 6 H) 0.97-1.37 (m, 5 H) |

-continued

| Intermediate | Structure & Name | Reagents | Analytical data |
|---|---|---|---|
| M19 | 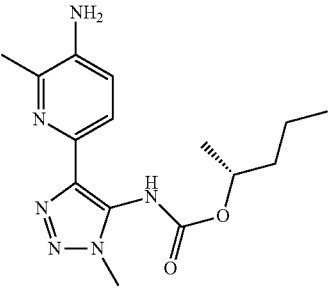 [SMILES: CCC[C@@H](C)OC(=O)Nc1c(-c2ccc(N)c(C)n2)nnn1C]<br>(R)-1-cyclopentylethyl (4-(5-amino-6-methylpyridin-2-yl)-1-methyl-1H-pyrazol-5-yl)carbamate<br><br>(R)-pentan-2-yl (4-(5-amino-6-methylpyridin-2-yl)-1-methyl-1H-1,2,3-triazol-5-yl)carbamate | J37 | LC-MS (ESI): m/z (M + 1): 319 (Method 1)<br>$^1$H NMR (400 MHz, DMSO-d$_6$) δ ppm 9.15 (s, 1H), 7.51 (d, J = 8.23 Hz, 1H), 6.97 (d, J = 8.27 Hz, 1H), 5.17 (s, 2H), 4.72 (s, 1H), 3.84 (s, 3H), 2.28 (s, 3H), 1.49-1.06 (m, 7H), 0.85 (s, 3H) |

Intermediate N1

(R)-1-(2-chlorophenyl)ethyl (2-(5-aminopyridin-2-yl)thiophen-3-yl)carbamate

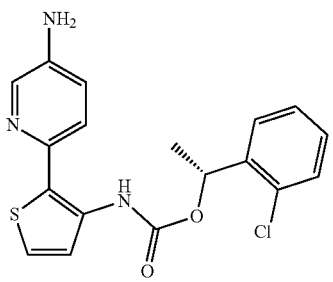 [SMILES: C[C@@H](OC(=O)Nc1ccsc1-c1ccc(N)cn1)c1ccccc1Cl]

Step 1: (R)-1-(2-chlorophenyl)ethyl (2-bromothiophen-3-yl)carbamate (Intermediate N1.1)

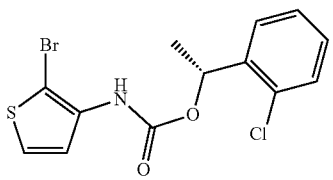 [SMILES: C[C@@H](OC(=O)Nc1ccsc1Br)c1ccccc1Cl]

To a solution of (R)-1-(2-chlorophenyl)ethyl thiophen-3-ylcarbamate (Intermediate J10, 2.5 g, 8.9 mmol) in DCM (30 mL), N-Bromosuccinimide (1.58 g, 8.9 mmol) was added dropwise and the mixture was stirred for 1 h at reflux. The reaction was cooled to r.t., diluted with DCM (10 mL), washed with sat. aq. K$_2$CO$_3$ (2×20 mL), brine (20 mL), dried over Na$_2$SO$_4$, filtered, and concentrated under reduced pressure. The residue was purified by flash chromatography eluting with a gradient of DCM in cyclohexane from 5% to 30% to afford the title compound (2.86 g, 7.93 mmol, 89% yield) as an off-white solid.

LC-MS (ESI): m/z (M+1): 362 (Method 1)

$^1$H NMR (400 MHz, DMSO-d$_6$) δ ppm 9.36 (s, 1H), 7.58-7.32 (m, 5H), 7.12 (d, J=5.82 Hz, 1H), 6.03 (q, J=6.54 Hz, 1H), 1.52 (d, J=6.58 Hz, 3H)

Step 2: (R)-1-(2-chlorophenyl)ethyl (2-(5-aminopyridin-2-yl)thiophen-3-yl)carbamate A 5 mL microwave vial equipped with a stir bar was charged with 6-tributylstannylpyridin-3-amine (107.31 mg, 0.28 mmol) and (R)-1-(2-chlorophenyl)ethyl (2-bromothiophen-3-yl)carbamate (Intermediate N1.1, 100 mg, 0.28 mmol). The vial was sealed and three cycles of vacuum/nitrogen back-filling were applied. Toluene (1.8 mL) and DMF (0.2 mL) were added and the mixture was sparged with nitrogen over 10 min. Pd(PPh$_3$)$_4$ (32 mg, 0.03 mmol) was added, the tube was sealed and the mixture was heated at 100° C. for 16 h. The mixture was cooled at r.t., filtered over Celite and concentrated under reduced pressure. The residue was dissolved in MeOH (3 mL) and treated with 2N KF (1 mL) over 30 min. The mixture was concentrated under reduced pressure, diluted with brine (10 mL) and extracted with EtOAc (10 mL). The organic phase was concentrated under reduced pressure and the residue was purified by flash column chromatography using a gradient of EtOAc in Cyclohexane from 5% to 40% to afford the target product (R)-1-(2-chlorophenyl)ethyl (2-(5-aminopyridin-2-yl)thiophen-3-yl)carbamate (Intermediate N1, 46 mg, 0.123 mmol, 44. % yield) as an amorphous light brown solid.

LC-MS (ESI): m/z (M+1): 374 (Method 1)

$^1$H NMR (400 MHz, METHANOL-d$_4$) δ ppm 8.08 (d, J=2.8 Hz, 1H), 7.71-7.65 (m, 1H), 7.57 (d, J=7.6 Hz, 1H), 7.42 (dd, J=7.9, 1.4 Hz, 1H), 7.37 (td, J=7.6, 1.4 Hz, 1H), 7.35-7.25 (m, 2H), 7.21 (d, J=5.5 Hz, 1H), 7.11 (dd, J=8.6, 2.8 Hz, 1H), 6.21 (q, J=6.6 Hz, 1H), 1.61 (d, J=6.6 Hz, 3H)

Intermediate O1

(R)-1-(2-chlorophenyl)ethyl (5-(5-amino-6-methylpyridin-2-yl)isothiazol-4-yl)carbamate

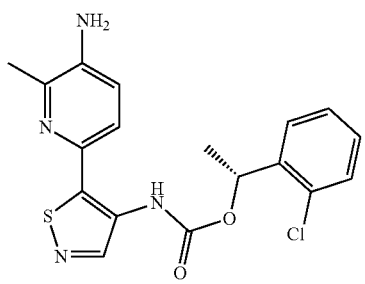 [SMILES: Cc1nc(-c2sncc2NC(=O)O[C@H](C)c2ccccc2Cl)ccc1N]

To a solution of 2-methyl-6-tributylstannylpyridin-3-amine (676 mg, 1.7 mmol) and 6 (R)-1-(2-chlorophenyl)ethyl (5-bromoisothiazol-4-yl)carbamate (Intermediate J27, 581 mg, 1.55 mmol) in Toluene (10 mL) and DMF (1 mL), Pd(PPh$_3$)$_4$ (179 mg, 0.15 mmol) was added and the tube was sealed and heated at 100° C. for 16 h. The mixture was cooled at r.t., filtered over Celite and concentrated under reduced pressure. The residue was dissolved in MeOH (3 mL) and treated with 2N KF (1 mL) over 30 min. The mixture was concentrated under reduced pressure, diluted with brine (10 mL) and extracted with EtOAc (10 mL). The organic phase was concentrated under reduced pressure and the residue was purified by flash column chromatography using a gradient of EtOAc in Cyclohexane from 20% to 60% to afford the target product (Intermediate O1, 216 mg, 0.54 mmol, 35% yield) as a yellow solid.

LC-MS (ESI): m/z (M+1): 403.11 (Method 1)

$^1$H NMR (400 MHz, DMSO-d$_6$) δ ppm 9.14-9.35 (m, 1H) 7.60-7.71 (m, 1H) 7.47 (br. s., 2H) 7.25-7.42 (m, 2H) 6.90 (d, J=8.36 Hz, 1H) 6.00 (d, J=5.94 Hz, 1H) 5.59 (s, 2H) 2.28 (s, 3H) 2.09-2.24 (m, 3H) 1.56 (d, J=5.28 Hz, 3H)

Intermediate P1

(R)-1-(2-chloropyridin-3-yl)ethyl (3-methyl-5-(5-(methylamino)pyridin-2-yl)isoxazol-4-yl)carbamate

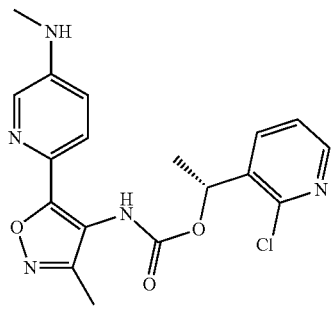 [SMILES: CNc1ccc(-c2onc(C)c2NC(=O)O[C@H](C)c2cccnc2Cl)nc1]

To a solution of (R)-1-(2-chloropyridin-3-yl)ethyl (5-(5-aminopyridin-2-yl)-3-methylisoxazol-4-yl)carbamate (Intermediate M9, 80.0 mg, 0.21 mmol) in THF (0.8 mL) formaldehyde (0.08 mL, 1.07 mmol), MeCN (1.7 mL) and sodium methoxide (57.8 mg, 1.07 mmol) were added (from clear to orange solution). The reaction mixture was stirred at 25° C. overnight (yellow solution), then sodium borohydride (40.48 mg, 1.07 mmol) was added (orange solution and gas evolution). The mixture was stirred at 25° C. for 3 h (yellow solution) The solvent was removed under reduced pressure, NaHCO$_3$ satd. sol. was added and the mixture was extracted with EtOAc. The solution was dried over Na$_2$SO$_4$ and concentrated under reduced pressure. The residue was purified by flash chromatography eluting with a gradient of EtOAc in cyclohexane from 0 to 85% to afford the title compound (43 mg, 0.111 mmol, 52% yield) as a pale orange solid.

LC-MS (ESI): m/z (M+1): 388.1 (Method 1)

$^1$H NMR (400 MHz, Chloroform-d) δ ppm 8.35 (d, J=3.52 Hz, 1H), 8.07 (d, J=2.88 Hz, 1H), 7.84 (s, 1H), 7.68 (d, J=8.72 Hz, 1H), 7.27 (s, 2H), 6.98 (dd, J=8.63, 2.99 Hz, 1H), 6.14 (q, J=6.46 Hz, 1H), 4.09 (s, 1H), 2.96 (d, J=5.08 Hz, 3H), 2.41 (s, 3H), 1.64 (d, J=6.57 Hz, 3H)

Intermediate Q1

Trans-methyl 2-((4-[5-(((((1R)-1-(2-chlorophenyl)ethoxy)carbonyl) amino)-1-methyl-1H-pyrazol-4-yl)phenyl)carbamoyl)cyclohexane-1-carboxylate

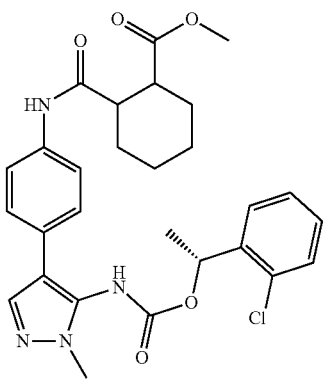 [SMILES: COC(=O)C1CCCCC1C(=O)Nc1ccc(-c2cnn(C)c2NC(=O)O[C@H](C)c2ccccc2Cl)cc1]

To a solution of (1R)-1-(2-chlorophenyl)ethyl N-[4-(4-aminophenyl)-1-methyl-1H-pyrazol-5-yl]carbamate (Intermediate M3, 149 mg, 0.4 mmol) and (±)-Trans-2-methoxycarbonylcyclohexane-1-carboxylic acid (75 mg, 0.4 mmol), in MeCN (2.5 mL), 1-methylimidazole (0.11 mL, 1.41 mmol) was added, followed by HATU (135 mg, 0.48 mmol) and the mixture was stirred at r.t. overnight. The mixture was concentrated under reduced pressure then water was added to the residue and the mixture was extracted with EtOAc. The solvent was dried over Na$_2$SO$_4$ and concentrated under reduced pressure. The residue was purified by flash chromatography eluting with cyclohexane:EtOAc 1:1 to afford the title compound (146 mg, 0.27 mmol, 6700 yield) as a white foam LC-MS (ESI): m/z (M+1): 539.2 (Method 1)

The Intermediates in the following table were prepared from reagents reported below by using methods analogous to Intermediate Q1.

| Intermediate | Structure & Name | Reagents | Analytical data |
|---|---|---|---|
| Q2 | 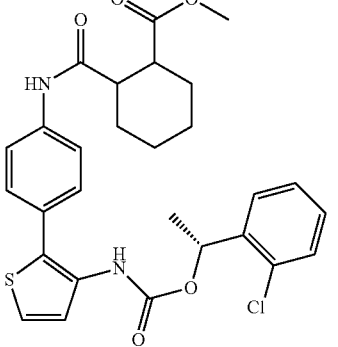<br>Trans-methy-2-((4-(3-((((R)-1-(2-chlorophenyl)ethoxy)carbonyl)amino)thiophen-2-yl)phenyl)carbamoyl)cyclohexane-1-carboxylate | M4 | LC-MS (ESI): m/z (M + 1): 541.4 (Method 1)<br>$^1$H NMR (400 MHz, DMSO-$d_6$) δ ppm 10.07 (s, 1 H), 9.27-9.03 (m, 1 H), 7.70-7.22 (m, 8 H), 7.05 (d, J = 5.28 Hz, 1 H), 6.02-5.85 (m, 1 H), 3.56 (s, 3 H), 2.58-2.68 (m, 2 H), 2.01-1.98 (m, 2 H), 1.80-1.77 (m, 2 H) 1.47-1.32 (m, 8 H) |
| Q3 | 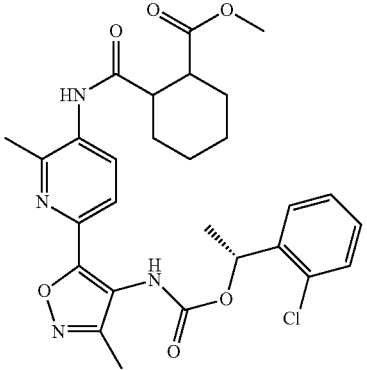 [SMILES: COC(=O)C1CCCCC1C(=O)Nc1ccc(-c2onc(C)c2NC(=O)O[C@H](C)c2ccccc2Cl)nc1C]<br>Trans-methyl 2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylate | L1 | LC-MS (ESI): m/z (M + 1): 555.5 (Method 1)<br>$^1$H NMR (400 MHz, DMSO-$d_6$) δ ppm 9.63 (s, 1H), 9.23 (s, 1H), 7.92 (d, J = 8.4 Hz, 1H), 7.62 (d, J = 8.3 Hz, 1H), 7.39 (d, J = 44.0 Hz, 3H), 5.99 (s, 1H), 3.58 (d, J = 1.4 Hz, 3H), 2.84-2.70 (m, 1H), 2.72-2.53 (m, 1H), 2.41 (s, 3H), 2.18 (s, 3H), 2.11-1.94 (m, 2H), 1.88-1.72 (m, 2H), 1.52 (s, 2H), 1.41 (s, 1H) |

Intermediate R1

Cis-methy-2-((4-(3-((((R)-1-(2-chlorophenyl)ethoxy)carbonyl) amino)thiophen-2-yl)phenyl)carbamoyl) cyclohexane-1-carboxylate

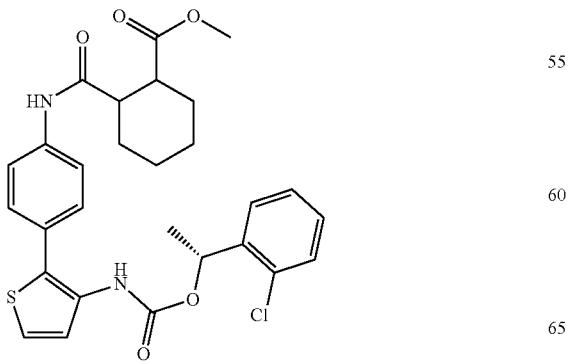

To a solution of (1R)-1-(2-chlorophenyl)ethyl N-(2-(4-aminophenyl)thiophen-3-yl)carbamate (Intermediate M4, 250 mg, 0.67 mmol) and (±)-Cis-2-methoxycarbonylcyclohexane-1-carboxylic acid (125 mg, 0.67 mmol) in MeCN (7 mL), 1-methylimidazole (0.18 mL, 2.3 mmol) was added, followed by HATU (225 mg, 0.8 mmol) and the mixture was stirred at r.t. for 2 h. The mixture was concentrated under reduced pressure then water was added to the residue and the mixture was extracted with EtOAc. The solvent was dried over $Na_2SO_4$ and concentrated under reduced pressure. The residue was purified by flash chromatography using a gradient of EtOAc in cyclohexane from 10% to 50% to afford the title compound (360 mg, 0.66 mmol, 99% yield) as a white solid LC-MS (ESI): m/z (M+1): 541.3 (Method 1)

$^1$H NMR (400 MHz, DMSO-$d_6$) δ ppm 9.87 (s, 1H), 9.34-9.00 (m, 1H), 7.61 (d, J=8.80 Hz, 2H), 7.49-7.26 (m, 6H), 7.05 (d, J=5.28 Hz, 1H), 6.02-5.88 (m, 1H), 3.55 (s, 3H), 3.08-2.92 (m, 1H), 2.79-2.69 (m, 1H), 2.00 (s, 2H), 1.87-1.61 (m, 3H) 1.60-1.25 (m, 7H)

The Intermediate in the following table was prepared from reagents reported below by using methods analogous to Intermediate R1.

| Intermediate | Structure & Name | Reagents | Analytical data |
|---|---|---|---|
| R2 | 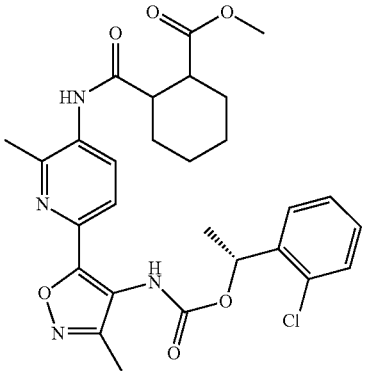<br>Cis-methyl 2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylate | L1 | LC-MS (ESI): m/z (M + 1): 555.4 (Method 1) |

Example 1

(1S,2S)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid

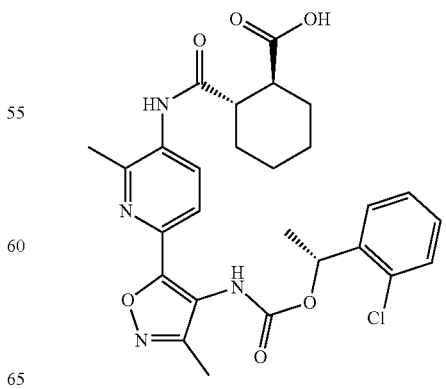

To a solution of (R)-1-(2-chlorophenyl)ethyl (5-(5-amino-6-methylpyridin-2-yl)-3-methylisoxazol-4-yl)carbamate (Intermediate L1, 41 mg, 0.11 mmol) in MeCN (1.23 mL), (−)-trans-1,2-cyclohexanedicarboxylic anhydride (36 mg, 0.24 mmol) was added. The mixture was stirred at RT for 18 h. The solvent was removed under reduced pressure and the residue was purified by reversed-phase flash chromatography using a gradient of MeCN in acidic H$_2$O (+0.1% HCOOH) from 5% to 70% affording the title compound (38 mg, 0.07 mmol, 66% yield).

LC-MS (ESI): m/z (M+1): 541.3 (Method 1)

$^1$H NMR (400 MHz, DMSO-d$_6$) δ ppm 12.60-11.59 (m, 1H), 9.90-8.95 (m, 2H), 7.95 (d, J=8.3 Hz, 1H), 7.71-7.55 (m, 1H), 7.61-7.22 (m, 4H), 6.17-5.82 (m, 1H), 2.75-2.52 (m, 2H), 2.42 (s, 3H), 2.16 (s, 3H), 1.60-1.25 (m, 3H), 2.08-1.20 (m, 8H)

The Examples in the following table were prepared from reagents reported below following similar procedures as for Example 1.

| Example | Structure & Name | Reagents | Analytical data |
|---|---|---|---|
| 2 | 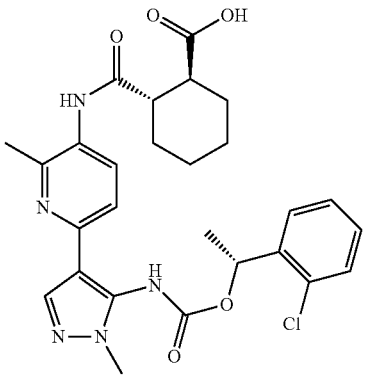 [SMILES: Cc1nc(-c2cnn(C)c2NC(=O)O[C@H](C)c2ccccc2Cl)ccc1NC(=O)[C@H]1CCCC[C@@H]1C(=O)O]<br>(1S,2S)-2-((6-(5-((((R)-1-(2-chlorophenyl)ethoxy)carbonyl)amino)-1-methyl-1H-pyrazol-4-yl)-2-methylpyridin-3-yl)carbamoyl)cyclohexane-1-carboxylic acid | M1 + (−)-trans-1,2-Cyclohexane-dicarboxylic anhydride | LC-MS (ESI): m/z (M + 1): 540.2 (Method 1)<br>$^1$H NMR (500 MHz, DMSO-d$_6$) δ ppm 12.10 (br s, 1 H), 9.66 (br s, 1 H), 9.51 (br s, 1 H), 7.88 (s, 1 H), 7.76-7.54 (m, 1 H), 7.52-7.08 (m, 5 H), 5.99 (br s, 1 H), 3.64 (br s, 3 H), 2.73-2.59 (m, 2 H), 2.35 (s, 3 H), 2.06-1.93 (m, 2 H), 1.80-1.71 (m, 2 H), 1.55 (br s, 2 H), 1.29 (br d, J = 8.0 Hz, 3 H), 1.41-1.21 (m, 2 H) |
| 3 | 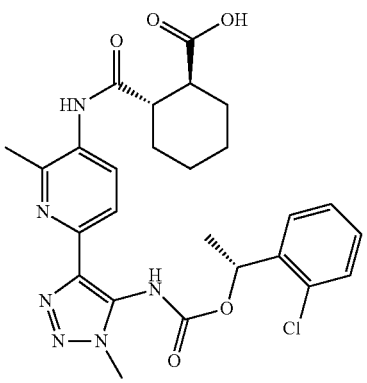 [SMILES: Cc1nc(-c2nnn(C)c2NC(=O)O[C@H](C)c2ccccc2Cl)ccc1NC(=O)[C@H]1CCCC[C@@H]1C(=O)O]<br>(1S,2S)-2-((6-(5-((((R)-1-(2-chlorophenyl)ethoxy)carbonyl)amino)-1-methyl-1H-1,2,3-triazol-4-yl)-2-methylpyridin-3-yl)carbamoyl)cyclohexane-1-carboxylic acid | M2 + (−)-trans-1,2-Cyclohexane-dicarboxylic anhydride | LC-MS (ESI): m/z (M + 1): 541.2 (Method 1)<br>$^1$H NMR (500 MHz, DMSO-d$_6$) δ ppm 12.02 (br s, 1 H), 9.99-9.59 (m, 1 H), 9.50 (br s, 1 H), 7.94-7.09 (m, 6 H), 6.25-5.63 (m, 1 H), 3.88 (s, 3 H), 2.78-2.50 (m, 2 H), 2.41-2.25 (m, 3 H), 2.12-1.93 (m, 2 H), 1.87-1.16 (m, 9 H). |

-continued

| Example | Structure & Name | Reagents | Analytical data |
|---|---|---|---|
| 11 | 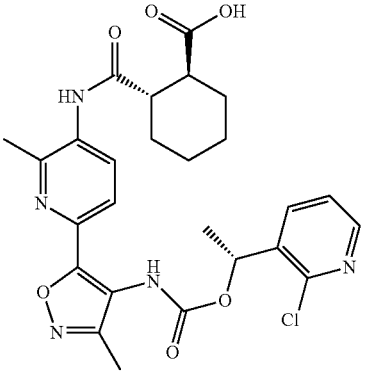 [SMILES: Cc1nc(-c2onc(C)c2NC(=O)O[C@H](C)c2cccnc2Cl)ccc1NC(=O)[C@H]1CCCC[C@@H]1C(=O)O]<br>(1S,2S)-2-((6-(4-((((R)-1-(2-chloropyridin-3-yl)ethoxy)carbonyl)amino)-3-methylisoxazol-5-yl)-2-methylpyridin-3-yl)carbamoyl)cyclohexane-1-carboxylic acid | M5<br>+<br>(−)-trans-1,2-Cyclohexane dicarboxylic anhydride | LC-MS (ESI): m/z (M + 1): 542.3 (Method 1)<br>$^1$H NMR (500 MHz, DMSO-$d_6$) δ ppm 13.17-10.94 (m, 1 H), 9.69 (br s, 1 H), 9.40-8.61 (m, 1 H), 8.37 (br d, J = 2.5 Hz, 1 H), 7.98 (br d, J = 8.2 Hz, 2 H), 7.62 (br d, J = 8.2 Hz, 1 H), 7.54-6.96 (m, 1 H), 5.90 (br s, 1 H), 2.70 (td, J = 11.4, 3.3 Hz, 1 H), 2.44-2.32 (m, 3 H), 2.16 (br s, 3 H), 2.06-1.93 (m, 2 H), 1.84-1.67 (m, 2 H), 1.64-1.06 (m, 3 H), 1.44-1.05 (m, 4H) |
| 15 | 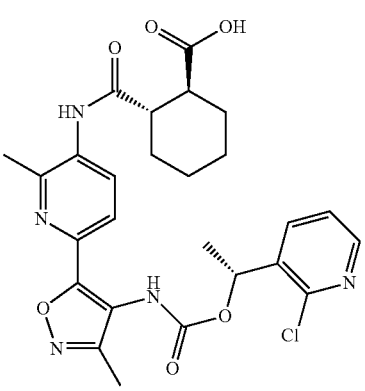<br>(1S,2S)-2-((2-methyl-6-(3-methyl-4-((((R)-1-(pyridin-3-yl)ethoxy)carbonyl)amino)isoxazol-5-yl)pyridin-3-yl)carbamoyl)cyclohexane-1-carboxylic acid | L2<br>+<br>(−)-trans-1,2-Cyclohexane dicarboxylic anhydride | LC-MS (ESI): m/z (M + 1): 508.4 (Method 1)<br>$^1$H NMR (400 MHz, DMSO-$d_6$) δ ppm 12.14 (br s, 1 H), 9.58 (s, 1 H), 9.35-8.92 (m, 1 H), 8.63 (br s, 1 H), 8.51 (br s, 1 H), 7.91 (d, J = 8.3 Hz, 1 H), 7.81 (br s, 1 H), 7.60 (d, J = 8.3 Hz, 1 H), 7.39 (br s, 1 H), 5.78 (br d, J = 3.1 Hz, 1 H), 2.72-2.64 (m, 1 H), 2.59-2.53 (m, 1 H), 2.39 (s, 3 H), 2.16 (s, 3 H), 2.01 (br d, J = 10.7 Hz, 2 H), 1.86-1.18 (m, 9 H) |
| 16 | 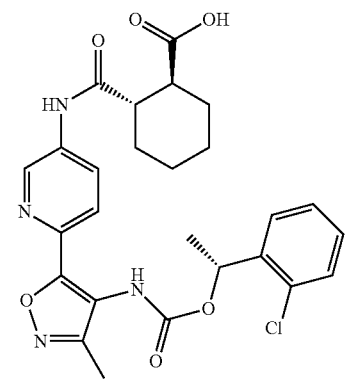<br>(1S,2S)-2-((6-(4-((((R)-1-(2-chlorophenyl)ethoxy)carbonyl)amino)-3-methylisoxazol-5-yl)pyridin-3-yl)carbamoyl)cyclohexane-1-carboxylic acid | M6<br>+<br>(−)-trans-1,2-Cyclohexane dicarboxylic anhydride | LC-MS (ESI): m/z (M + 1): 527.1 (Method 1)<br>$^1$H NMR (500 MHz, DMSO-$d_6$) δ ppm 12.89-11.40 (m, 1 H), 10.45 (br s, 1 H), 9.48-8.55 (m, 2 H), 8.16 (dd, J = 8.6, 2.5 Hz, 1 H), 7.73 (d, J = 8.6 Hz, 1 H), 7.67-6.77 (m, 4 H), 5.95 (br d, J = 6.2 Hz, 1 H), 2.62-2.53 (m, 2 H), 2.31-2.08 (m, 3 H), 2.07-1.92 (m, 2 H), 1.76 (br s, 2 H), 1.63-1.12 (m, 7 H) |

-continued

| Example | Structure & Name | Reagents | Analytical data |
|---|---|---|---|
| 17 | (1S,2S)-2-((6-(4-(((1-(2-fluoropyridin-3-yl)ethoxy)carbonyl)amino)-3-methylisoxazol-5-yl)pyridin-3-yl)carbamoyl)cyclohexane-1-carboxylic acid | M7 + (−)-trans-1,2-Cyclohexane dicarboxylic anhydride | LC-MS (ESI): m/z (M + 1): 512.2 (Method 1) $^1$H NMR (400 MHz, DMSO-$d_6$) δ ppm 12.68-11.81 (m, 1 H), 10.43 (s, 1 H), 9.22 (br d, J = 1.3 Hz, 1 H), 8.80 (br s, 1 H), 8.37-7.92 (m, 3 H), 7.72 (d, J = 8.6 Hz, 1 H), 7.57-7.17 (m, 1 H), 5.82 (br d, J = 6.6 Hz, 1 H), 2.65-2.52 (m, 2 H), 2.06-1.93 (m, 2 H), 2.15 (s, 3 H), 1.86-1.71 (m, 2 H), 1.56 (br s, 3 H), 1.40-1.21 (m, 4 H) |
| 19 | (1S,2S)-2-((6-(4-(((1-(2-fluoropyridin-3-yl)ethoxy)carbonyl)amino)-3-methylisoxazol-5-yl)-2-methylpyridin-3-yl)carbamoyl)cyclohexane-1-carboxylic acid | L3 + (−)-trans-1,2-Cyclohexane dicarboxylic anhydride | LC-MS (ESI): m/z (M + 1): 526.4 (Method 1) $^1$H NMR (400 MHz, DMSO-$d_6$) δ ppm 12.43-11.85 (m, 1 H), 9.63 (br s, 1 H), 9.22 (br s, 1 H), 8.27-8.00 (m, 2 H), 7.94 (d, J = 8.3 Hz, 1 H), 7.60 (d, J = 8.3 Hz, 1 H), 7.53-7.21 (m, 1 H), 5.84 (br d, J = 3.3 Hz, 1 H), 2.76-2.64 (m, 1 H), 2.54 (br s, 1 H), 2.39 (s, 3 H), 2.16 (s, 3 H), 2.00 (br d, J = 13.6 Hz, 2 H), 1.77 (br s, 2 H), 1.57 (br s, 3 H), 1.43-1.18 (m, 4 H) |
| 21 | (1S,2S)-2-((6-(3-((((R)-1-(2-chlorophenyl)ethoxy)carbonyl)amino)thiophen-2-yl)pyridin-3-yl)carbamoyl)cyclohexane-1-carboxylic acid | N1 + (−)-trans-1,2-Cyclohexane dicarboxylic anhydride | LC-MS (ESI): m/z (M + 1): 528.1 (Method 1) $^1$H NMR (400 MHz, METHANOL-$d_4$) δ ppm 8.78 (d, J = 1.8 Hz, 1 H), 8.03 (dd, J = 8.7, 2.4 Hz, 1 H), 7.73 (br d, J = 4.9 Hz, 1 H), 7.56 (br d, J = 7.4 Hz, 1 H), 7.48 (d, J = 8.8 Hz, 1 H), 7.40 (d, J = 8.0 Hz, 1 H), 7.38-7.31 (m, 2 H), 7.30-7.24 (m, 1 H), 6.20 (q, J = 6.5 Hz, 1 H), 2.74-2.60 (m, 2 H), 2.22 - 2.01 (m, 2 H), 1.86 (br d, J = 5.7 Hz, 2 H), 1.60 (d, J = 6.7 Hz, 3 H), 1.56-1.33 (m, 4 H) |

-continued

| Example | Structure & Name | Reagents | Analytical data |
|---|---|---|---|
| 22 | 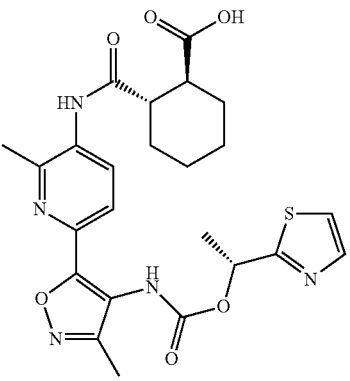 [SMILES: Cc1nc(-c2onc(C)c2NC(=O)O[C@H](C)c2nccs2)ccc1NC(=O)[C@H]1CCCC[C@@H]1C(=O)O]<br>(1S,2S)-2-((2-methyl-6-(3-methyl-4-((((R)-1-(thiazol-2-yl)ethoxy)carbonyl)amino)isoxazol-5-yl)pyridin-3-yl)carbamoyl)cyclohexane-1-carboxylic acid | L4<br>+<br>(−)-trans-1,2-Cyclohexane dicarboxylic anhydride | LC-MS (ESI): m/z (M + 1): 514.1 (Method 1)<br>$^1$H NMR (400 MHz, DMSO-$d_6$) δ ppm 12.14 (br s, 1 H), 9.62 (br s, 1 H), 9.33 (br s, 1 H), 7.95 (d, J = 8.3 Hz, 1 H), 7.87-7.68 (m, 2 H), 7.65 (d, J = 8.3 Hz, 1 H), 6.12-5.89 (m, 1 H), 2.79-2.67 (m, 1 H), 2.57-2.47 (m, 1 H), 2.43 (s, 3 H), 2.20 (s, 3 H), 2.08-1.94 (m, 2 H), 1.77 (br s, 2 H), 1.66 (br s, 3 H), 1.39-1.25 (m, 4 H) |
| 23 | 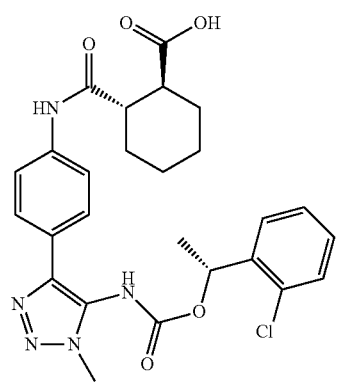 [SMILES: C[C@@H](OC(=O)Nc1c(-c2ccc(NC(=O)[C@H]3CCCC[C@@H]3C(=O)O)cc2)nnn1C)c1ccccc1Cl]<br>(1S,2S)-2-((4-(5-((((R)-1-(2-chlorophenyl)ethoxy)carbonyl)amino)-1-methyl-1H-1,2,3-triazol-4-yl)phenyl)carbamoyl)cyclohexane-1-carboxylic acid | M8<br>+<br>(−)-trans-1,2-Cyclohexane dicarboxylic anhydride | LC-MS (ESI): m/z (M + 1): 526.16 (Method 1)<br>$^1$H NMR (500 MHz, DMSO-$d_6$) δ ppm 12.62-11.54 (m, 1 H), 10.10-9.66 (m, 2 H), 7.94-6.65 (m, 8 H), 6.26-5.79 (m, 1 H), 3.82 (br s, 3 H), 2.61-2.52 (m, 2 H), 1.67-1.46 (m, 3 H), 2.12-1.12 (m, 8 H) |
| 27 | 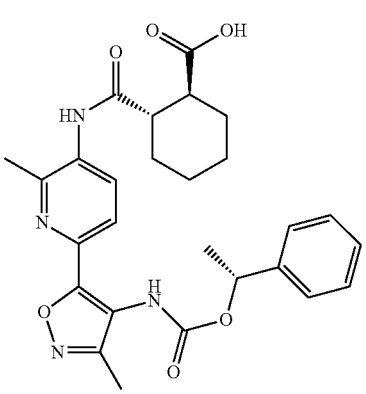 [SMILES: Cc1nc(-c2onc(C)c2NC(=O)O[C@H](C)c2ccccc2)ccc1NC(=O)[C@H]1CCCC[C@@H]1C(=O)O]<br>(1S,2S)-2-((2-methyl-6-(3-methyl-4-((((R)-1-phenylethoxy)carbonyl)amino)isoxazol-5-yl)pyridin-3-yl)carbamoyl)cyclohexane-1-carboxylic acid | L5<br>+<br>(−)-trans-1,2-Cyclohexane dicarboxylic anhydride | LC-MS (ESI): m/z (M + 1): 507.18 (Method 4)<br>$^1$H NMR (300 MHz, DMSO-$d_6$) δ ppm 12.14 (s, 1H), 9.59 (s, 1H), 9.08 (s, 1H), 7.92 (d, J = 8.4 Hz, 1H), 7.60 (d, J = 8.4 Hz, 1H), 7.54-7.15 (m, 5H), 5.83-5.63 (m, 1H), 2.68 (t, J = 11.1 Hz, 1H), 2.62-2.52 (m, 1H), 2.42 (s, 3H), 2.17 (s, 3H), 2.10-1.90 (m, 2H), 1.78 (s, 2H), 1.50 (s, 3H), 1.40-1.17 (m, 4H) |

-continued

| Example | Structure & Name | Reagents | Analytical data |
|---|---|---|---|
| 29 | (1S,2S)-2-((6-(4-((((R)-1-(2-chloropyridin-3-yl)ethoxy)carbonyl)amino)-3-methylisoxazol-5-yl)pyridin-3-yl)carbamoyl)cyclohexane-1-carboxylic acid | M9 + (−)-trans-1,2-Cyclohexane dicarboxylic anhydride | LC-MS (ESI): m/z (M + 1): 528.1 (Method) $^1$H NMR (400 MHz, DMSO-$d_6$) δ ppm 12.49-11.91 (m, 1 H), 10.42 (s, 1 H), 9.54-9.13 (m, 1 H), 8.85 (br s, 1 H), 8.36 (br s, 1 H), 8.15 (dd, J = 8.7, 2.5 Hz, 1 H), 8.02 (br s, 1 H), 7.74 (d, J = 8.8 Hz, 1 H), 7.65-7.34 (m, 1 H), 5.86 (q, J = 6.5 Hz, 1 H), 2.58 (br d, J = 7.0 Hz, 2 H), 2.15 (s, 3 H), 2.09-1.94 (m, 2 H), 1.78 (br d, J = 7.9 Hz, 2 H), 1.67-1.20 (m, 3 H), 1.41-1.20 (m, 4 H) |
| 30 | (1S,2S)-2-((6-(4-((((R)-1-(2-chloropyridin-3-yl)ethoxy)carbonyl)amino)-3-methylisoxazol-5-yl)pyridin-3-yl)(methyl)carbamoyl)cyclohexane-1-carboxylic acid | P1 + (−)-trans-1,2-Cyclohexane dicarboxylic anhydride | LC-MS (ESI): m/z (M + 1): 542.2 (Method) $^1$H NMR (400 MHz, DMSO-$d_6$) δ ppm 12.16 (br s, 1 H), 9.64-8.90 (m, 1 H), 8.71 (br s, 1 H), 8.37 (br s, 1 H), 8.13-7.11 (m, 4 H), 5.88 (br d, J = 5.5 Hz, 1 H), 3.17 (br s, 3 H), 2.96 2.25 (m, 2 H), 2.18 (br s, 3 H), 2.02-0.63 (m, 11 H) |
| 31 | (1S,2S)-2-((6-(4-((((R)-1-(2-chlorophenyl)ethoxy)carbonyl)amino)-3-methylisoxazol-5-yl)-5- | L6 + (−)-trans-1,2-Cyclohexane dicarboxylic anhydride | LC-MS (ESI): m/z (M + 1): 544.89 (Method 3) $^1$H NMR (300 MHz, DMSO-$d_6$) δ ppm 10.70 (s, 1H), 9.33 (s, 1H), 8.58 (s, 1H), 8.12 (d, J = 12.9 Hz, 1H), 7.43 (t, J = 33.5 Hz, 4H), 5.89 (q, J = 6.5 Hz, 1H), 2.62-2.54 (m, 2H), 2.20 (s, 3H), 2.12-1.93 (m, 2H), 1.83-1.71 (m, 2H), 1.50 (s, 2H), 1.41-1.15 (m, 6H) |

| Example | Structure & Name | Reagents | Analytical data |
|---|---|---|---|
| | fluoropyridin-3-yl)carbamoyl)cyclohexane-1-carboxylic acid | | |
| 32 | (1S,2S)-2-((2-methyl-6-(3-methyl-4-((((R)-1-(o-tolyl)ethoxy)carbonyl)amino)isoxazol-5-yl)pyridin-3-yl)carbamoyl)cyclohexane-1-carboxylic acid | L7 + (−)-trans-1,2-Cyclohexane dicarboxylic anhydride | LC-MS (ESI): m/z (M + 1): 520.18 (Method 6) <br> $^1$H NMR (300 MHz, DMSO-d$_6$) δ ppm 12.29 (bs, 1H), 9.75 (s, 1H), 9.09 (bs, 1H), 8.00 (d, J = 8.6, 3.6 Hz, 1H), 7.58 (d, J = 8.4 Hz, 1H), 7.44 (s, 1H), 7.17 (s, 3H), 5.88 (q, J = 7.2 Hz, 1H), 2.72-2.60 (m, 1H), 2.48-2.38 (m, 4H), 2.30 (s, 3H), 2.15 (s, 3H), 2.10-1.90 (m, 2H), 1.76 (s, 2H), 1.48 (s, 2H), 1.44-1.18 (m, 5H) |
| 34 | (1S,2S)-2-((6-(4-((((R)-1-(2-fluorophenyl)ethoxy)carbonyl)amino)-3-methylisoxazol-5-yl)pyridin-3-yl)carbamoyl)cyclohexane-1-carboxylic acid | L8 + (−)-trans-1,2-Cyclohexane dicarboxylic anhydride | LC-MS (ESI): m/z (M + 1): 511.19 (Method 4) <br> $^1$H NMR (300 MHz, DMSO-d$_6$) δ ppm 12.25 (bs, 1H), 10.49 (s, 1H), 9.32-9.03 (m, 1H), 8.82 (s, 1H), 8.17 (d, J = 8.1 Hz, 1H), 7.71 (d, J = 8.7 Hz, 1H), 7.64-7.01 (m, 4H), 5.91 (q, J = 7.0 Hz, 1H), 2.71-2.57 (m, 1H), 2.15 (s, 3H), 2.05-1.87 (m, 2H), 1.82-1.68 (m, 2H), 1.63-1.44 (m, 3H), 1.44-1.15 (m, 5H) |
| 35 | (1S,2S)-2-((6-(4-((((2-chlorobenzyl)oxy)carbonyl)amino)-3- | M10 + (−)-trans-1,2-Cyclohexane dicarboxylic anhydride | LC-MS (ESI): m/z (M + 1): 513.1 (Method 1) <br> $^1$H NMR (500 MHz, DMSO-d$_6$) δ ppm 12.17 (br s, 1 H), 10.46 (s, 1 H), 9.25 (br s, 1 H), 8.84 (br s, 1 H), 8.18 (dd, J = 8.6, 2.5 Hz, 1 H), 7.76 (d, J = 8.6 Hz, 1 H), 7.71-7.20 (m, 4 H), 5.51-4.98 (m, 2 H), 2.73-2.52 (m, 2 H), 2.19 (s, 3 H), 2.12-1.71 (m, 4 H), 1.43-1.22 (m, 4 H) |

-continued

| Example | Structure & Name | Reagents | Analytical data |
|---|---|---|---|
| | methylisoxazol-5-yl)pyridin-3-yl)carbamoyl)cyclohexane-1-carboxylic acid | | |
| 36 | (1S,2S)-2-((6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylic acid | L9 + (−)-trans-1,2-Cyclohexane dicarboxylic anhydride | LC-MS (ESI): m/z (M + 1): 561.94 (Method 7) $^1$H NMR (300 MHz, DMSO-d$_6$) δ ppm 12.42 (bs, 1H), 10.47 (bs, 1H), 9.20 (bs, 1H), 8.82 (bs, 1H), 8.14 (dd, J = 8.7, 2.5 Hz, 1H), 7.97-7.75 (m, 2H), 7.70 (d, J = 8.6 Hz, 2H), 7.58-7.39 (m, 1H), 5.98 (q, J = 6.4 Hz, 1H), 2.65-2.54 (m, 1H), 2.13 (s, 3H), 2.08-1.89 (m, 3H), 1.86-1.72 (m, 2H), 1.61-1.43 (m, 2H), 1.43-1.12 (m, 5H) |
| 37 | (1S,2S)-2-((6-(4-((((R)-1-(2-methoxyphenyl)ethoxy)carbonyl)amino)-3-methylisoxazol-5-yl)pyridin-3-yl)carbamoyl)cyclohexane-1-carboxylic acid | L10 + (−)-trans-1,2-Cyclohexane dicarboxylic anhydride | LC-MS (ESI): m/z (M + 1): 523.19 (Method 7) $^1$H NMR (300 MHz, DMSO-d$_6$) δ ppm 12.14 (s, 1H), 9.60 (s, 1H), 9.11 (bs, 1H), 7.93 (dd, J = 8.4, 4.3 Hz, 1H), 7.61 (d, J = 8.4 Hz, 1H), 7.49-7.33 (m, 1H), 7.25 (d, J = 8.2 Hz, 1H), 7.06-6.89 (m, 2H), 5.98 (q, J = 6.3 Hz, 1H), 3.79 (s, 3H), 2.71-2.62 (m, 1H), 2.59-2.51 (m, 1H), 2.43 (s, 3H), 2.17 (s, 3H), 2.07-1.99 (m, 2H), 1.83-1.70 (m, 2H), 1.37 (d, J = 37.3 Hz, 7H) |
| 38 | | L11 + (−)-trans-1,2-Cyclohexane dicarboxylic anhydride | LC-MS (ESI): m/z (M + 1): 535.17 (Method 5) $^1$H NMR (300 MHz, DMSO-d$_6$) δ ppm 12.15 (s, 1H), 10.43 (s, 1H), 9.10 (bs, 1H), 8.85 (s, 1H), 8.18 (dd, J = 8.7, 2.5 Hz, 1H), 7.73 (d, J = 8.6 Hz, 1H), 7.42 (bs, 1H), 7.28 (t, J = 7.2 Hz, 1H), 6.99 (d, J = 8.4 Hz, 2H), 5.96 (q, J = 6.8 Hz, 1H), 3.79 (s, 3H), 2.63-2.55 (m, 2H), 2.16 (s, 3H), 1.99 (d, J = 13.4 Hz, 2H), 1.87-1.73 (m, 2H), 1.57-1.14 (m, 7H) |

| Example | Structure & Name | Reagents | Analytical data |
|---|---|---|---|
|  | (1S,2S)-2-((6-(4-((((R)-1-(2-methoxyphenyl)ethoxy)carbonyl)amino)-3-methylisoxazol-5-yl)-2-methylpyridin-3-yl)carbamoyl)cyclohexane-1-carboxylic acid | | |
| 39 | Cis-2-((2-methyl-6-(3-methyl-4-((((R)-1-phenylethoxy)carbonyl)amino)isoxazol-5-yl)pyridin-3-yl)carbamoyl)cyclohexane-1-carboxylic acid | L5 + cis-1,2-Cyclohexane dicarboxylic anhydride | LC-MS (ESI): m/z (M + 1): 507.15 (Method 2) $^1$H NMR (300 MHz, DMSO-d$_6$) δ ppm 12.04 (s, 1H), 9.40 (s, 1H), 9.10 (bs, 1H), 7.89 (d, J = 8.4 Hz, 1H), 7.61 (d, J = 8.3 Hz, 1H), 7.49-7.11 (m, 5H), 5.73 (q, J = 7.3 Hz, 1H), 3.03 (q, J = 5.3 Hz, 1H), 2.77-2.64 (m, 1H), 2.42 (s, 3H), 2.17 (s, 3H), 2.12-1.91 (m, 2H), 1.80-1.53 (m, 3H), 1.56-1.41 (m, 4H), 1.41-1.29 (m, 2H) |
| 40 | Cis-2-((6-(3-methyl-4-((((R)-1-phenylethoxy)carbonyl)amino)isoxazol-5-yl)pyridin-3-yl)carbamoyl)cyclohexane-1-carboxylic acid | L12 + cis-1,2-Cyclohexane dicarboxylic anhydride | LC-MS (ESI): m/z (M + 1): 493.15 (Method 2) $^1$H NMR (300 MHz, DMSO-d$_6$) δ ppm 12.05 (bs, 1H), 10.30 (s, 1H), 9.10 (bs, 1H), 8.82 (s, 1H), 8.17 (dt, J = 8.7, 2.2 Hz, 1H), 7.72 (d, J = 8.7 Hz, 1H), 7.57-7.17 (m, 5H), 5.72 (q, J = 6.6 Hz, 1H), 2.98 (q, J = 5.0 Hz, 1H), 2.67 (hept, J = 9.3, 4.4 Hz, 1H), 2.15 (s, 3H), 2.12-1.92 (m, 2H), 1.86-1.68 (m, 2H), 1.68-1.26 (m, 7H) |

-continued

| Example | Structure & Name | Reagents | Analytical data |
|---|---|---|---|
| 41 | (1S,2S)-2-((6-(3-methyl-4-((((R)-1-phenylethoxy)carbonyl)amino)isoxazol-5-yl)pyridin-3-yl)carbamoyl)cyclohexane-1-carboxylic acid | L12 + (−)-trans-1,2-Cyclohexane dicarboxylic anhydride | LC-MS (ESI): m/z (M + 1): 493.20 (Method 2) $^1$H NMR (300 MHz, DMSO-d$_6$) δ ppm 12.59 (bs, 1H), 10.53 (s, 1H), 9.10 (bs, 1H), 8.92-8.76 (m, 1H), 8.17 (dd, J = 8.7, 2.5 Hz, 1H), 7.71 (d, J = 8.6 Hz, 1H), 7.55-6.95 (m, 5H), 5.72 (q, J = 6.7 Hz, 1H), 2.66-2.56 (m, 1H), 2.15 (s, 3H), 2.11-1.90 (m, 2H), 1.84-1.65 (m, 2H), 1.65-1.41 (m, 3H), 1.41-1.17 (m, 5H) |
| 42 | (1S,2S)-2-((6-(4-((((R)-1-(2-chlorophenyl)ethoxy)carbonyl)amino)-3-methylisothiazol-5-yl)-2-methylpyridin-3-yl)carbamoyl)cyclohexane-1-carboxylic acid | O1 + (−)-trans-1,2-Cyclohexane dicarboxylic anhydride | LC-MS (ESI): m/z (M + 1): 557.21 (Method 1) $^1$H NMR (400 MHz, DMSO-d$_6$) δ ppm 12.16 (br s, 1 H), 9.61 (br s, 1 H), 9.51 (br s, 1 H), 7.86 (d, J = 8.4 Hz, 1 H), 7.63 (br d, J = 6.7 Hz, 1 H), 7.52 (br d, J = 8.2 Hz, 1 H), 7.41-7.48 (m, 2 H), 7.29-7.39 (m, 1 H), 5.93-6.07 (m, 1 H), 2.69 (td, J = 11.3, 3.2 Hz, 1 H), 2.51-2.57 (m, 1 H), 2.42 (s, 3 H), 2.24 (br s, 3 H), 1.96-2.08 (m, 2 H), 1.71-1.84 (m, 2 H), 1.56 (br d, J = 5.5 Hz, 3 H), 1.16-1.42 (m, 4 H) |
| 43 | (1S,2S)-2-((2-methyl-6-(1-methyl-5-((((R)-1-phenylethoxy)carbonyl)amino)-1H-pyrazol-4-yl)pyridin-3-yl)carbamoyl)cyclohexane-1-carboxylic acid | M11 + (−)-trans-1,2-Cyclohexane dicarboxylic anhydride | LC-MS (ESI): m/z (M + 1): 506.23 (Method 1) $^1$H NMR (400 MHz, DMSO-d$_6$) δ ppm 12.17 (br s, 1 H), 9.52 (br s, 1 H), 9.43 (s, 1 H), 7.87 (s, 1 H), 7.58 (d, J = 8.3 Hz, 1 H), 7.30 (br d, J = 8.2 Hz, 1 H), 7.35 (br s, 5 H), 5.66-5.85 (m, 1 H), 3.64 (s, 3 H), 2.59-2.72 (m, 1 H), 2.51-2.57 (m, 1 H), 2.35 (s, 3 H), 1.92-2.09 (m, 2 H), 1.68-1.88 (m, 2 H), 1.52 (br s, 3 H), 1.16-1.43 (m, 4 H) |

| Example | Structure & Name | Reagents | Analytical data |
|---|---|---|---|
| 44 | 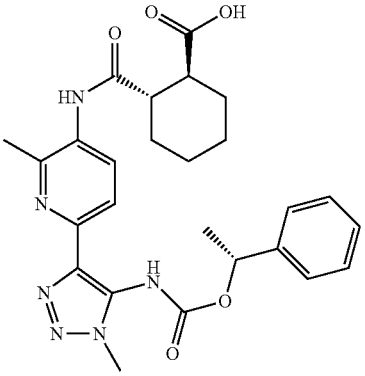 [SMILES: Cc1nc(-c2cnn(C)c2NC(=O)O[C@H](C)c2ccccc2)ccc1NC(=O)[C@H]1CCCC[C@@H]1C(=O)O]<br>(1S,2S)-2-((2-methyl-6-(1-methyl-5-((((R)-1-phenylethoxy)carbonyl)amino)-1H-1,2,3-triazol-4-yl)pyridin-3-yl)carbamoyl)cyclohexane-1-carboxylic acid | M12<br>+<br>(−)-trans-1,2-Cyclohexane dicarboxylic anhydride | LC-MS (ESI): m/z (M + 1): 507.3 (Method 1)<br>$^1$H NMR (400 MHz, DMSO-d$_6$) δ ppm 12.11 (br s, 1 H), 9.50 (br s, 1 H), 9.56 (br s, 1 H), 7.65-7.98 (m, 2 H), 6.73-7.60 (m, 5 H), 5.75 (br s, 1 H), 3.86 (s, 3 H), 2.59-2.74 (m, 1 H), 2.51-2.57 (m, 1 H), 2.33 (s, 3 H), 1.93-2.11 (m, 2 H), 1.77 (br s, 2 H), 1.50 (br s, 3 H), 1.19-1.40 (m, 4 H) |
| 45 | 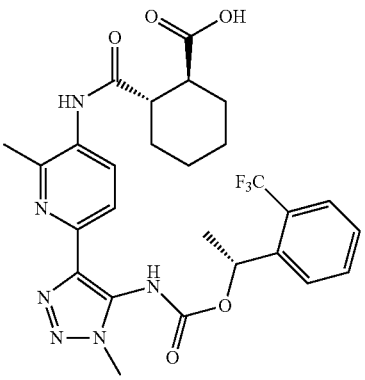<br>(1S,2S)-2-((2-methyl-6-(1-methyl-5-((((R)-1-(2-(trifluoromethyl)phenyl)ethoxy)carbonyl)amino)-1H-1,2,3-triazol-4-yl)pyridin-3-yl)carbamoyl)cyclohexane-1-carboxylic acid | M13<br>+<br>(−)-trans-1,2-Cyclohexane dicarboxylic anhydride | LC-MS (ESI): m/z (M + 1): 575.3 (Method 1)<br>$^1$H NMR (400 MHz, DMSO-d$_6$) δ ppm 12.14 (br s, 1 H), 9.68 (br s, 1 H), 9.46 (br s, 1 H), 7.25-8.00 (m, 6 H), 6.03 (br s, 1 H), 3.86 (s, 3 H), 2.60-2.77 (m, 1 H), 2.52-2.58 (m, 1 H), 2.28 (br s, 3 H), 1.91-2.12 (m, 2 H), 1.13-1.86 (m, 9 H) |
| 46 | 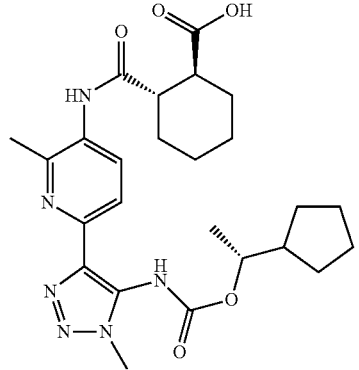 [SMILES: Cc1nc(-c2nnn(C)c2NC(=O)O[C@H](C)C2CCCC2)ccc1NC(=O)[C@H]1CCCC[C@@H]1C(=O)O]<br>(1S,2S)-2-((6-(5-((((R)-1-cyclopentylethoxy)carbonyl)amino)-1-methyl-1H-1,2,3-triazol-4-yl)-2-methylpyridin-3- | M14<br>+<br>(−)-trans-1,2-Cyclohexane dicarboxylic anhydride | LC-MS (ESI): m/z (M + 1): 499.3 (Method 1)<br>$^1$H NMR (400 MHz, DMSO-d$_6$) δ ppm 12.11 (br s, 1 H), 9.53 (br s, 1 H), 9.36 (br s, 1 H), 7.65-7.89 (m, 2 H), 4.51-4.69 (m, 1 H), 3.87 (s, 3 H), 2.60-2.72 (m, 1 H), 2.51-2.58 (m, 1 H), 2.39 (s, 3 H), 1.99 (br d, J = 11.0 Hz, 2 H), 1.72-1.84 (m, 2 H), 0.94-1.86 (m, 16 H) |

| Example | Structure & Name | Reagents | Analytical data |
|---|---|---|---|
| | yl)carbamoyl)cyclohexane-1-carboxylic acid | | |
| 47 | (1S,2S)-2-((6-(5-((((R)-1-(2-fluorophenyl)ethoxy)carbonyl)amino)-1-methyl-1H-1,2,3-triazol-4-yl)-2-methylpyridin-3-yl)carbamoyl)cyclohexane-1-carboxylic acid | M15 + (−)-trans-1,2-Cyclohexane dicarboxylic anhydride | LC-MS (ESI): m/z (M + 1): 525.3 (Method 1) $^1$H NMR (400 MHz, DMSO-$d_6$) δ ppm 11.71-12.65 (m, 1 H), 9.20-10.12 (m, 2 H), 7.70-7.90 (m, 2 H), 6.70-7.67 (m, 4 H), 5.94 (br s, 1 H), 3.87 (s, 3 H), 2.61-2.74 (m, 1 H), 2.46-2.56 (m, 1 H), 2.32 (s, 3 H), 1.94-2.08 (m, 2 H), 1.76 (br s, 2 H), 1.20-1.70 (m, 7 H) |
| 48 | (1S,2S)-2-((6-(5-((((R)-1-(2-chlorophenyl)ethoxy)carbonyl)amino)-1-ethyl-1H-1,2,3-triazol-4-yl)-2-methylpyridin-3-yl)carbamoyl)cyclohexane-1-carboxylic acid | M16 + (−)-trans-1,2-Cyclohexane dicarboxylic anhydride | LC-MS (ESI): m/z (M + 1): 555.3 (Method 1) $^1$H NMR (400 MHz, Chloroform-d) δ ppm 7.98 (br d, J = 8.1 Hz, 1 H), 7.85-7.67 (m, 2 H), 7.50-7.29 (m, 2 H), 7.25-7.16 (m, 2 H), 6.17 (q, J = 6.5 Hz, 1 H), 4.56-4.33 (m, 2 H), 2.88-2.77 (m, 1 H), 2.65 (td, J = 11.3, 2.7 Hz, 1 H), 2.35 (br s, 3 H), 2.25 (br d, J = 11.2 Hz, 1 H), 2.02 (br d, J = 11.6 Hz, 1 H), 1.57-1.48 (m, 6 H), 1.22-1.91 (m, 6 H) |
| 49 | | L13 + (−)-trans-1,2-Cyclohexane dicarboxylic anhydride | LC-MS (ESI): m/z (M + 1): 473.3 (Method 1) $^1$H NMR (400 MHz, DMSO-$d_6$) δ ppm 12.15 (br s, 1 H), 9.62 (s, 1 H), 8.85 (br s, 1 H), 7.95 (d, J = 8.4 Hz, 1 H), 7.63 (d, J = 8.4 Hz, 1 H), 4.63-4.80 (m, 1 H), 2.62-2.77 (m, 1 H), 2.49-2.59 (m, 1 H), 2.46 (s, 3 H), 2.19 (s, 3 H), 1.94-2.10 (m, 2 H), 1.67-1.90 (m, 2 H), 1.22-1.65 (m, 8 H), 1.18 (br s, 3 H), 0.86 (br s, 3 H) |

| Example | Structure & Name | Reagents | Analytical data |
|---|---|---|---|
| | (1S,2S)-2-((2-methyl-6-(3-methyl-4-(((((R)-pentan-2-yl)oxy)carbonyl)amino)isoxazol-5-yl)pyridin-3-yl)carbamoyl)cyclohexane-1-carboxylic acid | | |
| 50 | 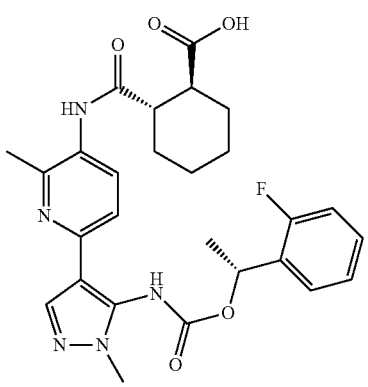 [SMILES: Cc1nc(-c2cnn(C)c2NC(=O)O[C@H](C)c2ccccc2F)ccc1NC(=O)[C@H]1CCCC[C@@H]1C(=O)O]<br>(1S,2S)-2-((6-(5-(((((R)-1-(2-fluorophenyl)ethoxy)carbonyl)amino)-1-methyl-1H-pyrazol-4-yl)-2-methylpyridin-3-yl)carbamoyl)cyclohexane-1-carboxylic acid | M17<br>+<br>(−)-trans-1,2-Cyclohexane dicarboxylic anhydride | LC-MS (ESI): m/z (M + 1): 524.3 (Method 1)<br>$^1$H NMR (400 MHz, DMSO-$d_6$) δ ppm 12.10 (br s, 1 H), 9.59 (br s, 1 H), 9.46 (br s, 1 H), 7.87 (s, 1 H), 7.60 (d, J = 8.3 Hz, 1 H), 7.30 (br d, J = 8.3 Hz, 1 H), 7.10-7.65 (m, 4 H), 5.83-6.06 (m, 1 H), 3.64 (s, 3 H), 2.64 (td, J = 11.3, 2.5 Hz, 1 H), 2.44-2.55 (m, 1 H), 2.34 (s, 3 H), 1.93-2.09 (m, 2 H), 1.70-1.89 (m, 2 H), 1.23-1.68 (m, 3 H), 1.22-1.42 (m, 4 H) |
| 51 | 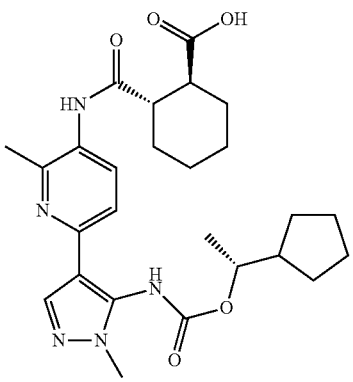 [SMILES: Cc1nc(-c2cnn(C)c2NC(=O)O[C@H](C)C2CCCC2)ccc1NC(=O)[C@H]1CCCC[C@@H]1C(=O)O]<br>(1S,2S)-2-((6-(5-(((((R)-1-cyclopentylethoxy)carbonyl)amino)-1-methyl-1H-pyrazol-4-yl)-2-methylpyridin-3-yl)carbamoyl)cyclohexane-1-carboxylic acid | M18<br>+<br>(−)-trans-1,2-Cyclohexane dicarboxylic anhydride | LC-MS (ESI): m/z (M + 1): 498.34 (Method 1)<br>$^1$H NMR (400 MHz, DMSO-$d_6$) δ ppm 11.25-12.84 (m, 1 H), 9.45 (s, 1 H), 8.73-9.41 (m, 1 H), 7.87 (s, 1 H), 7.61 (d, J = 8.4 Hz, 1 H), 7.35 (d, J = 8.4 Hz, 1 H), 4.62 (br s, 1 H), 3.66 (s, 3 H), 2.63 (td, J = 11.3, 3.5 Hz, 1 H), 2.46-2.54 (m, 1 H), 2.38 (s, 3 H), 1.88-2.11 (m, 3 H), 0.96-1.24 (m, 3 H), 0.91-1.85 (m, 14 H) |

| Example | Structure & Name | Reagents | Analytical data |
|---|---|---|---|
| 52 | 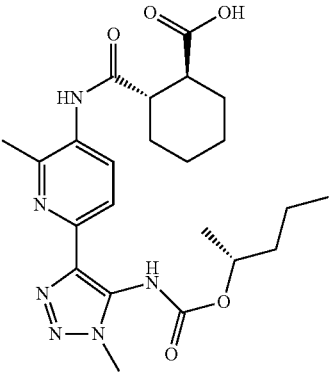 [SMILES: CCC[C@@H](C)OC(=O)Nc1c(-c2ccc(NC(=O)[C@H]3CCCC[C@@H]3C(=O)O)c(C)n2)nnn1C]<br>(1S,2S)-2-((2-methyl-6-(1-methyl-5-(((((R)-pentan-2-yl)oxy)carbonyl)amino)-1H-1,2,3-triazol-4-yl)pyridin-3-yl)carbamoyl)cyclohexane-1-carboxylic acid | M19<br>+<br>(−)-trans-1,2-Cyclohexane dicarboxylic anhydride | LC-MS (ESI): m/z (M + 1): 473 (Method 1)<br>1H NMR (400 MHz, DMSO-d$_6$) δ ppm 11.64-12.52 (m, 1 H), 9.52 (br s, 2 H), 7.57-8.04 (m, 2 H), 4.43-5.01 (m, 1 H), 3.87 (s, 3 H), 2.60-2.73 (m, 1 H), 2.52 (br d, J = 1.8 Hz, 1 H), 2.39 (s, 3 H), 1.94-2.11 (m, 2 H), 1.70-1.88 (m, 2 H), 0.72-1.68 (m, 14 H) |

Example 4 and Example 5

To a solution of Trans-methyl 2-((4-(5-((((R)-1-(2-chlorophenyl)ethoxy)carbonyl) amino)-1-methyl-1H-pyrazol-4-yl)phenyl)carbamoyl)cyclohexane-1-carboxylate (Intermediate Q1, 146 mg, 0.27 mmol) in THF (4 mL)/Water (4 mL), LiOH (26 mg, 1 mmol) was added and the mixture was stirred at r.t. for 72 h. The solvent was removed under reduced pressure and the residue was dissolved in water, then HCl 6N was added up to acidic pH. The precipitate was filtered, dried and submitted to chiral semi-preparative SFC.

Conditions: Column: Whelk 01 (R,R) (25×2 cm), 10 μm; Modifier: (Methanol+0.1% isopropylamine) 35%; Flow rate 45 mL/min; UV detection: 220 nm; Loop: 350 μl.

Example 4

Single Diastereomer 2 of Trans-2-((4-(5-((((R)-1-(2-chlorophenyl)ethoxy)carbonyl) amino)-1-methyl-1H-pyrazol-4-yl)phenyl)carbamoyl)cyclohexane-1-carboxylic acid

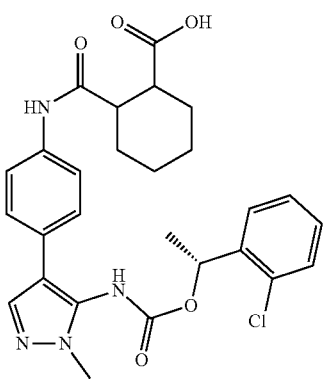 [SMILES: C[C@@H](OC(=O)Nc1c(-c2ccc(NC(=O)C3CCCCC3C(=O)O)cc2)cnn1C)c1ccccc1Cl]

LC-MS (ESI): m/z (M+1): 525.2 (Method 1)

$^1$H NMR (500 MHz, DMSO-d$_6$) δ ppm 12.04 (br s, 1H), 9.92 (s, 1H), 9.73-9.11 (m, 1H), 7.64-7.83 (m, 1H), 7.58-7.52 (m, 2H), 7.38-7.31 (m, 2H), 7.62-6.50 (m, 4H), 6.11-5.77 (m, 1H), 3.77-3.50 (m, 3H), 2.59-2.52 (m, 2H), 2.11-1.91 (m, 2H), 1.84-1.68 (m, 2H), 1.62-1.16 (m, 3H), 1.41-1.13 (m, 4H)

Example 5

Single Diastereomer 1 of Trans-2-((4-(5-((((R)-1-(2-chlorophenyl)ethoxy)carbonyl) amino)-1-methyl-1H-pyrazol-4-yl)phenyl)carbamoyl)cyclohexane-1-carboxylic acid

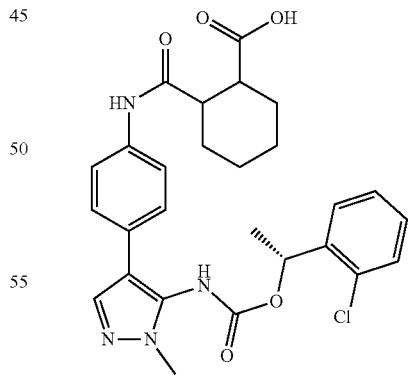

LC-MS (ESI): m/z (M+1): 525.2 (Method 1)

$^1$H NMR (500 MHz, DMSO-d$_6$) δ ppm 12.23-11.87 (m, 1H), 10.05-9.80 (m, 1H), 9.71-9.09 (m, 1H), 7.77-7.65 (m, 1H), 7.58-7.52 (m, 2H), 7.37-7.29 (m, 2H), 7.64-6.56 (m, 4H), 6.11-5.81 (m, 1H), 3.73-3.53 (m, 3H), 2.58-2.52 (m, 2H), 2.05-1.92 (m, 2H), 1.81-1.71 (m, 2H), 1.36-1.25 (m, 4H), 1.61-1.17 (m, 3H)

Example 6

Cis-2-((4-(3-((((R)-1-(2-chlorophenyl)ethoxy)carbonyl)amino)thiophen-2-yl)phenyl)carbamoyl)cyclohexane-1-carboxylic acid

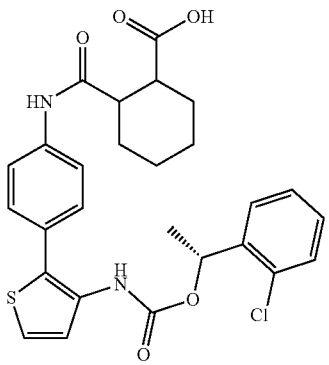 [SMILES: C[C@@H](OC(=O)Nc1ccsc1-c1ccc(NC(=O)C2CCCCC2C(=O)O)cc1)c1ccccc1Cl]

To a solution of Cis-methy-2-((4-(3-((((R)-1-(2-chlorophenyl)ethoxy)carbonyl) amino)thiophen-2-yl)phenyl)carbamoyl)cyclohexane-1-carboxylate (Intermediate R1, 360 mg, 0.66 mmol) in MeOH (2.5 mL)/Water (2.5 mL), LiOH (30 mg, 1.2 mmol) was added and the mixture was stirred at r.t. for 3 h. HCl 1N was added up to acidic pH and the mixture was extracted with EtOAc. The organic phase was dried over $Na_2SO_4$ and concentrated under reduced pressure. The residue was purified by flash chromatography using a gradient of MeOH in DCM from 0% to 10% affording the title compound (260 mg, 0.49 mmol, 78% yield).

LC-MS (ESI): m/z (M+1): 527.2 (Method 1)

$^1$H NMR (500 MHz, DMSO-$d_6$) δ ppm 11.97 (br s, 1H), 10.20-9.65 (m, 1H), 9.19 (br d, J=4.4 Hz, 1H), 7.67-7.59 (m, 2H), 7.59-7.14 (m, 7H), 7.04 (d, J=5.5 Hz, 1H), 5.94 (br d, J=4.7 Hz, 1H), 2.95 (q, J=4.6 Hz, 1H), 2.66-2.57 (m, 1H), 2.19-2.06 (m, 1H), 2.06-1.98 (m, 1H), 1.83-1.58 (m, 3H), 1.56-1.20 (m, 6H)

Example 6 was submitted to semipreparative SFC.

Conditions: Column: Chiralpak AD-H (25×0.46 cm), 5 μm; Modifier: Methanol 30%; Flow rate 2.5 mL/min; UV detection: 220 nm; Loop: 20 μl.

Example 7

Single Diastereomer 1 of Cis-2-((4-(3-((((R)-1-(2-chlorophenyl) ethoxy)carbonyl)amino)thiophen-2-yl)phenyl)carbamoyl)cyclohexane-1-carboxylic acid

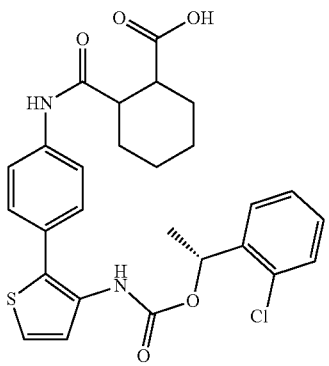 [SMILES: C[C@@H](OC(=O)Nc1ccsc1-c1ccc(NC(=O)C2CCCCC2C(=O)O)cc1)c1ccccc1Cl]

LC-MS (ESI): m/z (M+1): 527.2 (Method 1)

$^1$H NMR (400 MHz, DMSO-$d_6$) δ ppm 12.39-11.51 (m, 1H), 10.89-9.64 (m, 1H), 9.31-8.94 (m, 1H), 7.68-7.58 (m, 2H), 7.57-7.15 (m, 7H), 7.12-6.92 (m, 1H), 6.05-5.85 (m, 1H), 2.93 (br d, J=4.6 Hz, 1H), 2.64-2.55 (m, 1H), 2.15-1.95 (m, 2H), 1.79-1.59 (m, 3H), 1.56-1.25 (m, 6H)

Example 8

Single Diastereomer 2 of Cis-2-((4-(3-((((R)-1-(2-chlorophenyl) ethoxy)carbonyl)amino)thiophen-2-yl)phenyl)carbamoyl) cyclohexane-1-carboxylic acid

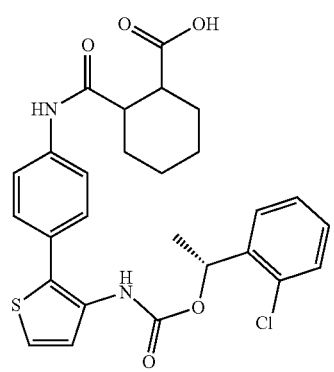 [SMILES: C[C@@H](OC(=O)Nc1ccsc1-c1ccc(NC(=O)C2CCCCC2C(=O)O)cc1)c1ccccc1Cl]

LC-MS (ESI): m/z (M+1): 527.2 (Method 1)

$^1$H NMR (400 MHz, DMSO-$d_6$) δ ppm 12.46-11.56 (m, 1H), 10.67-9.83 (m, 1H), 9.34-8.99 (m, 1H), 7.62 (d, J=8.8 Hz, 2H), 7.57-7.25 (m, 7H), 7.04 (d, J=5.3 Hz, 1H), 6.01-5.87 (m, 1H), 2.92 (br d, J=4.6 Hz, 1H), 2.63-2.54 (m, 1H), 2.14-1.96 (m, 2H), 1.78-1.59 (m, 3H), 1.57-1.26 (m, 6H)

Example 9

Trans-2-((4-(3-((((R)-1-(2-chlorophenyl)ethoxy)carbonyl)amino)thiophen-2-yl)phenyl)carbamoyl)cyclohexane-1-carboxylic acid

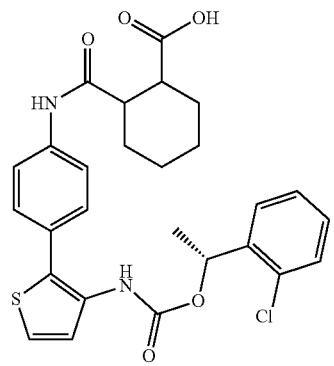 [SMILES: C[C@@H](OC(=O)Nc1ccsc1-c1ccc(NC(=O)C2CCCCC2C(=O)O)cc1)c1ccccc1Cl]

To a solution of Trans-methy-2-((4-(3-((((R)-1-(2-chlorophenyl)ethoxy)carbonyl) amino)thiophen-2-yl)phenyl)carbamoyl)cyclohexane-1-carboxylate (Intermediate Q2, 318 mg, 0.58 mmol) in THF (2.5 mL)/MeOH (2.5 mL)/Water (2.5 mL), LiOH (28 mg, 1.17 mmol) was added and the mixture was stirred at r.t. for 3 h. HCl 1N was added up to acidic pH and the mixture was extracted with EtOAc. The organic phase was dried over $Na_2SO_4$ and concentrated under reduced pressure. The residue was purified by flash chromatography using a gradient of MeOH in DCM from 0% to 10% affording the title compound (110 mg, 0.21 mmol, 36% yield).

LC-MS (ESI): m/z (M+1): 527.4 (Method 1)

$^1$H NMR (400 MHz, DMSO-$d_6$) δ ppm 13.09-10.87 (m, 1H), 10.31-9.82 (m, 1H), 9.46-8.79 (m, 1H), 7.63 (d, J=8.6 Hz, 2H), 7.59-7.26 (m, 7H), 7.04 (d, J=5.5 Hz, 1H), 6.16-5.75 (m, 1H), 2.59-2.51 (m, 1H), 2.10-1.18 (m, 8H), 1.59-1.39 (m, 3H)

Example 9 was submitted to semipreparative SFC.

Conditions: Column: Chiralpak AD-H (25×2 cm), 5 µm; Modifier: Methanol 30%; Flow rate 45 mL/min; UV detection: 220 nm; Loop: 500 µl.

Example 10

Single Diastereomer 1 of Trans-2-((4-(3-((((R)-1-(2-chlorophenyl) ethoxy)carbonyl) amino)thiophen-2-yl)phenyl)carbamoyl)cyclohexane-1-carboxylic acid

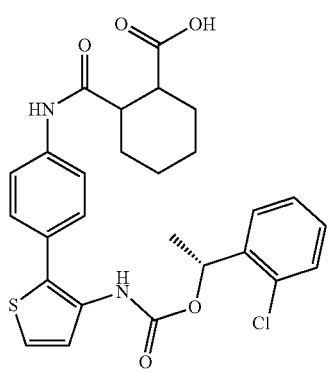 [SMILES: C[C@@H](OC(=O)Nc1ccsc1-c1ccc(NC(=O)C2CCCCC2C(=O)O)cc1)c1ccccc1Cl]

LC-MS (ESI): m/z (M+1): 527.4 (Method 1)

$^1$H NMR (400 MHz, DMSO-$d_6$) δ ppm 13.09-10.87 (m, 1H), 10.31-9.82 (m, 1H), 9.46-8.79 (m, 1H), 7.63 (d, J=8.6 Hz, 2H), 7.59-7.26 (m, 7H), 7.04 (d, J=5.5 Hz, 1H), 6.16-5.75 (m, 1H), 2.59-2.51 (m, 1H), 2.10-1.18 (m, 8H), 1.59-1.39 (m, 3H)

Example 12

(1R,2R)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid

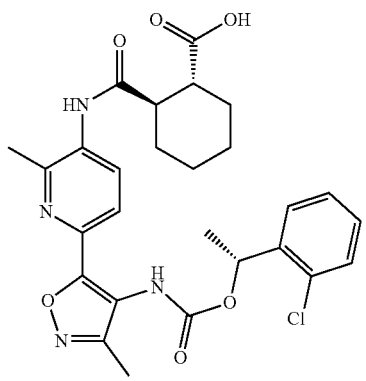 [SMILES: Cc1nc(-c2onc(C)c2NC(=O)O[C@H](C)c2ccccc2Cl)ccc1NC(=O)[C@@H]1CCCC[C@H]1C(=O)O]

To a solution of Trans-methyl 2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylate (Intermediate Q3, 91.6 mg, 0.17 mmol) in THF (1.5 mL) and Water (0.3 mL), LiOH (8 mg, 0.33 mmol) was added and the mixture was stirred at 40° C. for 4 h. HCl 1N was added till acidic pH and the mixture was extracted with EtOAc. The organic layer was dried over $Na_2SO_4$ and concentrated under reduced pressure. The residue was purified by flash chromatography using a gradient of MeOH in DCM from 0% to 10% and then submitted to semipreparative SFC.

Conditions: Column: Chiralpak AD-H (25×0.46 cm), 5 µm; Modifier: (Ethanol+0.1% trifluoroacetic acid) 20%; Flow rate 2.5 mL/min; UV detection: 220 nm; Loop: 20 µl. The absolute stereochemistry (1R,2R) was assigned by comparing chiral HPLC with Example 1.

Example 12

LC-MS (ESI): m/z (M+1): 541.4 (Method 1)

$^1$H NMR (400 MHz, DMSO-$d_6$) δ ppm 12.60-11.59 (m, 1H), 9.90-8.95 (m, 2H), 7.95 (d, J=8.3 Hz, 1H), 7.71-7.55 (m, 1H), 7.61-7.22 (m, 4H), 6.17-5.82 (m, 1H), 2.75-2.52 (m, 2H), 2.42 (s, 3H), 2.16 (s, 3H), 1.60-1.25 (m, 3H), 2.08-1.20 (m, 8H).

Example 13 and Example 14

To a solution of Cis-methyl 2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylate (Intermediate R2, 70 mg, 0.13 mmol) in THF (3.3 mL)/Water (0.2 mL), LiOH (6 mg, 0.25 mmol) was added and the mixture was stirred at r.t. for 12 h. Volatiles were removed under reduced pressure, the residue was dissolved in water and HCl 3N was added till acidic pH. The solvent was removed under reduced pressure and the residue was purified by reversed-phase flash chromatography using a gradient of MeCN in acid $H_2O$ (+0.1% HCOOH) from 5% to 70% and then submitted to semipreparative SFC.

Conditions: Column: Chiralpak IC (25×0.46 cm), 5 µm; Modifier: Methanol 25%; Flow rate 2.5 mL/min; UV detection: 220 nm; Loop: 20 µl.

Example 13

Single Diastereomer 2 of Cis-2-((6-(4-((((R)-1-(2-chlorophenyl) ethoxy)carbonyl)amino)-3-methyl-isoxazol-5-yl)-2-methylpyridin-3-yl)carbamoyl)cyclohexane-1-carboxylic acid

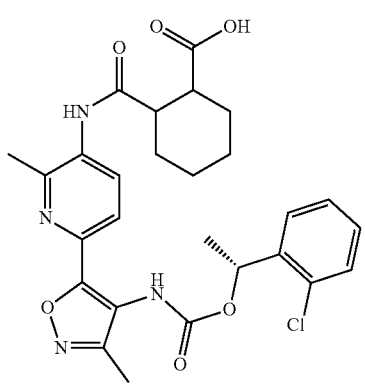 [SMILES: Cc1nc(-c2onc(C)c2NC(=O)O[C@H](C)c2ccccc2Cl)ccc1NC(=O)C1CCCCC1C(=O)O]

LC-MS (ESI): m/z (M+1): 541.4 (Method 1)

$^1$H NMR (400 MHz, DMSO-d$_6$) δ ppm 12.57-11.64 (m, 1H), 10.05-8.96 (m, 2H), 7.93 (br d, J=8.3 Hz, 1H), 7.73-7.24 (m, 5H), 5.98 (br d, J=4.8 Hz, 1H), 3.09-2.61 (m, 2H), 2.42 (s, 3H), 2.17 (s, 3H), 2.05 (br d, J=4.8 Hz, 2H), 1.83-1.24 (m, 9H)

Example 14

Single Diastereomer 1 of Cis-2-((6-(4-((((R)-1-(2-chlorophenyl) ethoxy)carbonyl)amino)-3-methyl-isoxazol-5-yl)-2-methylpyridin-3-yl)carbamoyl)cyclohexane-1-carboxylic acid

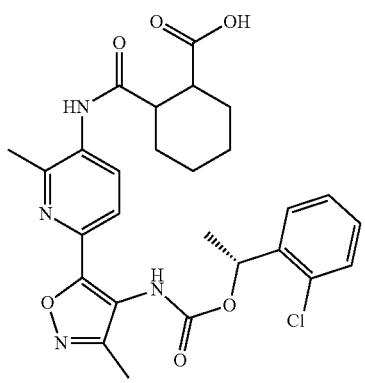 [SMILES: Cc1nc(-c2onc(C)c2NC(=O)O[C@H](C)c2ccccc2Cl)ccc1NC(=O)C1CCCCC1C(=O)O]

LC-MS (ESI): m/z (M+1): 541.4 (Method 1)

$^1$H NMR (400 MHz, DMSO-d$_6$) δ ppm 12.57-11.64 (m, 1H), 10.05-8.96 (m, 2H), 7.93 (br d, J=8.3 Hz, 1H), 7.73-7.24 (m, 5H), 5.98 (br d, J=4.8 Hz, 1H), 3.09-2.61 (m, 2H), 2.42 (s, 3H), 2.17 (s, 3H), 2.05 (br d, J=4.8 Hz, 2H), 1.83-1.24 (m, 9H)

Example 18

Single Diastereomer 1 of (1S,2S)-2-((6-(4-(((1-(2-fluoropyridin-3-yl)ethoxy) carbonyl)amino)-3-methylisoxazol-5-yl)pyridin-3-yl)carbamoyl)cyclohexane-1-carboxylic acid

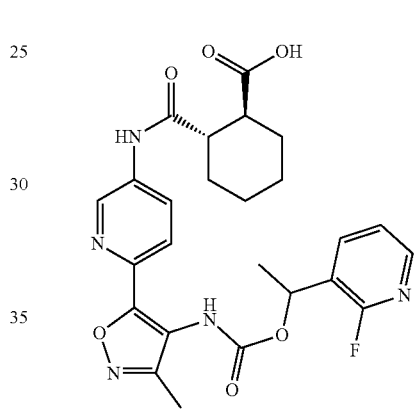

Compound (1S,2S)-2-((6-(4-(((1-(2-fluoropyridin-3-yl)ethoxy)carbonyl)amino)-3-methylisoxazol-5-yl)pyridin-3-yl)carbamoyl)cyclohexane-1-carboxylic acid (Example 17, 108.3 mg, 0.21 mmol) was submitted to chiral chromatography.

Conditions: Column: Chiralpak AD-H (25×0.46 cm), 5 µm; Modifier: n-Hexane/(Ethanol+0.1% trifluoroacetic acid) 60/40% v/v; Flow rate 1 mL/min; UV detection: 220 nm; Loop: 20 µl.

Example 18

LC-MS (ESI): m/z (M+1): 512.2 (Method 1)

$^1$H NMR (400 MHz, DMSO-d$_6$) δ ppm 12.68-11.81 (m, 1H), 10.43 (s, 1H), 9.22 (br d, J=1.3 Hz, 1H), 8.80 (br s, 1H), 8.37-7.92 (m, 3H), 7.72 (d, J=8.6 Hz, 1H), 7.57-7.17 (m, 1H), 5.82 (br d, J=6.6 Hz, 1H), 2.65-2.52 (m, 2H), 2.06-1.93 (m, 2H), 2.15 (s, 3H), 1.86-1.71 (m, 2H), 1.56 (br s, 3H), 1.40-1.21 (m, 4H)

Example 20

Single Diastereomer 2 of (1S,2S)-2-((6-(4-(((−1-(2-fluoropyridin-3-yl)ethoxy) carbonyl)amino)-3-methylisoxazol-5-yl)-2-methylpyridin-3-yl)carbamoyl) cyclohexane-1-carboxylic acid

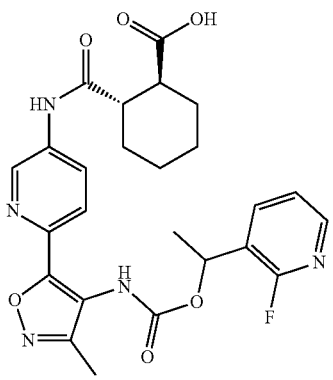 [SMILES: Cc1noc(-c2ccc(NC(=O)[C@H]3CCCC[C@@H]3C(=O)O)cn2)c1NC(=O)OC(C)c1cccnc1F]

Compound (1S,2S)-2-((6-(4-(((1-(2-fluoropyridin-3-yl)ethoxy)carbonyl)amino)-3-methylisoxazol-5-yl)-2-methylpyridin-3-yl)carbamoyl)cyclohexane-1-carboxylic acid (Example 19, 85 mg, 0.16 mmol) was submitted to chiral semipreparative chromatography. Conditions: Column: Whelk 01 (R,R) (25×0.46 cm), 10 μm; Modifier: n-Hexane/(Ethanol+0.1% trifluoroacetic acid) 65/35% v/v; Flow rate 1 mL/min; UV detection: 220 nm; Loop: 20 μl.

Example 20

LC-MS (ESI): m/z (M+1): 526.2 (Method 1)
$^1$H NMR (500 MHz, DMSO-d$_6$) δ ppm 13.00-11.11 (m, 1H), 9.58 (br s, 1H), 9.37-8.55 (m, 1H), 8.29-7.97 (m, 2H), 7.92 (d, J=8.4 Hz, 1H), 7.61 (d, J=8.4 Hz, 1H), 7.53-7.04 (m, 1H), 6.05-5.63 (m, 1H), 2.70 (td, J=11.2, 3.2 Hz, 1H), 2.57-2.52 (m, 1H), 2.39 (br s, 3H), 2.16 (s, 3H), 2.08-1.94 (m, 2H), 1.84-1.71 (m, 2H), 1.41-1.23 (m, 4H), 1.70-1.15 (m, 3H)

Example 24

(1S,2S)-2-((6-(4-((((R)-1-(2-fluorophenyl)ethoxy) carbonyl)amino)-3-methylisoxazol-5-yl)-2-methylpyridin-3-yl)carbamoyl)cyclohexane-1-carboxylic acid

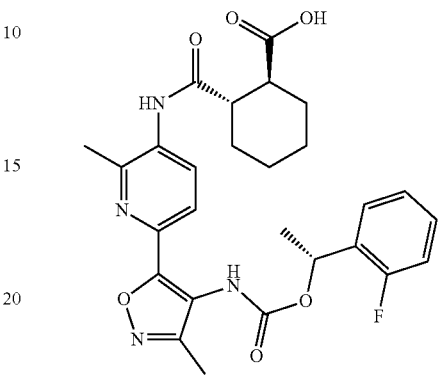

To a solution of tert-butyl 2-((6-(4-((((R)-1-(2-fluorophenyl)ethoxy)carbonyl)amino)-3-methylisoxazol-5-yl)-2-methylpyridin-3-yl)carbamoyl)cyclohexane-1-carboxylate (Intermediate J13, 103 mg, 0.20 mmol) in DCM (2.5 mL) cooled to 0° C., a 4M solution of HCl in 1,4-Dioxane (0.89 mL, 3.60 mmol) was added dropwise. After stirring overnight at room temperature the solvent was evaporated and the product was purified via pTLC (5% MeOH in DCM) to give the title compound as a white solid (70 mg, 0.13 mmol, 75% yield).

LC-MS (ESI): m/z (M+1): 525 (Method 3)
$^1$H NMR (300 MHz, DMSO-d$_6$) δ ppm 12.26 (bs, 1H), 10.04 (s, 1H), 9.17 (s, 1H), 8.13 (d, J=8.4 Hz, 1H), 7.59 (d, J=8.4 Hz, 1H), 7.56-7.32 (m, 2H), 7.32-7.07 (m, 2H), 5.94 (d, J=7.1 Hz, 1H), 2.72-2.64 (m, 1H), 2.45 (s, 3H), 2.40-2.30 (m, 1H), 2.17 (s, 3H), 2.09-1.98 (m, 1H), 1.98-1.85 (m, 1H), 1.74 (s, 2H), 1.54 (s, 2H), 1.47-1.30 (m, 2H), 1.30-1.16 (m, 3H)

The Examples in the following table were prepared from reagents reported below following similar procedures as for Example 24.

| Example | Structure & Name | Reagents | Analytical data |
|---|---|---|---|
| 25 | (1S,2S)-2-((2-methyl-6-(3-methyl-4-((((R)-1-(2-(trifluoromethyl)phenyl)ethoxy)carbonyl)amino)isoxazol-5-yl)pyridin-3- | J14 | LC-MS (ESI): m/z (M + 1): 575.06 (Method 5)<br>$^1$H NMR (300 MHz, DMSO-d$_6$) δ ppm 12.28 (bs, 1H), 9.93 (s, 1H), 9.20 (s, 1H), 8.09 (d, J = 8.5 Hz, 1H), 7.98-7.65 (m, 3H), 7.60 (d, J = 8.4 Hz, 1H), 7.57-7.43 (m, 1H), 6.02 (d, J = 6.8 Hz, 1H), 2.71-2.61 (m, 1H), 2.42 (s, 3H), 2.39-2.31 (m, 1H), 2.15 (s, 3H), 2.03 (s, 1H), 1.99-1.88 (m, 1H), 1.75 (s, 2H), 1.54 (s, 2H), 1.48-1.18 (m, 5H)] |

| Example | Structure & Name | Reagents | Analytical data |
|---|---|---|---|
| | yl)carbamoyl)cyclohexane-1-carboxylic acid | | |
| 26 | (1S,2S)-2-((6-(4-((((R)-1-cyclopentylethoxy)carbonyl)amino)-3-methylisoxazol-5-yl)-2-methylpyridin-3-yl)carbamoyl)cyclohexane-1-carboxylic acid | J15 | LC-MS (ESI): m/z (M + 1): 499.14 (Method 4)<br>$^1$H NMR (300 MHz, DMSO-d$_6$) δ ppm 12.29 (bs, 1H), 9.96 (s, 1H), 8.87 (s, 1H), 8.11 (d, J = 8.6 Hz, 1H), 7.62 (d, J = 8.4 Hz, 1H), 4.61 (t, J = 6.7 Hz, 1H), 2.72-2.62 (m, 1H), 2.49 (s, 3H), 2.36 (d, J = 11.2 Hz, 1H), 2.20 (s, 3H), 2.08-1.86 (m, 3H), 1.63 (d, J = 68.8 Hz, 8H), 1.43-0.91 (m, 9H) |
| 28 | (1S,2S)-2-((6-(4-((((R)-1-(2-bromophenyl)ethoxy)carbonyl)amino)-3-methylisoxazol-5-yl)-2-methylpyridin-3-yl)carbamoyl)cyclohexane-1-carboxylic acid | J17 | LC-MS (ESI): m/z (M + 1): 585.15 (Method 5)<br>$^1$H NMR (300 MHz, DMSO-d$_6$) δ ppm 12.14 (bs, 1H), 9.65 (s, 1H), 9.24 (bs, 1H), 7.96 (d, J = 8.4 Hz, 1H), 7.63 (d, J = 8.4 Hz, 3H), 7.50-7.34 (m, 1H),<br>7.35-7.16 (m, 1H), 5.93 (q, J = 7.1 Hz, 1H), 2.77-2.71 (m, 1H), 2.43 (s, 3H), 2.18 (s, 3H), 2.12-1.93 (m, 2H), 1.90-1.71 (m, 2H), 1.66-1.41 (m, 3H), 1.44-1.15 (m, 5H) |

Example 33

Cis-2-((2-methyl-6-(3-methyl-4-((((R)-1-(pyridin-3-yl)ethoxy)carbonyl)amino) isoxazol-5-yl)pyridin-3-yl)carbamoyl)cyclohexane-1-carboxylic acid

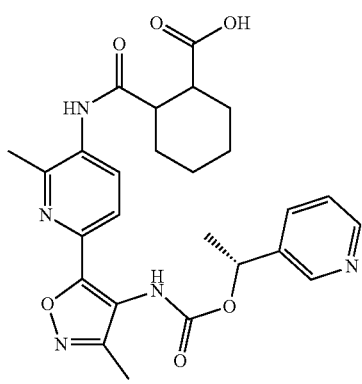 [SMILES: Cc1nc(-c2onc(C)c2NC(=O)O[C@H](C)c2cccnc2)ccc1NC(=O)C1CCCCC1C(=O)O]

To a solution of (R)-1-(pyridin-3-yl)ethyl (5-(5-amino-6-methylpyridin-2-yl)-3-methylisoxazol-4-yl)carbamate (Intermediate L2, 30 mg, 0.08 mmol) in DMF (1 mL), cis-1,2-cyclohexanedicarboxylic anhydride (0.039 g, 0.03 mmol) was added and the reaction mixture was stirred overnight at r.t. Water was added and the product was extracted with DCM (3×5 mL). Combined organic layers were washed with brine (3 mL), dried over sodium sulphate and evaporated to give 40 mg of crude. The crude was purified via pTLC (5% MeOH in DCM) to provide the title compound (13 mg, 0.03 mmol, 44% yield).

LC-MS (ESI): m/z (M+1): (Method 3) 508.21
$^1$H NMR (300 MHz, DMSO-$d_6$) δ ppm 12.48 (bs, 1H), 9.13 (s, 1H), 8.63 (s, 1H), 8.55-8.40 (m, 1H), 8.30 (d, J=8.5 Hz, 1H), 7.91-7.70 (m, 1H), 7.57 (d, J=8.4 Hz, 1H), 7.48-7.30 (m, 1H), 5.90-5.69 (m, 1H), 2.87-2.77 (m, 1H), 2.46 (s, 3H), 2.22-2.09 (m, 4H), 1.91-1.44 (m, 9H), 1.46-1.23 (m, 3H)

Example 53

(1S,2S)-2-((6-(5-((((R)-1-(2-chlorophenyl)ethoxy)carbonyl)amino)-1-methyl-1H-1,2,3-triazol-4-yl)-2-fluoropyridin-3-yl)carbamoyl)cyclohexane-1-carboxylic acid

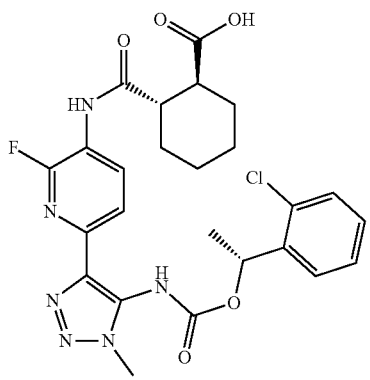 [SMILES: C[C@@H](OC(=O)Nc1c(-c2ccc(NC(=O)[C@H]3CCCC[C@@H]3C(=O)O)c(F)n2)nnn1C)c1ccccc1Cl]

To a solution of methyl (1S,2S)-2-((6-(5-((((R)-1-(2-chlorophenyl)ethoxy)carbonyl)amino)-1-methyl-1H-1,2,3-triazol-4-yl)-2-fluoropyridin-3-yl)carbamoyl)cyclohexane-1-carboxylate (Intermediate J38, 22 mg, 0.039 mmol) in THF (1 mL) and Water (0.2 mL), a solution of LiOH 1N (0.047 mL, 0.047 mmol) was added and the mixture was stirred at r.t. for 16 h. HCl 1N was added till acidic pH and the mixture was extracted with EtOAc. The organic layer was dried over $Na_2SO_4$ and concentrated under reduced pressure. The residue was purified via reverse phase flash chromatography using a gradient of MeCN (1% HCOOH) in acidic water (1% HCCOH) from 5 to 60% to afford the title compound (4.8 mg, 0.009 mmol, 22% yield).

LC-MS (ESI): m/z (M+1): 545.1 (Method 1)
$^1$H NMR (500 MHz, DMSO-$d_6$) δ ppm 12.11 (br s, 1H), 9.23-10.59 (m, 2H), 8.50 (br t, J=9.0 Hz, 1H), 7.82 (d, J=8.2 Hz, 1H), 6.60-7.73 (m, 4H), 5.99 (br s, 1H), 3.86 (br s, 3H), 2.69-2.87 (m, 1H), 2.39-2.49 (m, 1H), 1.99-2.06 (m, 1H), 1.92-1.98 (m, 1H), 1.70-1.81 (m, 2H), 1.57 (br s, 3H), 1.22-1.39 (m, 4H)

Pharmacological Activity of the Compounds of the Invention

In Vitro Assays

The effectiveness of compounds of the present invention as LPA1 antagonists can be determined at the human recombinant LPA1 expressed in CHO cells, using a FLIPR assay in 384 well format.

CHO-hLPA1 cell lines are cultured in a humidified incubator at 5% CO2 in DMEM/F-12 (1:1) MIXTURE with 2 mM Glutamax, supplemented with 10% of Foetal Bovine Serum, 1 mM Sodium Pyruvate, 11 mM Hepes and 1× Penicillin/Streptomycin. CHO hLPA1 cells are seeded into black walled clear-bottom 384-well plates (#781091, Greiner Bio-One GmbH) at a density of 7,500 cells per well in 50 μl culture media and grown overnight in a 37° C. humidified CO2-incubator. Serial dilutions (1:3 or 1:4, 11 points CRC) of compounds are performed in 100% DMSO at 200× the final concentration. The compounds are diluted 1:50 prior to the experiment with Assay Buffer (20 mM HEPES, 145 mM NaCl, 5 mM KCl, 5.5 mM glucose, 1 mM MgCl2 and 2 mM CaCl2), pH 7.4 containing 0.01% Pluronic F-127) to obtain a solution corresponding to 5-fold the final concentration in the assay (4×, 2% DMSO). The final concentration of DMSO in the assay will be 0.5% in each well. Medium is removed by aspiration and cells are then incubated with 30 μl of a loading solution containing 5 μM of the cytoplasmic Ca2+ indicator Cal-520 AM in Assay Buffer containing 2.5 mM probenecid for 30 min at 37° C. incubator (cell loading). The loaded cell plates are transferred into the FLIPR instrument and calcium responses are monitored during the on-line addition protocols. For testing of compounds, after the cell loading, 10 μl/well of 4× antagonists' solution was added onto the cells. After 30 min pre-incubation (at 37° C.), 10 μl/well of 5× concentrated LPA EC80 was added and Ca2+ mobilization responses was followed during the on-line addition protocol. Intracellular peak fluorescence values subtracted by baseline fluorescence are exported and analysed to determine $IC_{50}$ values, respectively. The calcium response is expressed as percentage of the maximal inhibition of the EC80 agonist response.

The raw data obtained in unstimulated controls (DMSO, no LPA) are set as "100% inhibition", while the raw data obtained in negative controls, i.e. in the absence of compounds and stimulating with LPA EC80, are set as "0% inhibition".

The raw data (peak height expressed as relative fluorescence units) are normalized and transformed into "percent of inhibition". Curve fitting and pIC$_{50}$ (−LogIC$_{50}$) estimations are carried out using a four-parameter logistic model using XLfit Software.

The results for individual compounds are provided below in Table 4 and are expressed as range of activity.

TABLE 4

| Example No. | LPA1 IC$_{50}$ |
|---|---|
| 5, 8, 21, 22, 30, 33, 51 | + |
| 2, 11, 15, 17, 18, 19, 20, 25, 29, 35, 36, 37, 38, 40, 42, 43, 45, 46, 50, 52 | ++ |
| 1, 3, 4, 6, 7, 9, 10, 12, 13, 14, 16, 23, 24, 26, 27, 28, 31, 32, 34, 39, 41, 44, 47, 48, 49, 53 | +++ | wherein the compounds are classified in term of potency with respect to their inhibitory activity on LPA1 receptors according to the following classification criterion:

+: LPA1 IC$_{50}$ comprised between about 600 nM and 250 nM

++: LPA1 IC$_{50}$ comprised between about 250 nM and 50 nM

+++: LPA1 IC$_{50}$ less than about 50 nM

As it can be appreciated, all the compounds of Table 4 show an antagonist activity on LPA1 receptor. In fact, it can be recognized that the symbol + indicate a good and sufficient level of activity, which can be even increased up to +++, thus confirming the high activity receptor LPA1 of the compounds of the invention.

BSEP Inhibition

BSEP inhibition was evaluated using cryopreserved human hepatocytes (Plateable Cryopreserved Human Hepatocytes, BIOIVT) cultured for 5 day between two layer of collagen (sandwich configuration). In this culture condition, hepatocytes express relevant transporters including BSEP and retain the bile canalicular structure.

On day 5 of culture, hepatic cells are ready for the assay and the biliary clearance of Taurocolic Acid (TCA), a known BSEP substrate, can be estimated in presence and in absence of compound of interest.

The sample solution was prepared dissolving test compound and TCA in DMSO and then diluted in the Assay Buffer: Hank's Balance Salt Solution (HBSS+) warmed at 37° C. before use, to give the 10 µM TCA working solution with and without 50 µM of test compound. Hepatocytes were incubated for 10 minutes with these working solutions allowing TCA to be excreted into bile. At the end of incubation, the working solution was aspirated, and the content of the bile was collected through the addition of HBSS Modified without Ca2+/Mg2+(HBSS−). The presence of Ca2+ in the buffer is required to maintain the integrity of the tight junctions, the diffusional barrier between the canalicular lumen and extracellular space. Instead, incubation of cells in Ca2+-free buffer disrupts the tight junctions and opens the bile canalicular structures, allowing the bile content to be released and collect for HPLC-MS/MS analysis.

The in vitro biliary clearance of TCA incubated with and without test compounds is calculated according to the following formula:

$$Cl_{Bil}(\mu l/min/mg \text{ protein}) = \frac{Acc\ Bile}{AUC}$$

where

Acc. Bile=(TCA amount in HBSS (−) buffer samples (pmol/mg protein)*Volume of each samples (mL))/Protein content per well (mg)

AUC=Incubation time (min)*T0 Concentration. T0 concentration is the initial TCA concentration in the medium.

The inhibition of BSEP was calculated as percentage of inhibition of TCA biliary clearance in presence of compound of interest, according to the following formula:

BSEP inhibition %=100−(TCA Cl$_{Bil}$ with test compound*100)

TCA Cl$_{Bil}$ without test compound.

The results for individual compounds are provided below in Table 5.

TABLE 5

| Example No. | BSEP Inhibition at 50 µM |
|---|---|
| 1, 2, 3, 7, 10, 11, 12, 13, 14, 15, 16, 17, 18, 20, 22, 23, 24, 25, 26, 27, 29, 30, 31, 32, 34, 35, 36, 37, 38, 39, 40, 41, 43, 44, 45, 46, 47, 48, 49, 50, 51, 52, 53 | ≤50% |

Permeability

The permeability of the compounds of the present invention was evaluated performing the assay on Caco-2 cells monolayers (human colon adenocarcinoma immortalized cell) by measuring the transport of compound (absorption and secretion) in both directions: apical to basolateral direction (A>B) and basolateral to apical (B>A) with and without PgP inhibitor (Elacridar).

The cells, purched from ReadyCell in 96 well format (Cod. KRECE-CCR50), were cultured by the supplier for 21 day on transwell supports in DMEM 1 g/L glucose culture medium supplemented with Fetal Bovin Sierum (10%), Glutamine 200 mM (1%) and Penicillin 10000 U/ml-10 mg/ml Streptomycin (1%).

On day 21 of colture, cell monolayers integrity was verified by measuring the trans-epithelial electric resistance (TEER) using the EVOM equipment (Endohm, WPI, Germany) and studying the apparent permeability (Papp) of reference compounds (Sulpiride and Metoprolol). Furthermore, as a control, the Talinolol 10 uM (Pgp efflux substrate) with and without Elacridar in both directions was used.

The sample solution was prepared dissolving test compound in DMSO at the concentration of 10 mM and then diluted in the Assay Buffer (Hank's Balance Salt Solution) warmed at 37° C. before use, to give the 10 µM Compound working solution with and without 10 µM Elacridar. These working solutions were added to donor compartment (apical for A>B direction and basolateral for B>A direction) and Assay Buffer (Hank's Balance Salt Solution) to the receiver compartment (basolateral for A>B direction and apical for B>A direction). The plate was incubated at 37° C. for 120 min, all incubation were conducted in triplicates. At the end of incubation, samples from donor and receiver compartments were collected for HPLC-MS/MS analyses.

The permeability coefficients (Papp) in both directions: apical to basolateral (A>B) and basolateral to apical (B>A) with and without PgP inhibitor (Elacridar) was calculated in nm/sec, using the following equation:

$$Papp = \frac{Cr \cdot Vr}{t \cdot A \cdot C0} \cdot 10000000 \left[\frac{nm}{sec}\right]$$

where:

Cr=measured concentration in the receiver well at the time t (expressed as IS ratio)

Vr=volume of the receiver well (ml)

t=time (sec)

A=membrane surface area (cm$^2$)

C0=initial donor concentration

Passive Papp is considered Papp A>B with PgP inhibitor Elacridar.

The results for individual compounds are provided below in Table 6.

TABLE 6

| Example No. | Passive Permeability nm/sec |
|---|---|
| 1, 2, 7, 10, 12, 13, 14, 16, 24, 25, 26, 27, 28, 32, 34, 35, 36, 38, 39, 40, 42, 46, 49, 50 | ≥15 nm/sec |

Comparative Example A (1S,2S)-2-({4-[3-methyl-4-({[(1R)-1-(2-chlorophenyl)ethoxy]carbonyl}amino)-1,2-oxazol-5-yl]phenyl}carbamoyl)cyclohexane-1-carboxylic acid

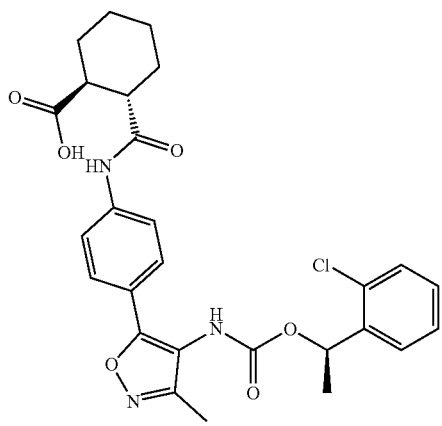 [SMILES: Cc1noc(-c2ccc(NC(=O)[C@H]3CCCC[C@@H]3C(=O)O)cc2)c1NC(=O)O[C@H](C)c1ccccc1Cl]

The activity of comparative Example A as has been tested in the in vitro assay for the determination of activity on LPA1 receptor as described above along with the BSEP and permeability assays.

Differently from the compounds of formula (I) of the present invention, the comparative Example A shows a passive permeability <15 and thus not suitable for an oral administration and a BSEP inhibition at 50 µM greater than 70%, said inhibition cannot be considered acceptable for a drug candidate.

Comparative Example B 2-((4-(3-methyl-4-((((R)-1-(pyridin-3-yl)ethoxy)carbonyl)amino)isoxazol-5-yl)phenyl)carbamoyl)cyclohexane-1-carboxylic acid

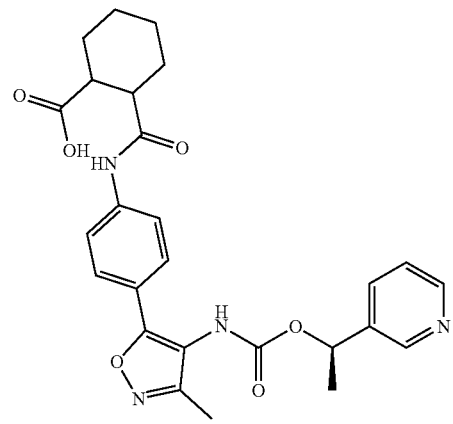 [SMILES: Cc1noc(-c2ccc(NC(=O)C3CCCCC3C(=O)O)cc2)c1NC(=O)O[C@H](C)c1cccnc1]

The activity of comparative Example B as has been tested in the in vitro assay for the determination of activity on LPA1 receptor as described above.

Differently from the compounds of formula (I) of the present invention, the comparative Example B shows an IC$_{50}$ greater than 1 µm and thus the compound is inactive on receptor LPA1.

The above results demonstrate that the scaffold of the compounds of formula (I) of the invention comprising of a pyridine moiety in combination with the isoxazole, leads unexpectedly to a series of compounds that is active, endowed with a very good BSEP and permeability profile, thus suitable for a very promising bioavailability profile.

The invention claimed is:

1. A compound of formula (I)

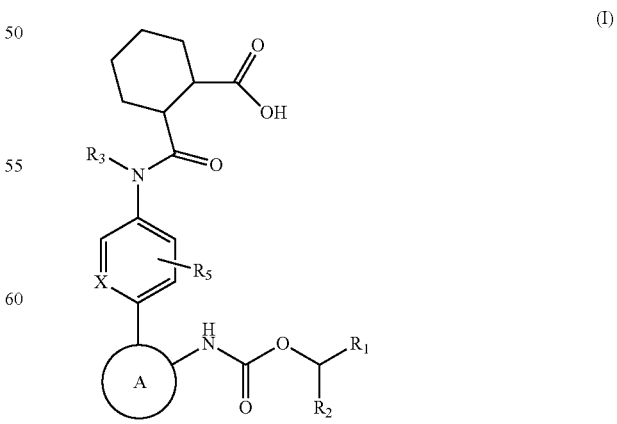

(I)

wherein X is CR$_5$, —CH— or N;

217

A is selected from the group consisting of

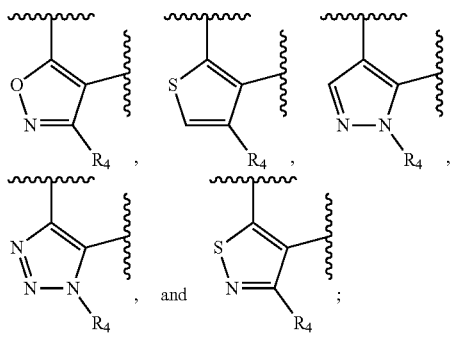

R₁ s selected from the group consisting of aryl, $(C_3-C_6)$ cycloalkyl, heterocycloalkyl, heteroaryl and $(C_1-C_4)$ alkyl wherein any of such aryl, heteroaryl, cycloalkyl, heterocycloalkyl and alkyl may be optionally substituted by one or more groups selected from the group consisting of $(C_1-C_4)$alkyl, halo, $(C_1-C_4)$haloalkyl, CN, —O$(C_1-C_4)$alkyl, and —NR₆R₇;

R₂ is H or $(C_1-C_4)$alkyl;

R₃ is H or $(C_1-C_4)$alkyl;

R₄ is H or $(C_1-C_4)$alkyl;

R₅ is H or selected from the group consisting of $(C_1-C_4)$ alkyl, halo and CN;

R₆ and R₇ are at each occurrence independently H or selected from the group consisting of $(C_1-C_4)$alkyl, $(C_1-C_6)$haloalkyl and halo, or R₆ and R₇ may form together with the nitrogen atom to which they are attached a 4-6 membered saturated heterocyclic ring system optionally containing a further heteroatom selected from the group consisting of N, S and O, said heterocyclic ring system may be optionally substituted by one or more groups selected from the group consisting of $(C_1-C_4)$alkyl, $(C_1-C_4)$haloalkyl and halo,

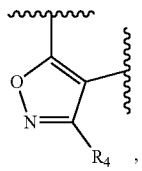

with the proviso that when A is X is N.

2. The compound according to claim 1, wherein X is CR₅, —CH— or N

A is selected from the group consisting of

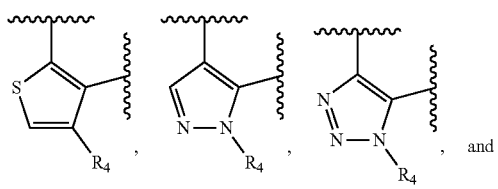

218

-continued

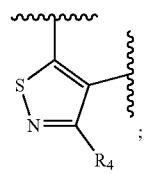

R₁ is selected from the group consisting of aryl, $(C_4-C_6)$ cycloalkyl, heterocycloalkyl, and heteroaryl, wherein any of such aryl and heteroaryl is optionally substituted by one or more groups selected from the group consisting of $(C_1-C_4)$alkyl, halo, $(C_1-C_4)$haloalkyl, and CN;

R₂ is $(C_1-C_4)$alkyl;

R₃ is H or $(C_1-C_4)$alkyl;

R₄ is H or $(C_1-C_4)$alkyl; and

R₅ is H or $(C_1-C_4)$alkyl.

3. The compound of formula I according to claim 1 wherein A is

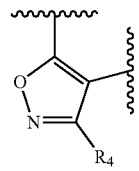

and X is N, represented by formula Ia

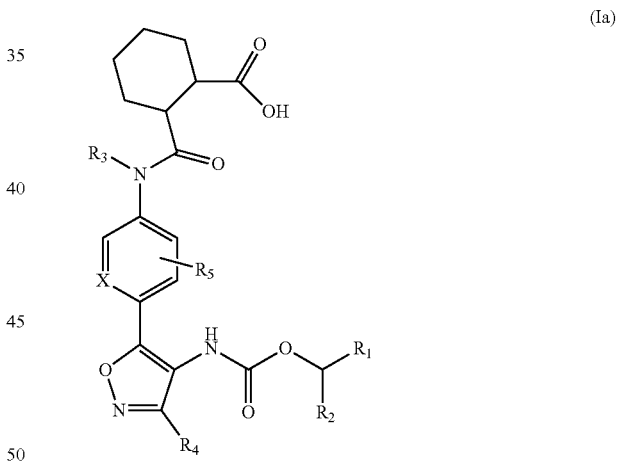

(Ia)

wherein

R₁ is selected from the group consisting of aryl, $(C_3-C_6)$ cycloalkyl, heterocycloalkyl, heteroaryl and $(C_1-C_4)$ alkyl wherein any of such aryl, heteroaryl, cycloalkyl, heterocycloalkyl and alkyl may be optionally substituted by one or more groups selected from the group consisting of $(C_1-C_4)$alkyl, halo, $(C_1-C_4)$haloalkyl, CN, —O$(C_1-C_4)$alkyl, and —NR₆R₇;

R₂ is H or $(C_1-C_4)$alkyl;

R₃ is H or $(C_1-C_4)$alkyl;

R₄ is H or $(C_1-C_4)$alkyl;

R₅ is H or selected from the group consisting of $(C_1-C_4)$ alkyl, halo and CN;

R₆ and R₇ are at each occurrence independently H or selected from the group consisting of $(C_1-C_4)$alkyl, $(C_1-C_6)$haloalkyl and halo, or R₆ and R₇ may form together with the nitrogen atom to which they are attached a 4-6 membered saturated heterocyclic ring system optionally containing a further heteroatom selected from the group consisting of N, S and O, said heterocyclic ring system may be optionally substituted by one or more groups selected from the group consisting of ($C_1$-$C_4$)alkyl, ($C_1$-$C_4$) haloalkyl and halo.

4. The compound according to claim 3, wherein $R_1$ is selected from the group consisting of aryl, ($C_4$-$C_6$) cycloalkyl, heterocycloalkyl, and heteroaryl, wherein any of such aryl and heteroaryl is optionally substituted by one or more groups selected from the group consisting of ($C_1$-$C_4$)alkyl, halo, ($C_1$-$C_4$)haloalkyl, and CN;

$R_2$ is H or ($C_1$-$C_4$)alkyl;

$R_3$ is H or ($C_1$-$C_4$)alkyl;

$R_4$ is H or ($C_1$-$C_4$)alkyl; and $R_5$ is H, ($C_1$-$C_4$)alkyl, or halo.

5. The compound according to claim 1, selected from the group consisting of:

(1S,2S)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid, (1S,2S)-2-((6-(5-((((R)-1-(2-chlorophenyl)ethoxy)carbonyl)amino)-1-methyl-1H-pyrazol-4-yl)-2-methylpyridin-3-yl)carbamoyl)cyclohexane-1-carboxylic acid, (1S,2S)-2-((6-(5-((((R)-1-(2-chlorophenyl)ethoxy)carbonyl)amino)-1-methyl-1H-1,2,3-triazol-4-yl)-2-methylpyridin-3-yl)carbamoyl)cyclohexane-1-carboxylic acid, Single Diastereomer 2 of Trans-2-((4-(5-((((R)-1-(2-chlorophenyl)ethoxy)carbonyl)amino)-1-methyl-1H-pyrazol-4-yl)phenyl)carbamoyl)cyclohexane-1-carboxylic acid, Single Diastereomer 1 of Trans-2-((4-(5-((((R)-1-(2-chlorophenyl)ethoxy)carbonyl)amino)-1-methyl-1H-pyrazol-4-yl)phenyl)carbamoyl)cyclohexane-1-carboxylic acid, Cis-2-((4-(3-((((R)-1-(2-chlorophenyl)ethoxy)carbonyl)amino)thiophen-2-yl)phenyl)carbamoyl)cyclohexane-1-carboxylic acid, Single Diastereomer 1 of Cis-2-((4-(3-((((R)-1-(2-chlorophenyl)ethoxy)carbonyl)amino)thiophen-2-yl)phenyl)carbamoyl)cyclohexane-1-carboxylic acid, Single Diastereomer 2 of Cis-2-((4-(3-((((R)-1-(2-chlorophenyl)ethoxy)carbonyl)amino)thiophen-2-yl)phenyl)carbamoyl)cyclohexane-1-carboxylic acid, Trans-2-((4-(3-((((R)-1-(2-chlorophenyl)ethoxy)carbonyl)amino)thiophen-2-yl)phenyl)carbamoyl)cyclohexane-1-carboxylic acid, Single Diastereomer 1 of Trans-2-((4-(3-((((R)-1-(2-chlorophenyl)ethoxy)carbonyl)amino)thiophen-2-yl)phenyl)carbamoyl)cyclohexane-1-carboxylic acid, (1S,2S)-2-((6-(4-((((R)-1-(2-chloropyridin-3-yl)ethoxy)carbonyl)amino)-3-methylisoxazol-5-yl)-2-methylpyridin-3-yl)carbamoyl)cyclohexane-1-carboxylic acid, (1R,2R)-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid, Single Diastereomer 2 of Cis-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid, Single Diastereomer 1 of Cis-2-((6-(4-((((R)-1-(2-chlorophenyl)ethoxy)carbonyl)amino)-3-methylisoxazol-5-yl)-2-methylpyridin-3-yl)carbamoyl)cyclohexane-1-carboxylic acid, (1S,2S)-2-((2-methyl-6-(3-methyl-4-((((R)-1-(pyridin-3-yl)ethoxy)carbonyl)amino)isoxazol-5-yl)pyridin-3-yl)carbamoyl)cyclohexane-1-carboxylic acid, (1S,2S)-2-((6-(4-((((R)-1-(2-chlorophenyl)ethoxy)carbonyl)amino)-3-methylisoxazol-5-yl)pyridin-3-yl)carbamoyl)cyclohexane-1-carboxylic acid, (1S,2S)-2-((6-(4-(((1-(2-fluoropyridin-3-yl)ethoxy)carbonyl)amino)-3-methylisoxazol-5-yl)pyridin-3-yl)carbamoyl)cyclohexane-1-carboxylic acid, (1S,2S)-2-((6-(4-(((((EN1)-1-(2-fluoropyridin-3-yl)ethoxy)carbonyl)amino)-3-methylisoxazol-5-yl)pyridin-3-yl)carbamoyl)cyclohexane-1-carboxylic acid, (1S,2S)-2-((6-(4-(((1-(2-fluoropyridin-3-yl)ethoxy)carbonyl)amino)-3-methylisoxazol-5-yl)-2-methylpyridin-3-yl)carbamoyl)cyclohexane-1-carboxylic acid, (1S,2S)-2-((6-(4-(((((EN2)-1-(2-fluoropyridin-3-yl)ethoxy)carbonyl)amino)-3-methylisoxazol-5-yl)-2-methylpyridin-3-yl)carbamoyl)cyclohexane-1-carboxylic acid, (1S,2S)-2-((6-(3-((((R)-1-(2-chlorophenyl)ethoxy)carbonyl)amino)thiophen-2-yl)pyridin-3-yl)carbamoyl)cyclohexane-1-carboxylic acid, (1S,2S)-2-((2-methyl-6-(3-methyl-4-((((R)-1-(thiazol-2-yl)ethoxy)carbonyl)amino)isoxazol-5-yl)pyridin-3-yl)carbamoyl)cyclohexane-1-carboxylic acid, (1S,2S)-2-((4-(5-((((R)-1-(2-chlorophenyl)ethoxy)carbonyl)amino)-1-methyl-1H-1,2,3-triazol-4-yl)phenyl)carbamoyl)cyclohexane-1-carboxylic acid, (1S,2S)-2-((6-(4-((((R)-1-(2-fluorophenyl)ethoxy)carbonyl)amino)-3-methylisoxazol-5-yl)-2-methylpyridin-3-yl)carbamoyl)cyclohexane-1-carboxylic acid, (1S,2S)-2-((2-methyl-6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylic acid, (1S,2S)-2-((6-(4-((((R)-1-cyclopentylethoxy)carbonyl)amino)-3-methylisoxazol-5-yl)-2-methylpyridin-3-yl)carbamoyl)cyclohexane-1-carboxylic acid, (1S,2S)-2-((2-methyl-6-(3-methyl-4-((((R)-1-phenylethoxy)carbonyl)amino)isoxazol-5-yl)pyridin-3-yl)carbamoyl)cyclohexane-1-carboxylic acid, (1S,2S)-2-((6-(4-((((R)-1-(2-bromophenyl)ethoxy)carbonyl)amino)-3-methylisoxazol-5-yl)-2-methylpyridin-3-yl)carbamoyl)cyclohexane-1-carboxylic acid, (1S,2S)-2-((6-(4-((((R)-1-(2-chloropyridin-3-yl)ethoxy)carbonyl)amino)-3-methylisoxazol-5-yl)pyridin-3-yl)carbamoyl)cyclohexane-1-carboxylic acid, (1S,2S)-2-((6-(4-((((R)-1-(2-chloropyridin-3-yl)ethoxy)carbonyl)amino)-3-methylisoxazol-5-yl)pyridin-3-yl)(methyl)carbamoyl)cyclohexane-1-carboxylic acid, (1S,2S)-2-((6-(4-((((R)-1-(2-chlorophenyl)ethoxy)carbonyl)amino)-3-methylisoxazol-5-yl)-5-fluoropyridin-3-yl)carbamoyl)cyclohexane-1-carboxylic acid, (1S,2S)-2-((2-methyl-6-(3-methyl-4-((((R)-1-(o-tolyl)ethoxy)carbonyl)amino)isoxazol-5-yl)pyridin-3-yl)carbamoyl)cyclohexane-1-carboxylic acid, Cis-2-((2-methyl-6-(3-methyl-4-((((R)-1-(pyridin-3-yl)ethoxy)carbonyl)amino)isoxazol-5-yl)pyridin-3-yl)carbamoyl)cyclohexane-1-carboxylic acid, (1S,2S)-2-((6-(4-((((R)-1-(2-fluorophenyl)ethoxy)carbonyl)amino)-3-methylisoxazol-5-yl)pyridin-3-yl)carbamoyl)cyclohexane-1-carboxylic acid, (1S,2S)-2-((6-(4-((((2-chlorobenzyl)oxy)carbonyl)amino)-3-methylisoxazol-5-yl)pyridin-3-yl)carbamoyl)cyclohexane-1-carboxylic acid, (1S,2S)-2-((6-(3-methyl-4-((((R)-1-(2-(trifluoromethyl)phenyl)ethoxy)carbonyl)amino)isoxazol-5-yl)pyridin-3-yl)carbamoyl)cyclohexane-1-carboxylic acid, (1S,2S)-2-((6-(4-((((R)-1-(2-methoxyphenyl)ethoxy)carbonyl)amino)-3-methylisoxazol-5-yl)pyridin-3-yl)carbamoyl)cyclohexane-1-carboxylic acid, (1S,2S)-2-((6-(4-((((R)-1-(2-methoxyphenyl)ethoxy)carbonyl)amino)-3-methylisoxazol-5-yl)-2-methylpyridin-3-yl)carbamoyl)cyclohexane-1-carboxylic acid, Cis-2-((2-methyl-6-(3-methyl-4-((((R)-1-phenylethoxy)carbonyl)amino)isoxazol-5-yl)pyridin-3-yl)carbamoyl)cyclohexane-1-carboxylic acid, Cis-2-((6-(3-methyl-4-((((R)-1-phenylethoxy)carbonyl)amino)isoxazol-5-yl)pyridin-3-yl)carbamoyl)cyclohexane-1-carboxylic acid, (1S,2S)-2-((6-(3-methyl-4-((((R)-1-phenylethoxy)carbonyl)amino)isoxazol-5-yl)pyridin-3-yl)carbamoyl)cyclohexane-1-carboxylic acid, (1S,2S)-2-((6-(4-((((R)-1-(2-chlorophenyl)ethoxy)carbonyl)amino)-3-methylisothiazol-5-yl)-2-methylpyridin-3-yl)carbamoyl)cyclohexane-1-carboxylic acid, (1S,2S)-2-((2-methyl-6-(1-methyl-5-((((R)-1-phenylethoxy)carbonyl)amino)-1H-pyrazol-4-yl)pyridin-3-yl)carbamoyl)cyclohexane-1-carboxylic acid, (1S,2S)-2-((2-methyl-6-(1-methyl-5-((((R)-1-phenylethoxy)carbonyl)amino)-1H-1,2,3-triazol-4-yl)pyridin-3-yl)carbamoyl)cyclohexane-1-carboxylic acid, (1S,2S)-2-((2-methyl-6-(1-methyl-5-((((R)-1-(2-(trifluoromethyl)phenyl)ethoxy)carbonyl)amino)-1H-1,2,3-triazol-4-yl)pyridin-3-yl)carbamoyl)cyclohexane-1-carboxylic acid, (1S,2S)-2-((6-(5-((((R)-1-cyclopentylethoxy)carbonyl)amino)-1-methyl-1H-1,2,3-triazol-4-yl)-2-methylpyridin-3-yl)carbamoyl)cyclohexane-1-carboxylic acid, (1S,2S)-2-((6-(5-((((R)-1-(2-fluorophenyl)ethoxy)carbonyl)amino)-1-methyl-1H-1,2,3-triazol-4-yl)-2-methylpyridin-3-yl)carbamoyl)cyclohexane-1-carboxylic acid, (1S,2S)-2-((6-(5-((((R)-1-(2-chlorophenyl)ethoxy)carbonyl)amino)-1-ethyl-1H-1,2,3-triazol-4-yl)-2-methylpyridin-3-yl)carbamoyl)cyclohexane-1-carboxylic acid, (1S,2S)-2-((2-methyl-6-(3-methyl-4-(((((R)-pentan-2-yl)oxy)carbonyl)amino)isoxazol-5-yl)pyridin-3-yl)carbamoyl)cyclohexane-1-carboxylic acid, (1S,2S)-2-((6-(5-((((R)-1-(2-fluorophenyl)ethoxy)carbonyl)amino)-1-methyl-1H-pyrazol-4-yl)-2-methylpyridin-3-yl)carbamoyl)cyclohexane-1-carboxylic acid, (1S,2S)-2-((6-(5-((((R)-1-cyclopentylethoxy)carbonyl)amino)-1-methyl-1H-pyrazol-4-yl)-2-methylpyridin-3-yl)carbamoyl)cyclohexane-1-carboxylic acid, (1S,2S)-2-((2-methyl-6-(1-methyl-5-(((((R)-pentan-2-yl)oxy)carbonyl)amino)-1H-1,2,3-triazol-4-yl)pyridin-3-yl)carbamoyl)cyclohexane-1-carboxylic acid, and (1S,2S)-2-((6-(5-((((R)-1-(2-chlorophenyl)ethoxy)carbonyl)amino)-1-methyl-1H-1,2,3-triazol-4-yl)-2-fluoropyridin-3-yl)carbamoyl)cyclohexane-1-carboxylic acid.

6. A pharmaceutical composition comprising the compound according to claim 1, in admixture with one or more pharmaceutically acceptable carriers or excipients.

7. The pharmaceutical composition according to claim 6, adapted for oral administration.

8. A method for treating a disease, disorder, or condition associated with dysregulation of lysophosphatidic acid receptor 1 (LPA1), comprising administering to a subject in need thereof the pharmaceutical composition according to claim 6.

9. A method for treating fibrosis and/or a disease, disorder, or condition that involves fibrosis, comprising administering to a subject in need thereof the pharmaceutical composition according to claim 6.

10. The method according to claim 9, wherein the fibrosis or disease, disorder, or condition that involves fibrosis comprises pulmonary fibrosis, idiopathic pulmonary fibrosis (IPF), hepatic fibrosis, renal fibrosis, ocular fibrosis, cardiac fibrosis, arterial fibrosis or systemic sclerosis.

11. The method according to claim 10, wherein the fibrosis comprises idiopathic pulmonary fibrosis (IPF).

* * * * *